(12) United States Patent
Presley et al.

(10) Patent No.: US 8,000,568 B2
(45) Date of Patent: *Aug. 16, 2011

(54) BEAM STEERING ELEMENT AND ASSOCIATED METHODS FOR MIXED MANIFOLD FIBEROPTIC SWITCHES

(75) Inventors: Harry Wayne Presley, Suwanee, GA (US); Michael L. Nagy, Lawrenceville, GA (US)

(73) Assignee: Olympus Corporation (JP)

(*) Notice: Subject to any disclaimer, the term of this patent is extended or adjusted under 35 U.S.C. 154(b) by 702 days.

This patent is subject to a terminal disclaimer.

(21) Appl. No.: 11/980,974

(22) Filed: Oct. 30, 2007

(65) Prior Publication Data

US 2009/0110349 A1    Apr. 30, 2009

Related U.S. Application Data

(63) Continuation-in-part of application No. 11/811,928, filed on Jun. 12, 2007, now Pat. No. 7,720,329, and a continuation-in-part of application No. 11/975,242, filed on Oct. 18, 2007, now Pat. No. 7,702,194, which is a continuation-in-part of application No. 11/977,690, filed on Oct. 25, 2007.

(60) Provisional application No. 60/857,441, filed on Nov. 7, 2006.

(51) Int. Cl.
 *G02B 6/26* (2006.01)
 *G02B 6/42* (2006.01)
(52) U.S. Cl. ............. 385/18; 385/16; 359/872; 359/877
(58) Field of Classification Search .................... 385/16, 385/18; 359/872, 877
See application file for complete search history.

(56) References Cited

U.S. PATENT DOCUMENTS

| | | | |
|---|---|---|---|
| 3,622,792 A | 11/1971 | Picciniani |
| 4,012,147 A | 3/1977 | Walrafen |
| 4,076,421 A | 2/1978 | Kishner |
| 4,655,547 A | 4/1987 | Heritage et al. |
| 4,678,332 A | 7/1987 | Rock et al. |

(Continued)

FOREIGN PATENT DOCUMENTS

EP    0 548 830 A1    6/1993

(Continued)

OTHER PUBLICATIONS

Timofeev, F.N. et al., "1.5um Free-Space Grating Multi/Demultiplexer and Routing Switch," Electronics Letters, vol. 32, No. 14, pp. 1307-1308, Jul. 4, 1996.

(Continued)

*Primary Examiner* — Daniel Petkovsek

(57) ABSTRACT

An optical comprising two or more mixed optical switches co-packaged together comprising discrete sets of fiber ports, each configured as N×1 optical switch or 1×N optical switch, wherein λn from said input fiber ports is focused on λn mirror via the use of shared free space optics elements, wherein beam steering elements steers λn from any point in the optical path to any other point; and discrete arrays of micro electro-mechanical system (MEMS) mirrors in a shared array, wherein first array of mirrors is utilized to select and switch selected wavelengths from input fiber ports to output fiber port of the same set, wherein second array of mirrors using and sharing the same shared optics is utilized to select and switch selected wavelengths between input and output ports belonging to another set; and wherein output fiber ports from one set can be coupled to input ports of other sets.

19 Claims, 30 Drawing Sheets

U.S. PATENT DOCUMENTS

| | | | |
|---|---|---|---|
| 4,790,654 A | 12/1988 | Clarke | |
| 4,866,699 A | 9/1989 | Brackett et al. | |
| 4,983,039 A | 1/1991 | Harada et al. | |
| 5,130,835 A | 7/1992 | Stegmeier | |
| 5,166,818 A | 11/1992 | Chase et al. | |
| 5,226,099 A | 7/1993 | Mignardi et al. | |
| 5,233,405 A | 8/1993 | Wildnauer et al. | |
| 5,255,332 A | 10/1993 | Welch et al. | |
| 5,305,402 A | 4/1994 | Hill et al. | |
| 5,414,540 A | 5/1995 | Patel et al. | |
| 5,436,986 A | 7/1995 | Tsai | |
| 5,444,801 A | 8/1995 | Laughlin | |
| 5,504,575 A | 4/1996 | Stafford | |
| 5,581,643 A | 12/1996 | Wu | |
| 5,610,757 A | 3/1997 | Ji et al. | |
| 5,627,925 A | 5/1997 | Alferness et al. | |
| 5,633,755 A | 5/1997 | Manabe et al. | |
| 5,671,304 A | 9/1997 | Duguay | |
| 5,768,006 A | 6/1998 | Min et al. | |
| 5,796,479 A | 8/1998 | Derickson et al. | |
| 5,841,917 A | 11/1998 | Jungerman et al. | |
| 5,878,177 A | 3/1999 | Karasan et al. | |
| 5,920,417 A | 7/1999 | Johnson | |
| 5,960,132 A | 9/1999 | Lin | |
| 5,960,133 A | 9/1999 | Tomlinson | |
| 6,028,689 A | 2/2000 | Michalicek et al. | |
| 6,072,923 A | 6/2000 | Stone | |
| 6,097,859 A | 8/2000 | Solgaard et al. | |
| 6,204,919 B1 | 3/2001 | Barshad et al. | |
| 6,212,309 B1 | 4/2001 | Nguyen et al. | |
| 6,263,123 B1 | 7/2001 | Bishop et al. | |
| 6,289,145 B1 | 9/2001 | Solgaard et al. | |
| 6,327,398 B1 | 12/2001 | Solgaard et al. | |
| 6,374,008 B2 | 4/2002 | Solgaard et al. | |
| 6,389,190 B2 | 5/2002 | Solgaard et al. | |
| 6,434,290 B1 | 8/2002 | Berthold | |
| 6,456,751 B1 | 9/2002 | Bowers et al. | |
| 6,487,334 B2 | 11/2002 | Ducellier et al. | |
| 6,507,685 B1 | 1/2003 | Polynkin et al. | |
| 6,535,664 B1 | 3/2003 | Anderson | |
| 6,539,142 B2 | 3/2003 | Lemoff et al. | |
| 6,542,657 B2 | 4/2003 | Anderson | |
| 6,560,384 B1 | 5/2003 | Helkey et al. | |
| 6,571,030 B1 | 5/2003 | Ramaswami et al. | |
| 6,606,427 B1 | 8/2003 | Graves | |
| 6,614,954 B2 | 9/2003 | Huang et al. | |
| 6,694,073 B2 | 2/2004 | Golub et al. | |
| 6,707,959 B2 | 3/2004 | Ducellier et al. | |
| 6,711,320 B2 | 3/2004 | Solgaard et al. | |
| 6,728,433 B1 | 4/2004 | Bowers et al. | |
| 6,757,458 B2 | 6/2004 | Neilson et al. | |
| 6,760,511 B2 | 7/2004 | Garrett et al. | |
| 6,787,745 B2 | 9/2004 | Hajjar et al. | |
| 6,792,177 B2 | 9/2004 | Welsh et al. | |
| 6,798,941 B2 | 9/2004 | Smith et al. | |
| 6,798,992 B1 | 9/2004 | Bishop et al. | |
| 6,801,684 B2 | 10/2004 | Lösch | |
| 6,810,165 B2 | 10/2004 | Golub et al. | |
| 6,826,330 B1 | 11/2004 | Godil et al. | |
| 6,834,136 B2 | 12/2004 | Solgaard et al. | |
| 6,847,749 B1 | 1/2005 | Spremo et al. | |
| 6,885,807 B2 | 4/2005 | Riza | |
| 6,898,341 B2 | 5/2005 | Huang et al. | |
| 6,922,239 B2 | 7/2005 | Solgaard et al. | |
| 6,922,529 B2 | 7/2005 | Bortz | |
| 6,931,196 B2 | 8/2005 | Livas et al. | |
| 6,952,260 B2 | 10/2005 | Xiao | |
| 6,967,718 B1 | 11/2005 | Carlisle et al. | |
| 6,978,061 B1 * | 12/2005 | Tabuchi | 385/18 |
| 7,060,964 B1 | 6/2006 | Pi et al. | |
| 7,265,827 B2 | 9/2007 | Slutter et al. | |
| 7,268,869 B2 | 9/2007 | Baluswamy | |
| 7,330,617 B2 | 2/2008 | Aota et al. | |
| 7,340,126 B2 | 3/2008 | Mitamura | |
| 7,426,347 B2 | 9/2008 | Hnatiw et al. | |
| 7,440,648 B2 | 10/2008 | Oikawa et al. | |
| 7,440,649 B2 | 10/2008 | Sakai et al. | |
| 7,702,194 B2 * | 4/2010 | Presley et al. | 385/18 |
| 7,720,329 B2 * | 5/2010 | Presley et al. | 385/18 |
| 2004/0136648 A1 | 7/2004 | Chen et al. | |
| 2005/0220394 A1 | 10/2005 | Yamamoto et al. | |

FOREIGN PATENT DOCUMENTS

JP  2617054  4/1993

OTHER PUBLICATIONS

Koga, Masafumi et al., "Design and Performance of an Optical Path Cross-Connect System Based on Wavelength Path Concept," Journal of Lightwave Technology, vol. 14, No. 6, pp. 1106-1119, Jun. 1996.

Koga, Masafumi et al., "8×16 Delivery-and-Coupling-Type Optical Switches for a 320-Gbitls Throughput Optical Path Cross-Connect System," OFC/96 Technical Digest, pp. 259-261, (1996).

Toshiyoshi, Hiroshi et al., "Electrostatic Micro Torsion Mirrors for an Optical Switch Matrix," Journal of Microelectromechanical Systems, vol. 5, No. 4, pp. 231-237, Dec. 1996.

Toshiyoshi, Hiroshi et al., "An Electrostatically Operated Torsion Mirror for Optical Switching Device," presented at Transducer's 95 Eurosensors IX (Conference on Solid State Sensors and Actuator) Stockholm, Sweden, pp. 297-300, Jun. 25-29, 1995.

Okamoto, Satoru et al., "Optical Path Cross-Connect Node Architectures for Photonic Transport Network," Journal of Lightwave Technology, vol. 14, No. 6, pp. 1410-1422, Jun. 1996.

Okamoto, Satoru et al., "Optical Path Cross-Connect Systems for Photonic Transport Networks," NTT Transmission Systems Laboratories, IEEE, pp. 474-480, (1993).

Sato, Ken-ichi et al., "Optical Paths and Realization Technologes," NTT Optical Nework Systems Laboratories, IEEE, pp. 1513-1520, (1994).

Patel, J.S. et al., "Liquid Crystal and Grating-Based Multiple-Wavelength Cross-Connect Switch," IEEE Photonics Technology Letters, vol. 7, No. 5, pp. 514-516, May 1995.

Jeong, et al_., "Comparision of Wavelength-Interchanging and Wavelength-Selective Cross-Connects in Multiwavelength All-Optical Networks," Proceedings of 1996 15th Annual Joint Conference of IEEE Computer and Communications Societies, INFOCOM '96, Pt 1 (of 3), pp. 156-163, 1996.

Toshiyoshi, Hiroshi et al., "Optical Crossconnection by Silicon Micromachined Torsion Mirrors," IEEE/LEOS 1996 Summer Topical Meetings, Advanced Applications of Lasers in Materials Processing/Broadband Optical Networksl Smart Pixels/Optical MEMs and Their Applications, pp. 63-64, Aug. 5-9, 1996.

T. Gus McDonald et al., "4×4 Fiber Optic Crossbar Switch Using the Deformable Mirror Device," Paper presented at the Spatial Light Modulators and Applications Topical Meeting, pp. 80-83, Sep. 10-12, 1990, Incline Village, NV, IEEE LEOS and OSA Photonics Reports Technical Digest Series, vol. 14, (1990).

* cited by examiner

US 8,000,568 B2

BEAM STEERING ELEMENT AND ASSOCIATED METHODS FOR MIXED MANIFOLD FIBEROPTIC SWITCHES

PRIORITY CLAIM TO RELATED US APPLICATIONS

To the full extent permitted by law, the present U.S. Non-Provisional patent application is a Continuation-in-Part of, and hereby claims priority to and full benefit of U.S. Non-Provisional patent application having assigned Ser. No. 11/811,928 entitled "Segmented Prism Element and Associated Methods For Manifold Fiberoptic Switches," filed on Jun. 12, 2007, issued on May 18, 2010 as U.S. Pat. No. 7,720,329, which claims the benefit of U.S. Provisional patent application entitled "Segmented Prism Element and Associated Methods for Manifold Fiberoptic Switches," filed on Nov. 7,2006, having assigned Ser. No. 60/857,441, and is a Continuation-in-Part of, and claims priority to and the full benefit of U.S. Non-Provisional patent application having assigned Ser. No. 11/975,242 entitled, "Beam Steering Element and Associated Methods for Manifold Fiberoptic Switches," filed on Oct. 18, 2007, issued on Apr. 20, 2010 as U.S. Pat. No. 7,702,194, (a continuation-in-part of Application No. 11/811,928, filed on Jun. 12, 2007, and issued on May 18, 2010 as U.S. Pat. No. 7,720,329), which claims priority to and the full benefit of U.S. Non-Provisional patent application having assigned Ser. No. 11/811,928 entitled "Segment Prism Element and Associated Methods For Manifold Fiberoptic Switches," filed on Jun. 12, 2007, issued on May 18, 2010 as U.S. Pat. No. 7,720,329, which claims the benefit of U.S. Provisional patent application entitled "Segmented Prism Element and Associated Methods for Manifold Fiberoptic Switches," filed on Nov. 7, 2006, having assigned Ser. No. 60/857,441 and is a Continuation-in-Part of, and claims priority to the full benefit of U.S. Non-Provisional patent application entitled, "Beam Steering Element and Associated Methods for Manifold Fiberoptic Switches and Monitoring," filed Oct. 25, 2007, having assigned Ser. No. 11/977,690, (a continuation-in-part of U.S. Application No. 11/811,928, filed on Jun. 12, 2007 issued on May 18, 2010 as U.S. Pat. No. 7,720,329, and 11/975,242 filed on Oct. 18, 2007 issued on Apr. 20, 2010 as U.S. Pat. No. 7,702,194), which claims priority to and the full benefit of U.S. Non-Provisional patent application having assigned Ser. No. 11/811,928, entitled "Segmented Prism Element and Associated Methods For Manifold Fiberoptic Switches," filed on Jun. 12, 2007 issued on May 18, 2010 as U.S. Pat. No. 7,720,329, which claims the benefit of U.S. Provisional patent application entitled "Segmented Prism Element and Associated Methods for Manifold Fiberoptic Switches," filed on Nov. 7,2006, having assigned Ser. No. 60/857,441 and the 11/977,690 claims priority and full benefit of U.S. Non-Provisional patent application having assigned Ser. No. 11/975, 242 entitled, "Beam Steering Element and Associated Methods for Manifold Fiberoptic Switches," filed on Oct. 18, 2007 issued on Apr. 20, 2010 as U.S. Pat. No. 7,702,194, which claims priority as stated above.

TECHNICAL FIELD

The present invention relates generally to all-optical fiber optic communications and datacom switches, and more specifically pertains to fiber optic switches used in multi-wavelength networks.

BACKGROUND

Modern communications networks are increasingly based on silica optical fiber which offers very wide bandwidth within several spectral wavelength bands. At the transmitter end of a typical point-to-point fiber optic communications link an electrical data signal is used to modulate the output of a semiconductor laser emitting, for example, in the 1525-1565 nanometer transmission band (the so-called C-band), and the resulting modulated optical signal is coupled into one end of the silica optical fiber. On sufficiently long links the optical signal may be directly amplified along the route by one or more amplifiers, for example, optically-pumped erbium-doped fiber amplifiers (EDFAs). At the receiving end of the fiber link, a photodetector receives the modulated light and converts it back to its original electrical form. For very long links the optical signal risks becoming excessively distorted due to fiber-related impairments such as chromatic and polarization dispersion and by noise limitations of the amplifiers, and may be reconstituted by detecting and re-launching the signal back into the fiber. This process is typically referred to as optical-electrical-optical (OEO) regeneration.

In recent developments, the transmission capacity of fiber optic systems has been greatly increased by wavelength division multiplexing (WDM) in which multiple independent optical signals, differing uniquely by wavelength, are simultaneously transmitted over the fiber optic link. For example, the C-band transmission window has a bandwidth of about 35 nanometers, determined partly by the spectral amplification bandwidth of an EDFA amplifier, in which multiple wavelengths may be simultaneously transmitted. All else being equal, for a WDM network containing a number N wavelengths, the data transmission capacity of the link is increased by a factor of N. Depending on the specifics of a WDM network, the wavelength multiplexing into a common fiber is typically accomplished with devices employing a dispersive element, an arrayed waveguide grating, or a series of thin-film filters. At the receiver of a WDM system, the multiple wavelengths can be spatially separated using the same types of devices that performed the multiplexing and then separately detected and output in their original electrical data streams.

Dense WDM (DWDM) systems are being designed in which the transmission spectrum includes 40, 80, or more wavelengths with wavelength spacing of less than 1 nanometer. Current designs have wavelength spacing of between 0.4 and 0.8 nanometer, or equivalently a frequency spacing of 50 to 100 GHz respectively. Spectral packing schemes allow for higher or lower spacing, dictated by economics, bandwidth, and other factors. Other amplifier types, for example Raman, that help to expand the available WDM spectrum are currently being commercialized. However, the same issues about signal degradation and OEO regeneration exist for WDM as with non-WDM fiber links. The expense of OEO regeneration is compounded by the large number of wavelengths present in WDM systems.

Modern fiber optic networks are evolving to be much more complicated than the simple point-to-point "long haul" systems described above. Instead, as fiber optic networks move into the regional, metro, and local arenas, they increasingly include multiple nodes along the fiber span, and connections between fiber spans (e.g., mesh networks and interconnected ring networks) at which signals received on one incoming link can be selectively switched between a variety of outgoing links, or taken off the network completely for local consumption. For electronic links, or optical signals that have been detected and converted to their original electrical form, conventional electronic switches directly route the signals to their intended destination, which may then include converting the signals to the optical domain for fiber optic transmission. However, the desire to switch fiber optic signals while, still in their optical format, thereby avoiding expensive OEO regeneration to the largest extent possible, presents a new challenge to the switching problem. Purely optical switching is generally referred to as all-optical or OOO switching optical/optical (OOO).

Switching

In the most straightforward and traditional fiber switching approach, each network node that interconnects multiple fiber links includes a multitude of optical receivers which convert the signals from optical to electrical form, a conventional electronic switch which switches the electrical data signals, and an optical transmitter which converts the switched signals from electrical back to optical form. In a WDM system, this optical/electrical/optical (OEO) conversion must be performed by separate receivers and transmitters for each of the W wavelength components on each fiber. This replication of expensive OEO components is currently slowing the implementation of highly interconnected mesh WDM systems employing a large number of wavelengths.

Another approach for fiber optic switching implements sophisticated wavelength switching in an all-optical network. In a version of this approach that may be used with the present invention, the wavelength components W from an incoming multi-wavelength fiber are demultiplexed into different spatial paths. Individual and dedicated switching elements then route the wavelength-separated signals toward the desired output fiber port before a multiplexer aggregates the optical signals of differing wavelengths onto a single outgoing fiber. In conventional fiber switching systems, all the fiber optic switching elements and associated multiplexers and demultiplexers are incorporated into a wavelength selective switch (WSS), which is a special case of an enhanced optical cross connect (OXC) having a dispersive element and wavelength-selective capability. Additionally, such systems may incorporate lenses and mirrors which focus light and lenslets which collimate such light.

Advantageously, all the fiber optic switching elements can be implemented in a single chip of a micro electromechanical system (MEMS). The MEMS chip generally includes a two-dimensional array of tiltable mirrors which may be separately controlled. U.S. Pat. No. 6,097,859 to Solgaard et al., incorporated herein in its entirety, describes the functional configuration of such a MEMS wavelength selective switch (WSS), which incorporates a wavelength from an incoming fiber and is capable of switching wavelength(s) to any one of multiple outgoing fibers. The entire switching array of several hundred micro electromechanical system (MEMS) mirrors can be fabricated on a chip having dimension of less than one centimeter by techniques well developed in the semiconductor integrated circuit industry.

Solgaard et al. further describes a large multi-port (including multiple input M and multiple output N ports) and multi-wavelength WDM wavelength selective switch (WSS), accomplishing this by splitting the WDM channels into their wavelength components W and switching those wavelength components W. The Solgaard et al. WSS has the capability of switching any wavelength channel on any input port to the corresponding wavelength channel on any output fiber port. Again, a wavelength channel on any of the input fibers can be switched to the same wavelength channel on any of the output fibers. Each MEMS mirror in today's WDM wavelength selective switch is dedicated to a single wavelength channel whether it tilts about one or more axis.

A complex WDM or white-light network is subject to many problems. For example, the different optical signals which are propagating on a particular link or being optically processed may have originated from different sources across the network. Also, in a WDM system, the WDM wavelength output power may vary from transmitter to transmitter because of environmental changes, aging, or differences in power injected into the WDM stream. Different optical sources for either a WDM or white-light system are additionally subject to different amounts of attenuation over the extended network. Particularly, for a wavelength-routed transparent network, the WDM spectrum on a given fiber contains wavelength components which generally have traversed many diverse paths from different sources and with different losses and different impairment accumulation, such as degradation of the optical signal-to-noise ratio or dispersion broadening. Further, wavelength multiplexing and demultiplexing usually rely on optical effects, such as diffraction or waveguide interference, which are very sensitive to absolute wavelength, and which cannot be precisely controlled. Additionally, the prior art is disadvantageously limited to complex multi input and output fiber port, single dedicated wavelength channel MEMS mirrors, and multi wavelength WDM cross-connect switches.

EDFAs or other optical amplifiers may be used to amplify optical signals to compensate loss, but they amplify the entire WDM signal and their gain spectrum is typically not flat. Therefore, measures are needed to maintain the power levels of different signals at common levels or at least in predetermined ratios.

Monitoring

Monitoring of the WDM channels is especially important in optical telecommunication networks that include erbium doped fiber amplifiers (EDFAs), because a power amplitude change in one channel may degrade the performance of other channels in the network due to gain saturation effects in the EDFA. Network standard documents, such as the Bellcore GR-2918, have been published to specify wavelength locations, spacing and signal quality for WDM channels within the networks. Network performance relative to these standards can be verified by monitoring wavelength, power and signal-to-noise ratio (SNR) of the WDM channels.

A multi-wavelength detector array or spectrometer may be integrated into the free space of a WSS and utilized to monitor wavelength channels, power and signal-to-noise ratio (SNR) in telecommunication networks. Typically, a portion of the WDM channels are diverted by a splitter or partially reflective mirror to an optical power monitor or spectrometer to enable monitoring of the WDM channels. Each MEMS mirror in today's WDM wavelength selective switch (WSS) is dedicated to a single wavelength channel. Whether it tilts about one or more axes, such mirror may be used to control the amount of optical power passing through WSS for such single wavelength channel. In addition, a detector array or spectrometer may be external to the free space of the WSS or OXC, and may be utilized to monitor white light (combined wavelength channels) power, and signal-to-noise ratio of optical signal via input/output fiber port taps or splitters. More specifically, the prior art consists of costly large two-dimensional detector arrays or spectrometer utilized to monitor multiple input or output wavelength channels, power and signal-to-noise ratio.

Monitoring and switching are part of a feedback loop required to achieve per-wavelength insertion loss control and such systems comprise three classic elements: sensor for monitoring, actuator for multi wavelength switching and attenuating, and processor for controlling wavelength switching, selection and equalization. The actuator in today's WSS products is typically a MEMS-based micromirror or a liquid crystal blocker or reflector. The sensor is typically a modular optical power monitor, comprising a mechanical filter for wavelength selection and a photodetector. Depending on the system, the three elements can be co-located in the same device, or can exist as separate standalone cards connected by a backplane.

In general, higher levels of integration of the sensor, actuator, and processor are attractive from a size, cost, speed, and simplicity of operation standpoint. The proposed new solution reaps these benefits because of a very high level of integration.

Therefore, it is readily apparent that there would be a recognizable benefit from a cost effective fiber optic switch with dual channel selector for all-optical communication networks in which each switching node demultiplexes the aggregate multi-wavelength WDM signal from input fibers into its wavelength components, spatially switches one of many single-wavelength components from different input fibers for each wavelength channel, and wherein such switch multiplexes the switched wavelength components to one output fiber for retransmission; and wherein such wavelength components power may be monitored and varied by controllable attenuation, resulting in a higher level of integration of the sensor, actuator, and processor and enabling multiple switches in a single device capable of utilizing common optical components.

BRIEF DESCRIPTION

Briefly described in a preferred embodiment, the present invention overcomes the above-mentioned disadvantages and meets the recognized need for such an invention by providing an optical system comprising two or more mixed optical switches co-packaged together comprising discrete sets of fiber ports, each set configured either with N input fiber ports and 1 output fiber port (N×1 optical switch) or with 1 input fiber port and N output fiber ports (1×N optical switch), and wherein λn from said input fiber ports is focused on λn mirror via the use of shared free space optics; such as one or more shared beam steering elements, one or more dispersive elements, and one or more optical elements, wherein said one or more steering elements steers one or more λn from any point in the optical path to any other point; and one or more discrete arrays of micro electromechanical system (MEMS) mirrors in a shared array, wherein at least a first array of MEMS mirrors is utilized to select and switch selected wavelengths from the input fiber ports to an output fiber port of the same set, and wherein at least a second array of MEMS mirrors using and sharing the same free space optics as the first MEMS array is utilized to select and switch selected wavelengths between input and output ports belonging to another set; and wherein output fiber ports from one set can be coupled to input ports of other sets, thus, enabling a cost effective, high level of integration one or more N×M co-packaged optical switching system, wherein N and M are greater than or equal to 1.

According to its major aspects and broadly stated, the present invention in its preferred form is a discrete fiber optic switch enabled by the beam steering element (BSE), comprising input fiber ports, free space optics (FSO) (including but not limited to various lenses, a dispersive element for spatially separating/combining the wavelength components of the aggregate multi-wavelength WDM signal, and the BSE), a first array of MEMS mirrors whose individual mirrors correspond to unique wavelengths operating within the WDM network (for example, mirror #1 corresponding to λ #1 and receiving λ #1 from all input fiber ports, wherein by moving moveable MEMS mirror #1, the preferred optical path is generated via beam steering between an input fiber port and the output fiber port of the N×1 configuration, this being repeated independently for every wavelength in each optical switch of the optical system and for every MEMS mirror), wherein such switch multiplexes the MEMS-steered wavelength components from various input fiber ports to one output fiber port for re-transmission, and wherein the above switching functionality, whether in duplicate or variation thereof, is repeated one or more times within the same physical switching device (i.e., common housing) using one or more additional arrays of MEMS mirrors while simultaneously sharing the other free space optic (FSO) components described above. Analogously, the light direction may be arbitrarily reversed from the above description so that wavelengths may be switched from a single input fiber port to any of a number of output fiber ports (1×N) without restriction on which wavelength is routed to which output port. Alternatively, there may be a mixture of multiple input fiber ports and multiple output fiber ports, with the restriction that there cannot be an arbitrary switching assignment of input ports to output ports within a set or optical switch for any given wavelength.

Accordingly, a feature and advantage of the present invention is its ability to focus wavelength components of a set from any or all of the input fiber ports onto a single MEMS mirror, enabling such mirror to select the input port wavelength component to be switched to the output fiber port in an N×1 switch, and to do so for manifold switches operating independently and in parallel while sharing all FSO components within the same physical housing.

Another feature and advantage of the present invention is its ability to focus wavelength components from the input fiber ports onto MEMS mirrors, enabling such mirror to select the output fiber port wavelength component to be switched to the output fiber port in a 1×N switch by simple movement, rotation or tilt of the mirror, wherein the MEMS mirrors are only required to tilt around a single common axis of rotation in order to execute switching commands.

Still another feature and advantage of the present invention is its ability to provide one or more taps or splitters for coupling power from input and/or output fiber ports.

Yet another feature and advantage of the present invention is its ability to utilize switches to provide monitoring input fiber ports utilized to receive tapped or other multi-wavelength WDM signals for the purpose of optical power or other quality-of-signal measurements.

Yet another feature and advantage of the present invention is its ability to reuse the same free space optics (various lenses, a dispersive element for spatially separating/combining the wavelength components of the aggregate multi-wavelength WDM signal, and the BSE) for manifold switches existing in the same physical housing.

Yet another feature and advantage of the present invention is its ability to provide an optical path between manifold switches (i.e., an optical bridge) to create a form of M×N switch, wherein in a preferred embodiment the optical bridge may be formed with a simple mirror placed at the BSE between two switches in the manifold switch.

Yet another feature and advantage of the present invention is its ability to provide for ganged switching functionality of the manifold switch, wherein the MEMS mirrors, corresponding to a certain WDM wavelength, are moved, rotated or tilted synchronously between all arrays of MEMS mirrors in the manifold switch, wherein the same switch state is created for all switches in the manifold switch on a per wavelength basis.

Yet another feature and advantage of the present invention is flexibility wherein an almost limitless range of configurations may be obtained, wherein configuration variations may include number of input and output fiber ports, number of switches in the manifold, ganged switching operations, bridging between switches in the manifold, number and spacing of wavelengths in the WDM system, and the like.

Yet another feature and advantage of the present invention is its ability to be calibrated such that systemic effects are canceled and the switching performance improved, wherein systemic effects to be canceled may include, for example, imperfect MEMS mirrors, assembly and component imperfections, environmental effects, and the like, and wherein the obtained calibration data is stored in an electronic memory that can be accessed in real-time in support of switching control and command.

Yet another feature and advantage of the present invention is its ability to utilize a second array, or more, of MEMS mirrors for selecting one wavelength component from any of the wavelength components of any of the tapped ports for each wavelength of the multi-wavelength WDM signal, and wherein such switch directs the selected wavelength component to one monitoring output fiber port for optical power monitoring.

Yet another feature and advantage of the present invention is its ability to provide more MEMS mirrors in an array than there are wavelengths in the WDM network such that various spectral characteristics of the aggregate multi-wavelength WDM signal may be measured when utilizing the switching functionality for monitoring purposes. For example, by placing MEMS mirrors between the mirrors designated for WDM wavelengths a measure of inter-wavelength noise can be obtained, leading to a form of signal-to-noise measurement. Further, by adding even more mirrors to the MEMS array the spectral location of the various multi-wavelength components of the WDM signal may be verified, leading to a form of absolute wavelength measurement.

Yet another feature and advantage of the present invention is its ability to utilize a multi-mode fiber in the fiber array leading to the photodetector when utilizing the switching functionality for monitoring purposes, wherein the larger core of a multimode fiber increases the confidence that the true power of the intended measurement is being captured with sufficient margin for MEMS mirror pointing errors, environmental and aging effects, and the like, wherein the coupling of light from free space into a fiber is vastly less sensitive to positional errors for a multi-mode fiber than for the single-mode fibers typically used for telecom/datacom networks.

Yet another feature and advantage of the present invention is its ability, during signal monitoring, to record the power levels during signal measurement as the associated MEMS mirror is swept through a range of angle on either side of the expected peak power coupling angle, wherein the peak signal recorded during this sweep, or the peak of a curve-fit through the data points so taken, represents the truest measure of the intended signal, wherein the detected peak signal is maximally isolated from the potentially detrimental effects of MEMS mirror pointing errors, environmental and aging effects of the system, and the like, wherein this sweep and peak-detect approach is aided by the use of a multi-mode fiber in the fiber array leading to the photodetector.

Yet another feature and advantage of the present invention is its ability to provide one or more fiber ports carrying aggregate multi-wavelength WDM signals for the purpose of monitoring said WDM signals, wherein the origin of the WDM signals is arbitrary.

Yet another feature and advantage of the present invention is its ability to self-monitor the aggregate multi-wavelength WDM signals at the input and/or output fiber ports of a manifold switch.

Yet another feature and advantage of the present invention is its ability to monitor signals within fibers, wherein signals to be monitored may be produced by wideband optical power taps placed on the fibers to be monitored, wherein other approaches make only approximate measurements of signals by sampling them in free-space and therefore neglecting free-space-to-fiber coupling effects.

Yet another feature and advantage of the present invention is its ability, with regard to signal monitoring, to be calibrated such that systematic effects are canceled and the measurement accuracy increased, wherein systematic effects to be canceled may include the path-dependent insertion loss of various optical paths through the system, imperfect MEMS mirrors, tap device characteristics, assembly and component imperfections, environmental effects, and the like, wherein so obtained calibration data is stored in an electronic memory that can be accessed in real-time in order to provide corrections to signal measurements in real-time.

Yet another feature and advantage of the present invention is its ability to utilize the measurement of power levels of WDM wavelengths obtained via the described self-monitoring functionality as a form of feedback to the 1×N or N×1 switch, wherein the insertion loss of each wavelength through the switch may be actively adjusted to correct for mirror movement errors, environmental effects, and the like, or similarly to produce desired spectral distributions of the aggregate multi-wavelength WDM signals (for example, making the power levels of all wavelengths equal via the selective attenuation of every wavelength), wherein the insertion loss of each wavelength is controlled by the movement, rotation or tilting of the associated MEMS mirror in the 1×N or N×1 mirror array, wherein movement, rotation or tilting the MEMS mirror away from its optimal angle of lowest insertion loss steers the free space beam arriving at the output port(s) and therefore misaligns the beam with respect to the output fiber port(s) and introduces progressively larger insertion loss as the MEMS mirror is further tilted.

Yet another feature and advantage of the present invention is its compatibility with using MEMS mirrors that can move, rotate or tilt around two independent axes of rotation, wherein the primary tilt axis is required for fiber-to-fiber switching and the secondary tilt axis my be used for auxiliary purposes, wherein such auxiliary uses of the secondary tilt axis may include insertion loss control, correction of component and assembly imperfections, environmental and aging effects, and the like.

Yet another feature and advantage of the present invention is its ability to provide a means of power equalization, or other arbitrary spectral power distribution, of wavelengths wherein many beams from diverse sources are interchanged among network fibers.

Yet another feature and advantage of the present invention is its ability to provide uniformity of power levels across the WDM spectrum, or other arbitrary spectral distribution, so that dynamic range considerations at receivers and amplifier, non-linear effects, and cross talk impairments can be minimized.

Yet another feature and advantage of the present invention is its ability to provide dynamic feedback control since the various wavelengths vary in intensity with time and relative to changes in optical channel routing history among the components.

Yet another feature and advantage of the present invention is its ability to provide a fiber optic switch with a means of power equalization of wavelengths, and thus provide an aggregate multi-wavelength WDM signal enabling compensation for internal variations of optical characteristics, misalignments, both integral to the device and as a result of both manufacturing and environmental variation, non-uniformity, aging, and of mechanical stress encountered in the switch.

Yet another feature and advantage of the present invention is its ability to provide wavelength switching and monitoring in an optical network while reducing the cost and complexity of such optical network.

Yet another feature and advantage of the present invention is its applicability for non-WDM, or "white light" switching devices by the simple removal of the dispersive element and the subsequent simplification of the MEMS array to a single MEMS mirror for each optical fiber in the manifold system.

These and other features and advantages of the present invention will become more apparent to one skilled in the art from the following description and claims when read in light of the accompanying drawings.

BRIEF DESCRIPTION OF THE DRAWINGS

The present version of the invention will be better understood by reading the Detailed Description of the Preferred and Alternate Embodiments with reference to the accompanying drawing figures, in which like reference numerals denote similar structure and refer to like elements throughout, and in which.

DETAILED DESCRIPTION OF THE PREFERRED AND SELECTED ALTERNATIVE EMBODIMENTS

In describing the preferred and selected alternate embodiments of the present version of the invention, as illustrated in FIGS. 1-23, specific terminology is employed for the sake of clarity. The invention, however, is not intended to be limited to the specific terminology so selected, and it is to be understood that each specific element includes all technical equivalents that operate in a similar manner to accomplish similar functions.

Figure 1:
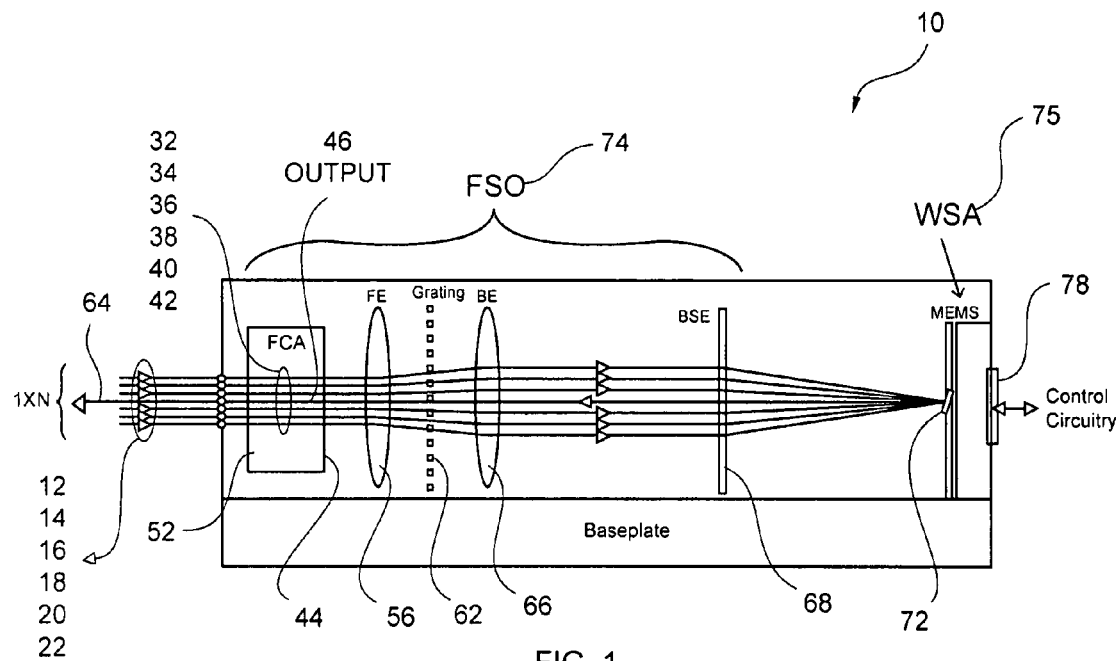
FIG. 1 is a schematic illustration of a six input port by one output fiber port wavelength selective switch (WSS) switch according to an embodiment of the present invention.

Referring now to FIG. 1, there is illustrated a schematic illustration of a six input fiber port by one output fiber port wavelength selective switch 10. However, it is emphasized that this 6×1 embodiment is illustrated only for simplicity, and that by increasing the number of input fiber ports by N, then an N×1 switch 10 is contemplated herein, wherein N represents the number of input fiber ports. Preferably, wavelength selective switch 10 can be operated in either direction, wherein N of N×1 represents N input fiber ports and one output fiber port, or one input port and N output fiber ports. In the preferred 6×1 wavelength selective switch 10 shown in FIG. 1, six input fiber ports 12, 14, 16, 18, 20, 22, and one output fiber port 64 are optically coupled to fiber concentrator array (FCA) 52 (fiber port concentrator), preferably in a linear alignment, wherein preferably all-fibers (alternatively planar waveguides) 32, 34, 36, 38, 40, 42, and 46 are used to bring the respective signals of fiber ports 12, 14, 16, 18, 20, 22 and 64 closer together on output face 44 of fiber concentrator 52 (fiber port concentrator) adjacent the optics. Further, planar waveguides 32, 34, 36, 38, 40, 42, 46 are also preferably used to output the signals in parallel in a predominantly linearly spaced grid, wherein planar waveguides 32, 34, 36, 38, 40, 42 have curved shapes (as shown in FIG. 7) within fiber concentrator 52 and are optically coupled to input fiber ports 12, 14, 16, 18, 20, 22. It is contemplated herein, that a signal, also known as optical signal, may comprise multi-wavelength WDM signals and such signals travel in free space (as beams), fiber, waveguides, and other signal carriers.

Although, other coupling arrangements are possible, preferred fiber concentrator 52 offers some additional advantages over other coupling arrangements. For example, its planar waveguides 32, 34, 36, 38, 40, 42 concentrate and reduce the spacing between input fiber ports 12, 14, 16, 18, 20, 22 from 125 micrometers, representative of the fiber diameters, to the considerably reduced spacing of, for example, 40 micrometers, which is more appropriate for the magnifying optics of switch 10. Each of waveguides 32, 34, 36, 38, 40, 42 is preferably coupled to the respective 12, 14, 16, 18, 20, 22 input fiber port. Waveguides 32, 34, 36, 38, 40, 42 preferably extend along a predominately common plane directing the multi wavelength signals to output in free space and to propagate in patterns having central axis which are also co-planar.

The free-space beams output by waveguides 32, 34, 36, 38, 40, 42 of fiber concentrator 52 are preferably divergent and preferably have a curved field. For simplicity, this discussion will describe all the beams as if they are input beams, that is, output from fiber concentrator 52 to free-space optics (FSO) 74. The beams are in fact, optical fields coupled between optical elements. As a result, the very same principles as those discussed as input beams apply to those of the beams that are output beams which eventually reenter fiber concentrator 52 for transmission onto the network.

The beams output from fiber concentrator 52 into the free space of wavelength selective switch 10 preferably pass through front end optics (FE) 56. Outputs of waveguides 32, 34, 36, 38, 40, 42 of face 44 preferably are placed at or near the focal point of front end optics 56. Front end optics 56 preferably accepts the beams coming from or going to all fibers via input 12, 14, 16, 18, 20, 22 and output 64 fiber ports. For beams emerging from a fiber or input port, front end optics 56 preferably captures, focuses, conditions, projects and/or collimates the light in preparation for spectral dispersion by dispersive element 62. The reverse of this happens for beams converging toward a fiber; that is, the principles of operation are identical in either case, and independent of the direction of the light. It should be noted that common dispersive elements do not operate exactly as shown in FIG. 1, more specifically the input and diffracted beams do not lie in the same plane as shown in FIG. 1.

Figure 8:
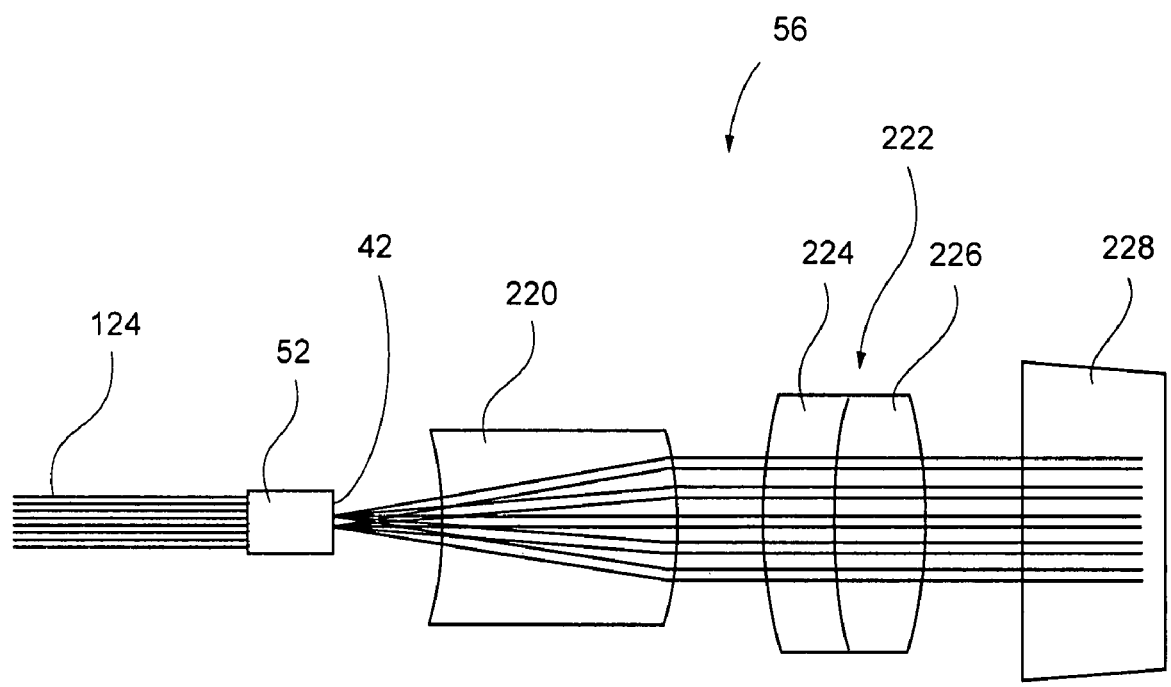
FIG. 8 is a schematic view of the front end optics included in the WSS of FIGS. 1 and 2.

Although a single lens is illustrated in FIG. 1, front end optics 56 may generally consist of two or more lenses and/or mirrors or a combination of the same, and may become progressively sophisticated as the demands of wavelength selective switch 10 increases (e.g., the number of fibers, the range of wavelengths, the number of input and output fiber ports, the spacing of the MEMS mirrors, etc.). For example, in a two lens front end optics 56, the first lens (closest to the fibers or input fiber ports) may be used to produce customary flat-field and telecentric beams that easily accommodate simple fiber arrays or fiber concentrator 52, and the second lens may perform the majority of the collimation task (as shown in FIG. 8). As the demands of wavelength selective switch 10 increases, front end optics 56 may further employ advanced features, such as aspheric optical surfaces, achromatic designs, and the like. Unlike traditional approaches wherein a separate lens must be critically aligned to every fiber, front end optics 56 described herein are preferably common to every fiber, thereby enabling a realization of significant savings in assembly time and cost relative to previously known switch systems.

The collimated beams exiting front end optics 56 propagate substantially within a common plane, and are incident upon dispersive element 62, a wavelength dispersive element, wherein dispersive element 62 preferably comprises grating lines extending perpendicular to the principal plane of wavelength selective switch 10. The beams may overlap when they strike dispersive element 62, wherein dispersive element 62 preferably separates the input port beams into corresponding sets of wavelength-separated beams, $\lambda 1$ through $\lambda n$ (wavelengths) for each input port, where n is the number of wavelengths in each input port. Diffraction grating 62 angularly separates the multi-wavelength input beams into wavelength-specific sub-beams propagating in different directions parallel to the principal optical plane, or alternatively serves to recombine single-wavelength sub-beams into a multi-wavelength beam. Diffraction grating 62 is preferably uniform in the fiber direction, wherein the preferred uniformity allows use of dispersive element 62 for beams to and from multiple input and output fibers.

The line density of dispersive element 62 should preferably be as high as possible to increase spectral dispersion, but not so high as to severely reduce diffraction efficiency. Two serially arranged gratings would double the spectral dispersion. However, a single grating with a line density of approximately 1000 lines/millimeter has provided satisfactory performance. Diffraction grating 62 is preferably aligned so that the beam from front end optics 56 has an incident angle of preferably 54 degrees on grating 62, and the diffracted angle is about 63 degrees. The difference in these angles results in optical astigmatism, which may be compensated by placing a prism between front end optics 56 and dispersive element 62.

In brief, the diffraction efficiency of a grating is generally dependent on the characteristics of the polarization of the light with respect to the groove direction on the grating, reaching upper and lower diffraction efficiency limits for linear polarizations that are parallel p-polarization and perpendicular s-polarization to the grooves.

In addition, polarization sensitivity of the grating may be mitigated by introducing a quarter-wave plate (not shown) after dispersive element 62 or elsewhere in switch 10 whose optical axis is oriented at forty-five degrees to the dispersive element limiting diffraction efficiency polarization states described previously. It is contemplated herein that such quarter-wave plate may be placed elsewhere in switch 10. Preferably, every wavelength-separated sub-beam passes twice through the quarter-wave plate so that its polarization state is effectively altered from input to output fiber port. That is, dispersive element 62 preferably twice diffracts any wavelength-specific sub-beam, which has twice passed through the quarter-wave plate. For example, considering the two limiting polarization cases the sub-beam passes once with a first limiting polarization (for example, p-polarization) and once again with a polarization state that is complementary to the first polarization state (for example, s-polarization) from the perspective of dispersive element 62. As a result, any polarization dependence introduced by dispersive element 62 is canceled. That is, the net efficiency of dispersive element 62 will be the product of its S-state and P-state polarization efficiencies, and hence independent of the actual polarization state of the input light.

In the wavelength division multiplexing (WDM) embodiments of the invention, each input fiber port 12, 14, 16, 18, 20, 22 is preferably capable of carrying a multi-wavelength WDM optical signal having wavelengths $\lambda 1$ through $\lambda n$. Wavelength selective switch 10 is preferably capable of switching the separate wavelength components from any input port to planar waveguide 46 of fiber concentrator 52, which is preferably coupled to output fiber port 64. This architecture applies as well to a WDM reconfigurable add/drop multiplexer (ROADM), such as a 1×6 ROADM in which fiber ports 12, 14, 16, 18, 20, 22 are associated respectively with the input (IN) (fiber port 12), five (5) DROP ports (fiber ports 14, 16, 18, 20, 22), and output (OUT) (fiber port 64). Or, in the 6×1 ROADM, input disclosed is (IN) (fiber port 12), five (5) ADD ports (fiber ports 14, 16, 18, 20, 22), and output (OUT) (fiber port 64). In operation, fiber ports 14, 16, 18, 20, 22, (local ports) are switched to/from by wavelength selective switch 10, either are added (ADD) to the aggregate output (OUT) port 64 or dropped (DROP) from the aggregate input (IN) port 12.

Back end optics (BE) 66 projects the wavelength-separated beams onto beam steering element (BSE) 68. Back end optics 66 creates the "light bridge" between dispersive element 62 and beam steering element 68 to switching mirror array 72. Considering the case of light diffracting from dispersive element 62 and traveling toward back end optics 66, such back end optics 66 preferably captures the angularly (versus wavelength) separated beams of light, which is made plural by the number of fibers, and wherein back end optics 66 create parallel beams of light. The parallel beams are obtained via a preferred telecentric functionality of back end optics 66. In addition, because all beams are preferably at focus simultaneously on the flat MEMS plane of switching mirror array 72; back end optics 66 preferably performs with a field-flattening functionality. After light reflects off of a MEMS mirror and back into back end optics 66, the reverse of the above occurs; the principles of operation are identical in either case and are independent of the direction of the light. Back end optics 66 preferably captures, focuses, conditions, projects and/or collimates the light in preparation for switching by switching mirror array 72. The reverse of this happens for light beams converging toward a fiber; that is, the principles of operation are identical in either case, and independent of the direction of the light.

Although a single lens is illustrated in FIG. 1, back end optics 66 may generally consist of two or more lenses and/or mirrors or combinations of the same, and may become progressively sophisticated as the demands of wavelength selective switch 10 increases (e.g., the number of fibers, the range of wavelengths, the number of input and output fiber ports, the spacing of the MEMS mirrors, etc.). The focal length of back end optics 66 (or the effective focal length in the case of multiple lenses) is preferably determined from the rate of angular dispersion versus wavelength of dispersive element 62 and the desired mirror spacing of switching mirror array 72. If the angular separation between two neighboring wavelengths is denoted by A and the spacing between their associated MEMS micro-mirrors is denoted by S, then the focal length of back end optics 66 (F) is approximated by $F=S/\tan(A)$. Because the angular dispersion of common gratings is relatively small, and/or as the spectral separation between neighboring wavelengths is decreased, then back end optics 66 focal length may become relatively large. Preferably, however, a physically compact optical system may be retained by providing back end optics 66 with a telephoto functionality, thereby reducing the physical length of back end optics 66 by a factor of two or more. A three-lens system is generally sufficient to provide all of the functionalities described above, and the lenses themselves can become increasingly sophisticated to include aspheric surfaces, achromatic design, etc., as the demands of wavelength selective switch 10 increase (e.g., depending on the number of fibers, the range of wavelengths, the number of input and output fiber port, the spacing of the MEMS mirrors, etc.). The focal length calculations set forth here with respect to the back end optics 66 are applicable to the front end optics 56 as well.

Such a preferred multi-lens back end optics 66 system, by virtue of its increased degrees-of-freedom, additionally allows for active optical adjustments to correct for various lens manufacturing tolerances and optical assembly tolerances that otherwise would not be available. Beam steering element 68, although physically existing in the beam path of back end optics 66, is preferably designed utilizing passive monolithic element containing multiple prisms or lenses, as well as stacked lenses, reflective segmented prism elements and the like or combinations of the same and preferably functions almost independently of back end optics 66.

Figure 3A:
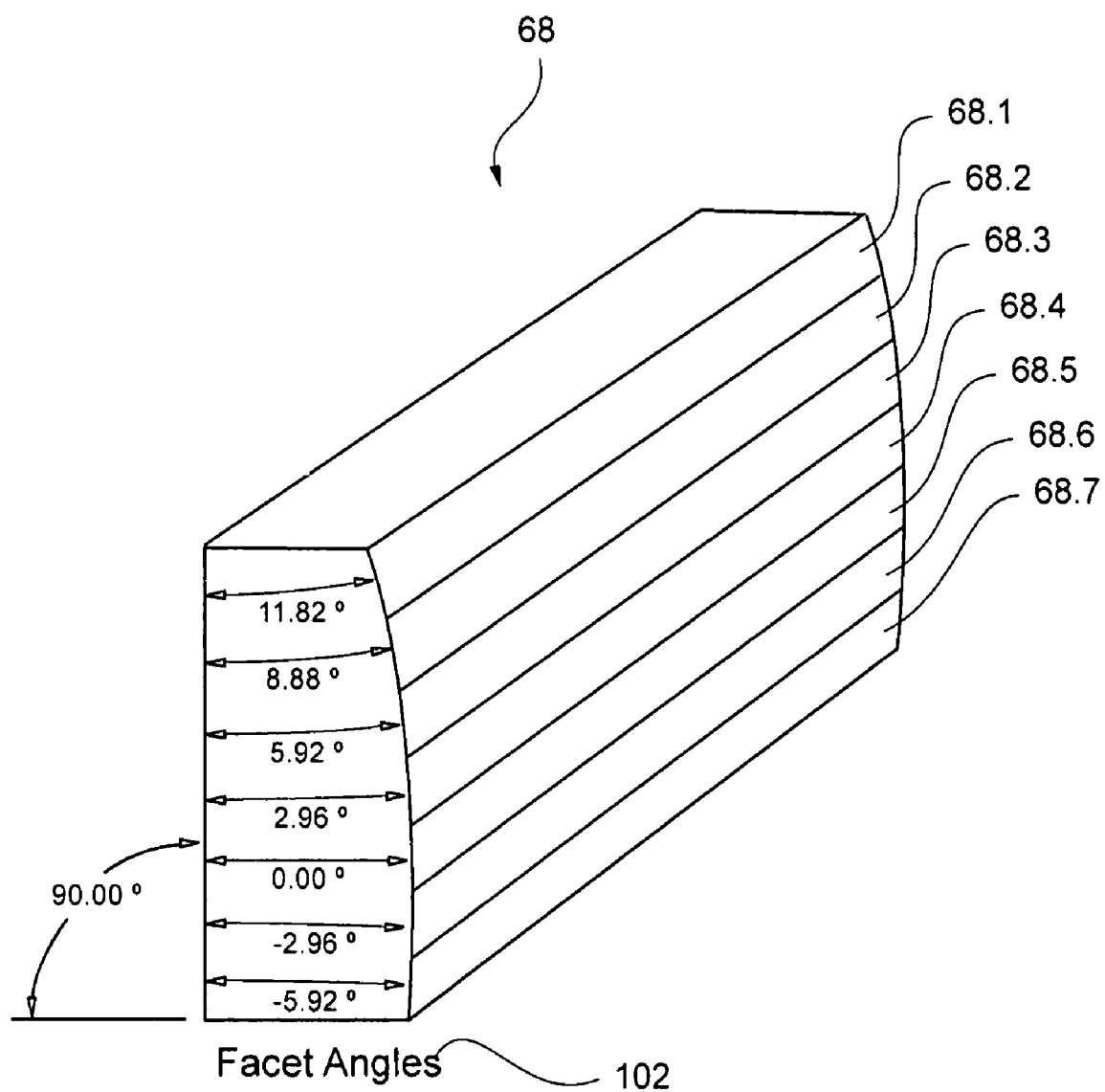
FIG. 3A is a schematic illustration of an optical beam steering element included in the WSS of FIG. 1.
Figure 14:
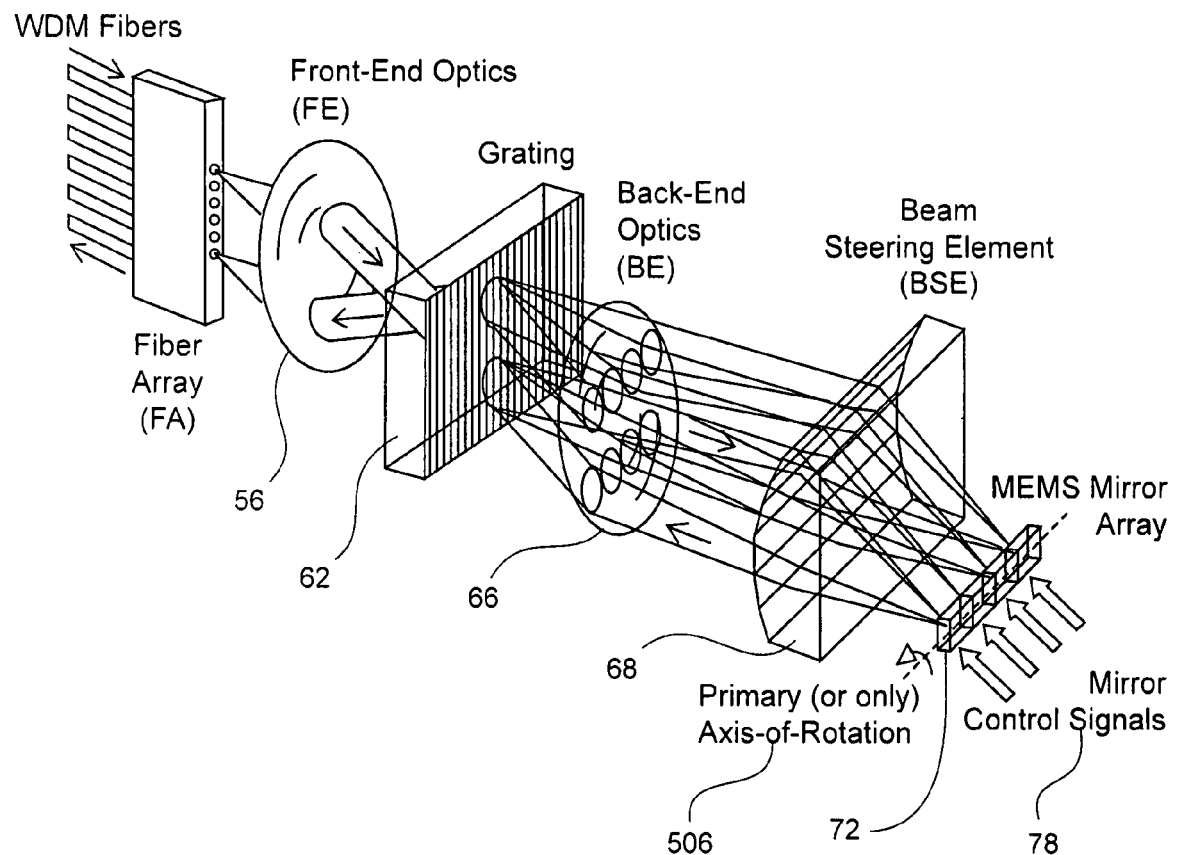
FIG. 14 is a three-dimensional schematic of a wavelength selective switch according to an alternate embodiment of the present invention.
Figure 15:
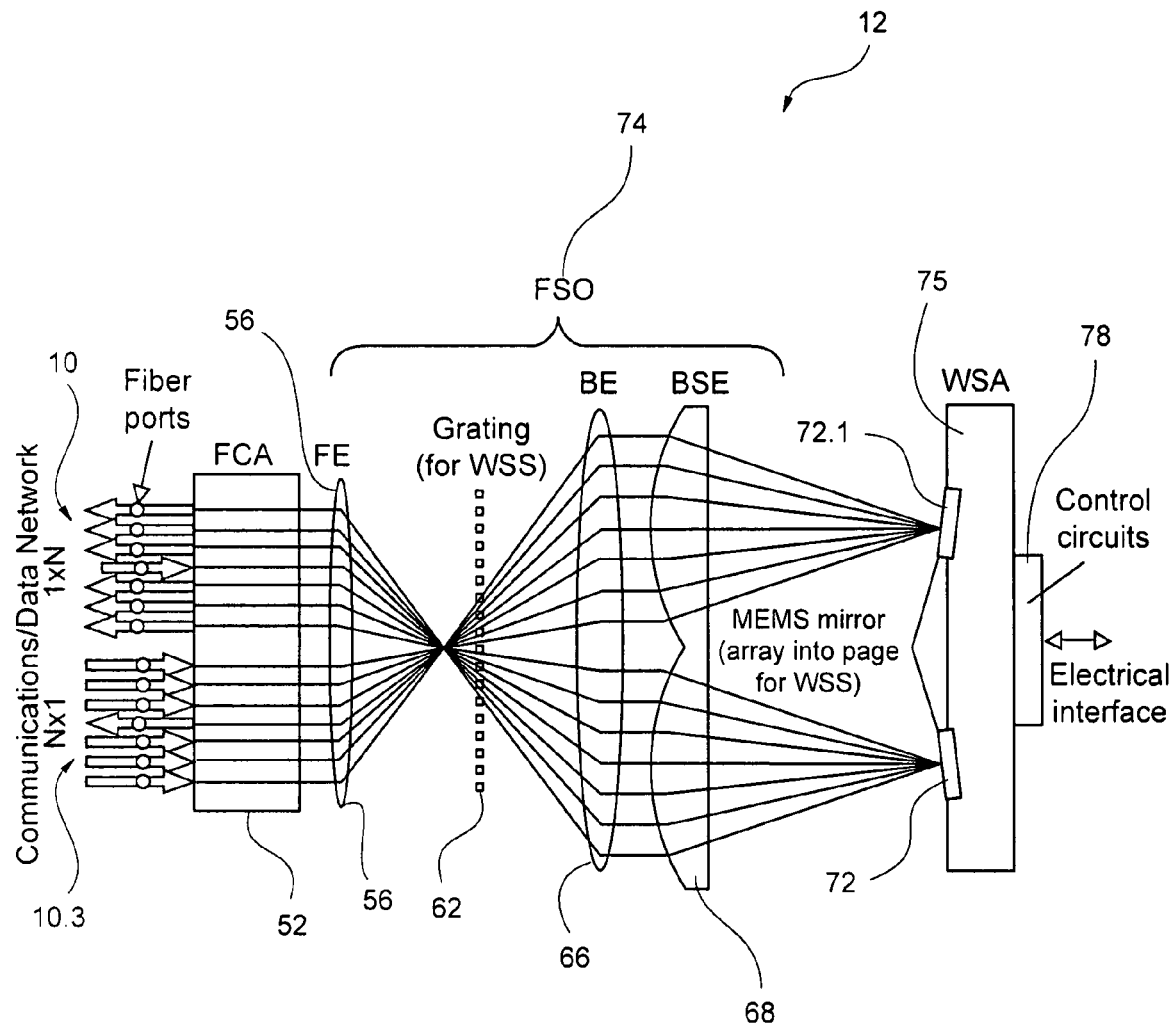
FIG. 15 is a schematic illustration of a wavelength cross-connect with BSE-based architecture for creating manifold switches within the same package switch according to an embodiment of the present invention.

Referring now to FIG. 3A, there is illustrated a schematic illustration of a preferred optical beam steering element included in the WSS of FIG. 1 (the number of segments or facets varies with the number of signals present in the WSS). Beam steering element 68 preferably refracts wavelength-separated beams from back end optics 66 and steers such beams onto switching mirror array 72 based on the refractive indices of each segment 68.1-68.7, whether focusing all $\lambda n$ beams on a $\lambda n$ mirror of switching mirror array 72 or focusing some $\lambda n$ beams onto one mirror and other $\lambda n$ beams on another mirror or a mirror in a different row. Beam steering element 68 (or segmented prism element one possible type of steering element) preferably refracts $\lambda n$ from each input port 12, 14, 16, 18, 20, 22 onto $\lambda n$ mirror of switching mirror array 72 (as shown in FIG. 9C) of switching mirror array 72 assigned to $\lambda n$. For example, preferably $\lambda 1$ mirror of switching mirror array 72 has $\lambda 1(12)$-$\lambda 1(22)$ from all input fiber ports 12-22 projected onto $\lambda 1$ mirror surface via beam steering element 68, and by moving, rotating or tilting λ1 mirror of MEMS switching mirror array 72, wavelength selective switch 10 preferably switches one selected λ1 (12-22) from input fiber ports 12-22 to output fiber port 64 and blocks the remaining unselected λ1(s) from input fiber ports 12-22, and so forth for λ2-λn. Each λn mirror of switching mirror array 72, in this example, preferably has five input beams projected simultaneously onto the surface of such mirror, all at wavelength λn, wherein those five beams are preferably demultiplexed and focused by free space optics 74 from input fiber ports 12, 14, 16, 18, 20 respectively. It should be recognized that utilizing beam steering element 68 enables refracting and/or steering of multiple wavelengths onto a single mirror from one or more input fiber ports 12-22 or refracting light to any arbitrary point rather than prior art switches, which use lenses or mirrors to focus individual wavelengths to individual dedicated mirrors based on one focal point. Further, it should be recognized that utilizing beam steering element 68 enables multiple N×1 switches to be packaged as a single unit as shown in FIGS. 14 and 15. Still further, it should be recognized that utilizing beam steering element 68 enables the potential elimination of lenslets for each optical fiber port, thereby reducing the number of elements and the overall cost of the switch.

Figure 3B:
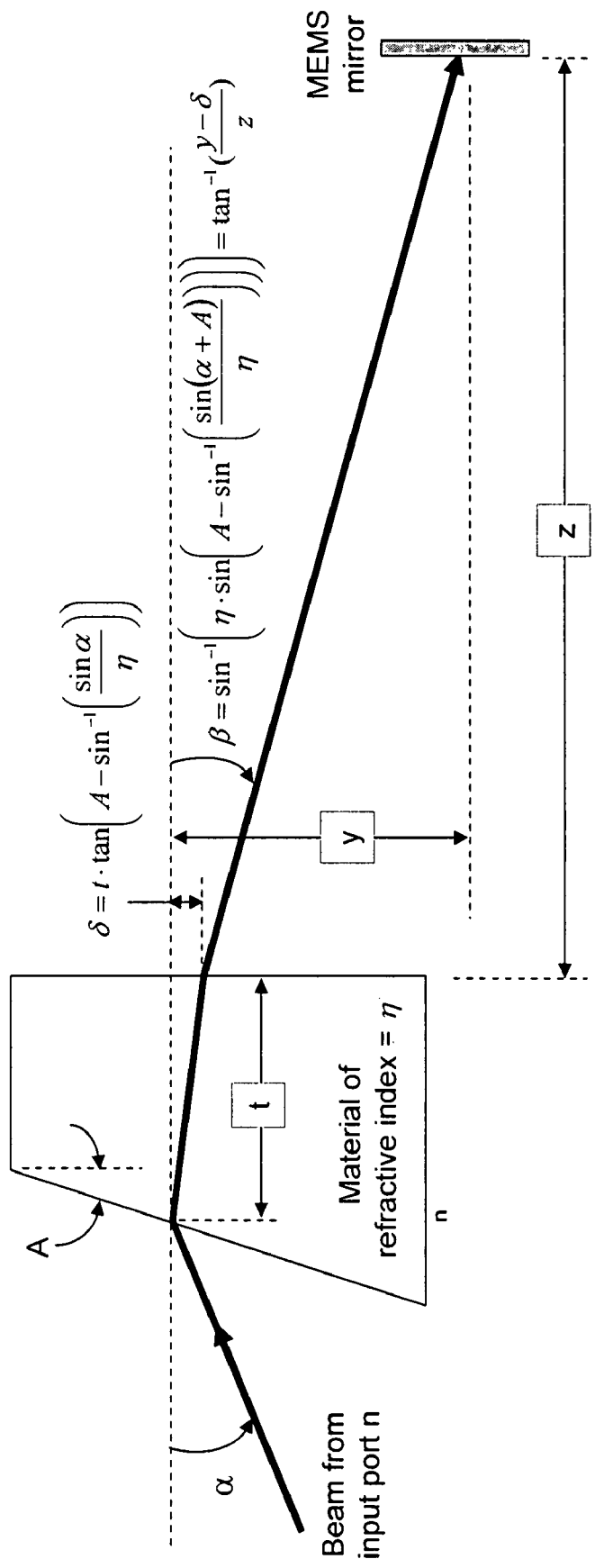
FIG. 3B is a schematic illustration of an optical beam steering element and facet angle equations entitled "Light Deflection Principle and Equations"

Beam steering element 68 preferably is manufactured from fine-anneal glass with class-zero bubble imperfections whose facets are very finely polished and are coated with anti-reflection material. Further, the type of glass may be chosen to have certain optical properties at the desired wavelengths of operation, including but not limited to optical transparency and refractive index. The angular deflection imparted by each facet 68.1-68.7 of beam steering element 68 is preferably a function of both the angle of the facet and the refractive index of the glass as shown in FIG. 3B—Beam steering Element 68 "Light Deflection Principles and Equations"; hence, in principle beam steering element 68 can be made from a wide variety of glass types. This allows further optimization of the glass material per the criteria of cost, ease of fabrication, etc. As an example, the type of glass known as BK7 is a common high-quality, low cost glass that is preferably suitable for this application.

Another criterion for glass selection may be its change in optical properties relative to temperature. Since the refractive index of all materials changes with temperature, which could in turn produce undesirable changes in the effective facet angles 102 produced by beam steering element 68, then for demanding applications, a glass with a very low thermo-optic coefficient may be chosen at the desired operational temperature range. For example, the common glasses known as K5 and BAK1 have very low thermo-optic coefficients at room temperature. In addition to the precision polishing of the beam steering element 68 from bulk glass, beam steering element 68 may also be fabricated using castable glass materials, such as sol-gel. Prism elements fabricated in such fashion should exhibit improved performance consistency compared with those fabricated using traditional polishing techniques. The materials for fabrication of beam steering element 68 are not limited to glass but may also include high quality plastic materials such as ZEONEX (Zeon Chemicals L.P.). As such, the cost of manufacturing beam steering element 68 may be further lowered by using plastic injection molding techniques.

An alternative to fabricating beam steering element 68 from a single monolithic piece of glass or plastic is to fabricate each facet section, and/or groups of facet sections, individually and then vertically stack them to create a single composite element.

In a preferred embodiment, beam steering element 68 is polished from bulk BK7 glass and has dimensions of length 40 millimeters, height 15 millimeters, width at the base of 4 millimeters and width at the top of 3.18 millimeters. Facet angles 102 for the six input fiber wavelengths and one output fiber wavelength model preferably are 11.82, 8.88, 5.92, 2.96, 0.00, −2.96, −5.92 degrees for each facet 68.1-68.7, respectively. For ease of fabrication so that the edges of adjacent facets are coincident, especially with regard to fabrication by polishing, beam steering element 68 preferably is designed to have varying degrees of thickness for each facet, resulting in the above stated angles of deflection, wherein such angles of deflection preferably position the six input λ1(12)-λ1(22) wavelengths on λ1 mirror and so on for λ2-λn mirrors. It should be noted, however, that beam steering element 68 may be designed and manufactured having facet angles 102 different than set forth herein, depending on the fiber spacing, number of input fiber ports, number of wavelength components per input port, lenses, grating, MEMS mirror configuration, and the like.

Referring again to FIG. 1, the distance between switching mirror array 72, beam steering element 68, and the vertical location of the beam at beam steering element 68, and free space optics 74 as well as other factors including fiber spacing, number of input fiber ports, number of wavelength components per input port, lenses, grating, MEMS mirror configuration and output fiber ports preferably determines the facet angle required to enable all six input port wavelengths to be positioned on each MEMS mirror assigned to the specific wavelength of switching mirror array 72. Because the vertical locations of the various fiber port components are different as they intercept the beam steering element 68, the facet angles of beam steering element 68 preferably vary accordingly in order to combine all of wavelengths λn at a common mirror λn of switching mirror array 72. The analogous situation exists for the selected input port wavelength λn reflecting from mirror λn of switching mirror array 72 directed to output fiber port 64. This is illustrated in FIG. 3B, and wherein the facet angle A can be determined from equation β. In finding the preferred facet angle A from equation β, the known variables are the input beam angle, α, the distance between the input beam vertical location at beam steering element 68 relative to mirror λn of switching mirror array 72, y, and the distance between the beam steering element 68 and the MEMS, z, leaving the only free variable as the refractive index material of beam steering element 68 η. Equation β is transcendental in A and may be solved by iteration or various algorithms.

Figure 2:
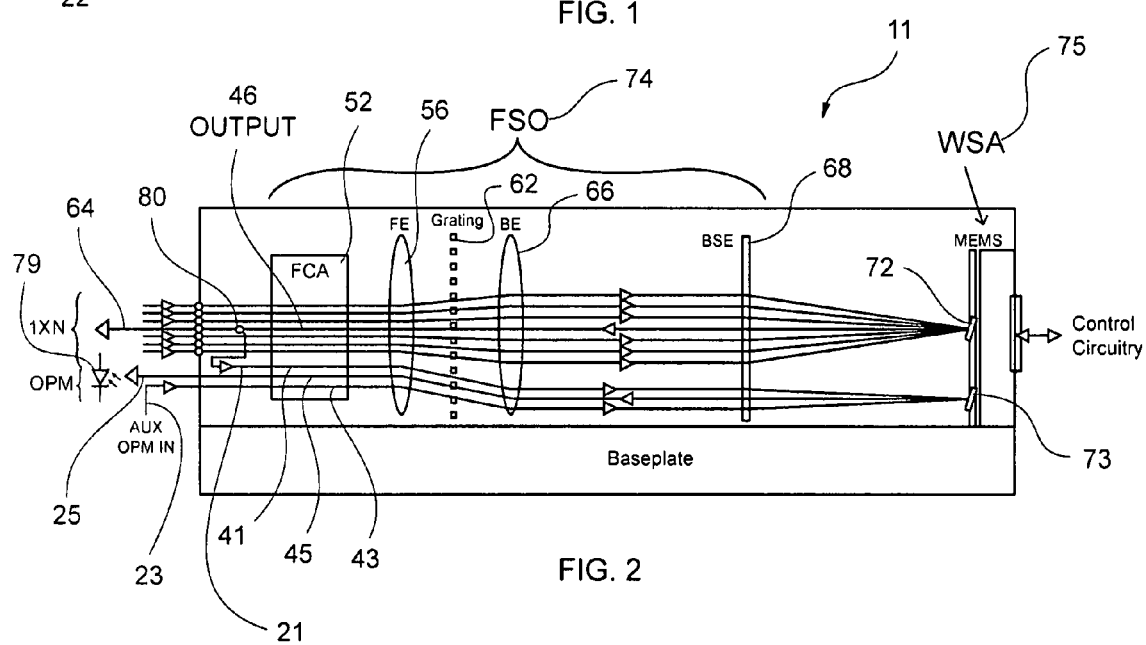
FIG. 2 is a schematic illustration of six input port by one output fiber port, dual channel MEMS mirror, output port taps, monitoring input fiber ports, monitoring output fiber port, and monitor wavelength cross-connect switch according to a preferred embodiment of the present invention.
Figure 4:
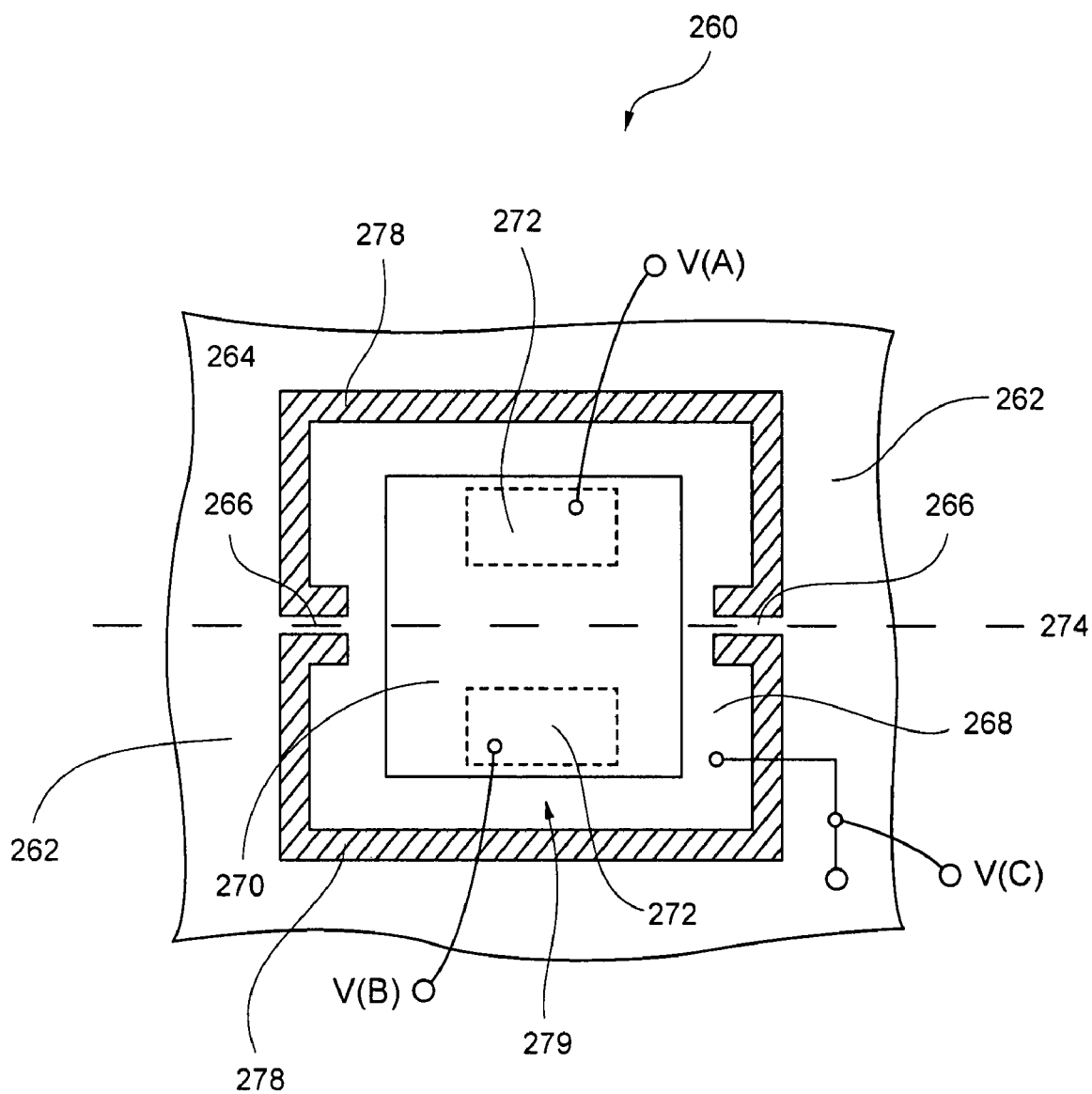
FIG. 4 is a plan view of a single axis moveable mirror useable with the present invention.

Referring now to FIG. 4, there is illustrated a top view of a single axis moveable (moveable means tilting, rotating, sliding or any other movement resulting in a change in the angle of reflection) mirror. Switching mirror array 72 (as seen in FIGS. 1 and 2) is preferably formed as a two-dimensional array (preferably two rows of 40 mirrors) of single-axis moveable mirrors, with one mirror, sing cell (mirror) 260 of switching mirror array 72. Cell 260 is one of many such cells arranged typically in a two-dimensional array in a bonded structure including multiple levels of silicon and oxide layers in what is referred to as multi-level silicon-over-insulator (SOI) structure. Cell 260 preferably includes frame 262 supported in support structure 264 of switching mirror array 72. Cell 260 further includes mirror plate 268 having reflective surface 270 twistably supported on frame 262 by a pair of torsion beams 266 extending from frame 262 to mirror plate 268 and twisting about axis 274. In one MEMS fabrication technique, the illustrated structure is integrally formed in an epitaxial (epi) layer of crystalline silicon. The process has been disclosed in U.S. Provisional Application Ser. No. 60/260,749, filed Jan. 10, 2001, (now abandoned) is incorporated herein by reference in its entirety. However, other fabrication processes resulting in somewhat different structures may be used without affecting or departing from the intended scope of the present invention.

Mirror plate 268 is controllably tilted about axis 274 in one dimension by a pair of electrodes 272 under mirror plate 268. Electrodes 272 are symmetrically disposed as pairs across axis 274 respective torsion beams 266. A pair —of voltage signals V(A), V(B) is applied to the two mirror electrodes 272, while a common node voltage signal V(C) is applied to both mirror plate 268 and frame 262.

Circumferentially lateral extending air gap 278 is preferably defined between frame 262 and mirror plate 268 so that mirror plate 268 can rotate with respect to frame 262 as two parts. Support structure 264, frame 262, and mirror plate 268 are driven by the common node voltage V(C), and electrodes 272 and mirror plate 268 form plates of a variable gap capacitor. Although FIG. 4 illustrates the common node voltage V(C) being connected to mirror plate 268, in practice, the electrical contact is preferably made in support structure 264 and torsion beams 266 apply the common node voltage signal to both frame 262 and mirror plate 268, which act as a top electrode. Electrical connectivity between frame 262 and mirror plate 268 can be achieved through torsion beams 266 themselves, through conductive leads formed on torsion beams 266, or through a combination of the two. Electrodes 272 are formed under mirror plate 268 and vertical air gap 279 shown into the page is further defined between electrodes 272 and mirror plate 268 and forms the gap of the two capacitors.

Torsion beams 266 act as twist springs attempting to restore mirror plate 268 to its neutral position. Any potential difference applied across electrode 272 and mirror plate 268 exerts an attractive force acting to overcome torsion beams 266 and to close the variable gap 279 between electrodes 272 and mirror plate 268. The force is approximately linearly proportional to the magnitude of the applied voltage, but non-linearities exist for large deflections. The applied voltage can be a DC drive or an AC drive per U.S. Pat. Nos. 6,543,286 and 6,705,165 issued to Garverick et al. set forth below. In practice, the precise voltages needed to achieve a particular are experimentally determined.

Because each of two electrodes 272 forms a capacitor with mirror plate 268, the amount of tilt is determined by the difference of the RMS voltages applied to the two capacitors of the pair. The tilt can be controlled in either direction depending upon the sign of the difference between the two RMS voltages applied to V(A) and V(B).

It is contemplated herein that changing the angle of reflection may be accomplished by various other means other than moving, rotating, tilting a moveable mirror, including, but not limited to, translational motion of a fixed angled mirror, translational motion of a an element with multiple fixed angled mirrors and the like.

It is further contemplated herein that forces to accomplish movement of the moveable mirror or other means of reflection other than electrostatic, including, but not limited to, magnetic, thermally activated, piezoelectric, piezoresistant, and the like.

Referring again to FIG. 1, there are many ways of configuring the MEMS array of micromirrors and their actuation as wavelength switching array (WSA) 75. The following is an example: The MEMS array may be bonded to and have an array of solder bumps contacting it to control circuitry 78, preferably including high-voltage circuitry needed to drive the electrostatic actuators associated with each of the mirrors.

Control circuitry (controller) 78 controls the driver circuit and hence the mirrors in a multiplexed control system including address lines, data lines, and a clock line, driven in correspondence to an oscillator. The control is preferably performed according to pulse width modulation (PWM), a method for controlling the mirror tilt, as Garverick has described in U.S. Pat. Nos. 6,543,286, issued Apr. 8, 2003, and U.S. Pat. No. 6,705,165, issued Mar. 16, 2004, incorporated herein by reference in their entirety. In these methods, a high-voltage square-wave common node drive signal is supplied through one or more power transistors to the common electrical node comprising all the mirrors while the driver array delivers phase delayed versions of the square-wave signal to each individual electrode, the amount of delay determining the RMS voltage applied across the electrostatic actuator electrodes of each mirror. In addition, Garverick has described in U.S. Pat. No. 6,788,981, issued Sep. 7, 2004 and incorporated herein by reference in its entirety, a method wherein an analog control system for an array of moveable mechanical elements, such as moveable mirrors, formed in a micro electromechanical system (MEMS) is disclosed.

Control circuitry 78 preferably receives switch commands from the external system to effect switching of the wavelength separated channels between the input and output fibers. Preferably, the drive voltage pulse widths that correspond to mirror angles needed for switching, which is primarily representative of the physical characteristics of the MEMS array and its driver circuit, may be stored in an electrically programmable read-only memory.

Referring to FIGS. 1 and 4, the angle of a mirror in switching mirror array 72 is preferably actively tilted by control circuitry 78 applying a voltage V(A), V(B) to electrodes 272 of switching mirror array 72 so that the selected input port sub-beam λn is preferably reflected to land precisely at the center of concentrator waveguide 46 associated with the particular output fiber port 64 after retracing its path through free space optics 74. The mirror is preferably actively tilted by control circuitry 78 to the required angle such that the sub-beam, after reflection off the mirror, is properly aligned to planar waveguide 46 associated with output fiber port 64. Preferably, cell 260 (λ1 mirror) assigned to λ1 of switching mirror array 72 tilts its mirror plate 268, which has projected on its reflective surface 270 λ1(12)-λ1(22) from the six input fiber ports 12-22, and by control circuitry 78 applying a predetermined voltage V(A), V(B) to electrodes 272 of switching mirror array 72, tilts mirror plate 268 thereby selecting λ1 from any of the six input fiber ports 12-22 (the other λ1(s) being not selected are reflected into free space) and the selected λ1 is reflected to land precisely at the center of planar waveguide 46 associated with output fiber port 64 after retracing its path through free space optics 74. Wavelength selective switch 10 switches one selected λ1 from input fiber ports 12-22 to output fiber port 64 and blocks the remaining unselected λ1(s) from input fiber ports 12-22, and so forth for λ2-λn.

The described embodiment was based on 40 channels (n=40) in the ~1530-1562 nanometer band. However, the design is easily adapted to conform to various regions of the optical spectrum, including S-band, C-band, and L-band, and to comply with other wavelength grids, such as the 100 GHz, 50 GHz, etc. grids published by International Telecommunication Union (ITU).

The described design provides several advantages for facilitating its easy insertion into WDM systems of either a few wavelengths, or for dense WDM (DWDM) systems having many wavelengths. For example, the design of the present invention produces lower polarization mode dispersion (PMD) and low chromatic dispersion relative to previous designs. Low PMD and chromatic dispersion naturally follows from the free-space optics.

Other types of MEMS mirror arrays may be used, including dual axis gimbal structure cells, those relying on flexing elements other than axial torsion beams, and those moving in directions other than tilting about a central support axis. In particular, dual axis gimbaled mirrors facilitate hitless switching in regards to 1×N mode of operation. Wavelength dispersive elements other than diffraction gratings also may be used. The concentrator, although important, is not crucial to many of the aspects of the invention. Further, the concentrator may be implemented in an optical chip serving other functions such as amplification, splitting or wavelength conversion.

It is contemplated in an alternate embodiment that switching mirror array 72 could be replaced with other optical switching elements such as liquid crystal, liquid crystals on silicon, a liquid crystal array, ink jet, mechanical, thermal, nonlinear, acousto-optic elements, amplifier and attenuators or the like known by one of ordinary skill in the art.

It is further contemplated that depending on the switching element in use such switching element may position, configure, change, change state, actuate, command, tilt, rotate, phase delay, or the like known by one of ordinary skill in the art.

A white-light cross connect, that is, an optical switch that switches all λs on a given fiber together, can be adapted from the system of FIGS. 1-5 by eliminating the dispersive element or DeMux/Mux. Although the invention has been described with respect to a wavelength selective switch, many of the inventive optics can be applied to white-light optical cross connects that do not include a wavelength dispersive element. Although moveable micromirrors are particularly advantageous for the invention, there are other types of MEMS mirrors than can be electrostatic, electrically, magnetically, thermally, or otherwise actuated to different positions or orientations to affect the beam switching of the invention.

Referring now to FIG. 2, a schematic illustration of a six input fiber port by one output fiber port with integrated optical switching and monitoring system 11 is shown. Optical switching and monitoring system 11 preferably includes elements and configuration of switch 10 including six input fiber ports 12, 14, 16, 18, 20, 22, additionally auxiliary monitoring fiber port 23, fiber concentrator array (FCA) 52, planar waveguides 32, 34, 36, 38, 40, 42, additionally 41, 43 and 45, FSO 74 including front end optics (FE) 56, dispersive element 62, back end optics (BE) 66, beam steering element (BSE) 68, switching mirror array 72, control circuitry 78, WSA 75, output fiber port 64 and output monitoring fiber port 25.

According to a preferred embodiment of the invention, optical switching and monitoring system 11 is incorporated preferably by fabricating output tap 80 and planar waveguide 41 into fiber concentrator 52, whereby tap 80 preferably couples about 10% of the optical power from output fiber port 64 of planar waveguide 46 into planar waveguide 41 which directs the multi wavelength output beam to output in free space and propagate in a pattern having a central axis which is parallel with the central axis of outputs from waveguides 32, 34, 36, 38, 40, 42 of FIG. 1 in free space optics 74.

Alternatively, an optical switching and monitoring system with feedback monitoring of the output fiber may be implemented externally (off-board of the optical switching and monitoring system 11) by fusing or splicing the output fiber with a monitoring fiber or via use of face plate connector and a splitter or jumper to couple about 10% of the optical power from output fiber port 64 fiber into monitoring fiber port 21, which is coupled to planar waveguide 41. Planar waveguide 41 outputs its multi-wavelength beam in free space propagating in a pattern having a central axis which is parallel with the central axis of outputs from waveguides 32, 34, 36, 38, 40 in free space optics 74.

Optical switching and monitoring system 11 preferably includes auxiliary monitoring fiber port 23 which is preferably coupled to planar waveguide 43, and preferably outputs its multi-wavelength beam in free space propagating in a pattern having a central axis which is parallel with the central axis of outputs from waveguides 32, 34, 36, 38, 40, 41, 42, 43 in free space optics 74, thus enabling an auxiliary multi-wavelength beam to be monitored by optical switching and monitoring system 11. An external signal not found on input fiber ports 12, 14, 16, 18, 20, 22 may be input into auxiliary monitoring fiber port 23 and optical switching and monitoring system 11 may be utilized to monitor or read the power of each wavelength of a multi-wavelength beam input on auxiliary monitoring fiber port 23, and to output such data to a user interface (User i/f) port 77 shown in FIGS. 5A and 5B. It is contemplated herein that more than one auxiliary monitoring port may be provided in a similar fashion.

Free space optics 74 preferably position the two multi-wavelength beams of monitoring fiber ports 21 and 23 propagating from planar waveguides 42 and 43 onto monitoring mirror array 73 second row (row B). Cell 260 assigned to λ1 mirror of monitoring mirror array 73 tilts its mirror plate 268 (shown in FIG. 4), which has projected on its reflective surface 270 λ1(21) and λ1(23) from the two monitoring fiber ports 21 and 23 and by control circuitry 78 applying a voltage V(A), V(B) to electrodes 272 of monitoring mirror array 73 tilting mirror plate 268 selects λ1 either from monitoring fiber port 21 or 23 (the other λ1 being not selected is reflected away from the waveguides) and the selected λ1 is preferably reflected to land precisely at the center of concentrator waveguide 45 associated with the particular output monitoring fiber port 25 after retracing its path through free space optics 74.

Optical switching and monitoring system 11 is capable of simultaneously switching one selected λ1 from input fiber ports 12-22 to output fiber port 64 and blocking the remaining unselected λ1(s) from input fiber ports 12-22, and so forth for λ2-λn, and switching one selected λ from monitoring fiber ports 21 and 23 to output monitoring fiber port 25 and blocking the remaining unselected λ from monitoring fiber ports 21 or 23 as well as all other λs from monitoring fiber ports 21 and 23 and so forth for λ2-λn individually. Output monitoring fiber port 25 preferably receives the selected single wavelength λ switched by MEMS mirror array 73 (row B) after it has passed through free space optics 74. Output monitoring fiber port 25 preferably is coupled to optical power monitor 79.

Power monitor (optical measurement device) 79 preferably is a photodiode, preferably measuring the power level of wavelength λn switched by monitoring mirror array 73 (row B), measuring one wavelength at a time. As monitoring mirror array 73 (row B) selects wavelength λn and routes it to waveguide 45 coupled to output monitoring fiber port 25, power monitor 79 preferably measures the power of such wavelength λn. Alternatively, power monitor 79 may be any type of optical measuring device, for example a device capable of measuring power of one or more wavelengths by scanning the multi-wavelength components, determining signal to noise ratios by spectrum analyzing the wavelength bandwidth, measuring polarization-dependent properties, and the like. The optical intensities for all wavelength-separated signals are preferably converted to analog or digital form by power monitor 79 and supplied to control circuitry 78, which preferably adjusts switching mirror array 72 as set forth herein to adjust the power of wavelength λn to conform to one or more predetermined criteria.

Other forms of power monitoring are possible as long as the time necessary for resolutions of differences in wavelength channel power levels is sufficient for power adjustments. If the adjustments are intended to only address aging and environmental effects, the resolved measurement time may be relatively long. On the other hand, fast feedback may be necessary for initializing switch states, for compensating for transient changes in power level such as occur from the combination of polarization-dependent loss and polarization fluctuations which vary at the wavelength level, for stabilizing against vibration, and for alarm signaling to protection circuitry and for network fault recovery. Moreover, by replacing photodetector 79 with other commercially available devices, other parameters may be measured such as optical signal to noise ratio (OSNR), center wavelength, transient behavior, or bit error rate.

Moreover, various configurations of optical switching and monitoring system 11 are contemplated herein, including taps or splitters for all or a selected number of input and output fiber ports, including their associated planar waveguide, free space optics, MEMS mirrors and the like.

Figure 5A:
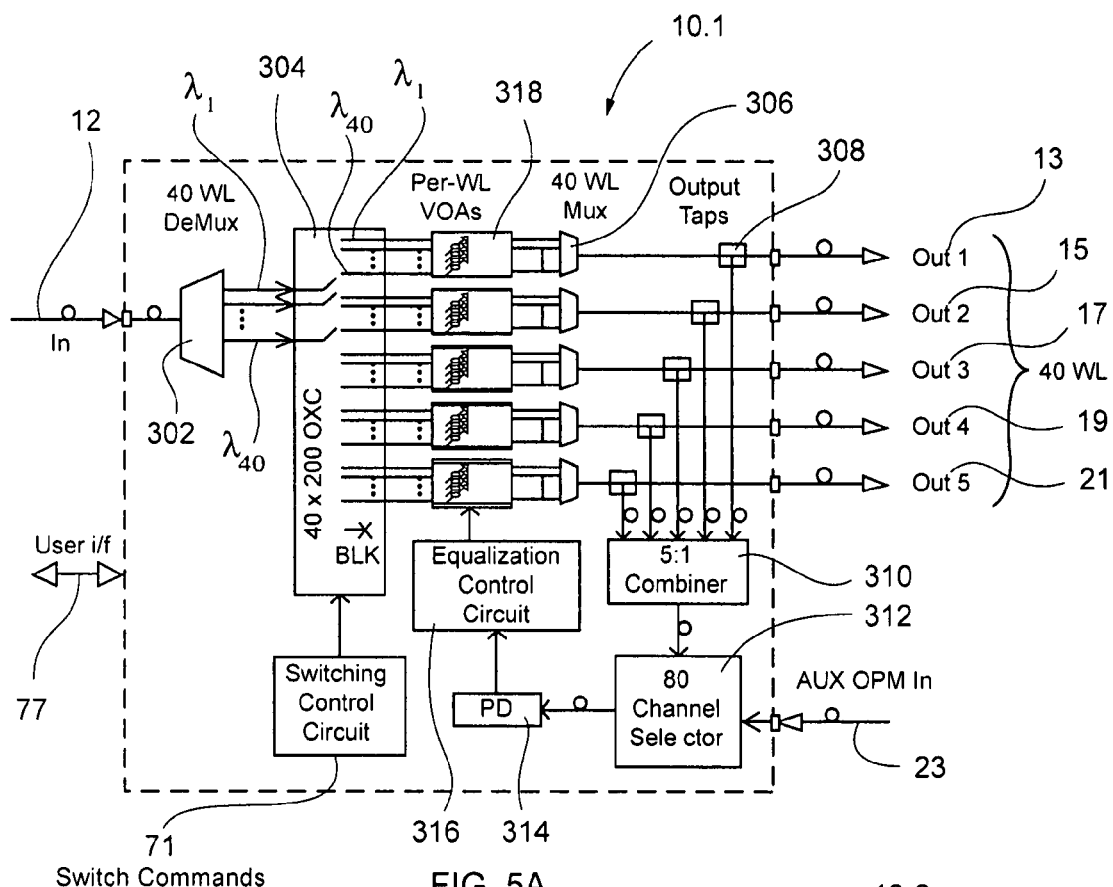
FIG. 5A is a functional block diagram of a one input port by five output fiber port wavelength selective switch with power monitor and feedback control according to an alternate embodiment of the present invention.

Referring now to FIG. 5A, a functional block diagram of a one input port by five output fiber port 1×N (N=5) optical switching and monitoring system 10.1 wavelength selective switch with power monitor and feedback control is illustrated according to an alternate embodiment of the present invention. In optical switching and monitoring system 10.1, forty wavelengths enter input port (In) 12 and are demultiplexed (DeMux) 302 into forty separate wavelengths λ1-λ40, the optical cross-connect (OXC) 304 switches the forty wavelengths, multiplexes (Mux) 306, and outputs the forty wavelengths to their switch selected output (Out 1-5) 13, 15, 17, 19, 21. Forty wavelengths in and forty wavelengths out; however, the forty wavelengths out are distributed across the output fiber ports (Out 1-5) 13, 15, 17, 19, 21 as selected by the optical cross-connect switch 304. About 10% of the optical power of each output (Out 1-5) 13, 15, 17, 19, 21 is tapped or split off (Output taps) 308 to a 5:1 combiner 310, which is coupled to an 80 channel selector 312. Channel selector 312 preferably selects one wavelength of the forty internal or forty external (Aux. OPM In) 23 and feeds such wavelength to the photo diode (PD) 314. The output from the photodiode is passed to the equalization control circuit 316 and/or to user interface 77 (User i/f). The equalization control circuit 316 preferably controls the per wavelength variable optical attenuator (VOA) 318 which adjusts the wavelength transmitted power to conform to one or more predetermined criteria. Switch commands 71 are provided for an external controller, via user interface 77, for wavelength selection from input to output switching, for wavelength selection for power monitoring, and/or power monitoring.

Figure 5B:
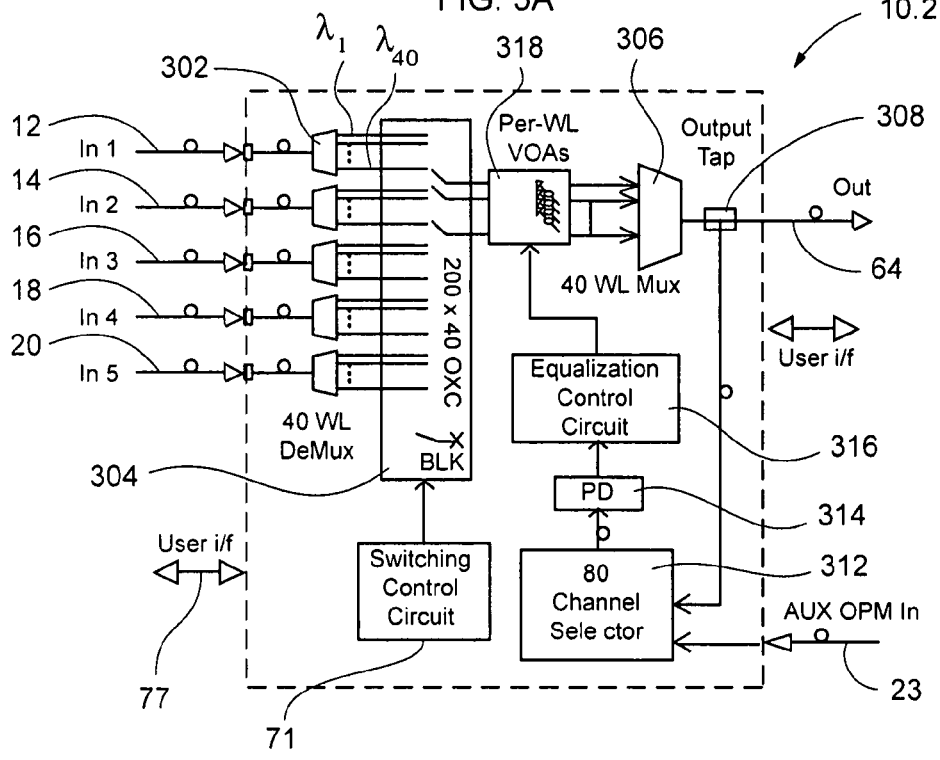
FIG. 5B is a functional block diagram of a five input port by one output fiber port wavelength selective switch with power monitor and feedback control according to a preferred embodiment of the present invention.

Referring now to FIG. 5B, a functional block diagram of five input fiber ports by one output fiber port N×1 (N=5) optical switching and monitoring system 10.2 wavelength selective switch with power monitor and feedback control is illustrated according to preferred embodiment of the present invention. In optical switching and monitoring system 10.2, forty wavelengths enter each input port (In 1-5) 12, 14, 16, 18, 20 and are demultiplexed (DeMux) 302 into five sets of forty separate wavelengths λ1-λ40, the optical cross-connect (OXC) 304 selects and switches forty wavelengths, multiplexes (Mux) 306 and outputs forty selected wavelengths to output (Out) 64. About 10% of the optical power of output (Out) 64 is tapped or split off (Output Tap 308) to an 80 channel selector 312. The channel selector 312 selects one wavelength of the forty internal or forty external (Aux. OPM In) 23 and feeds such wavelength to the photo diode (PD) 314. The output from the photodiode is passed to the equalization control circuit 316 and/or to user interface 77 (User i/f). The equalization control circuit 316 controls the corresponding wavelength variable optical attenuator (VOA) 318 which adjusts the transmitted power to conform to one or more predetermined criteria. Switch commands 71 are provided from an external controller, via user interface 77, for wavelength selection from input to output switching, for wavelength selection for power monitoring, and/or power monitoring.

User interface 77 preferably is an interface enabling information to pass from the optical switching and monitoring system to outside of the optical switching and monitoring system, and from outside the optical switching and monitoring system into the optical switching and monitoring system, wherein such outside systems include but are not limited to a human operator, an embedded controller, network management systems and/or network alarming systems. Information may include, but is not limited to, wavelength routing information, wavelength selection for power monitoring, wavelength to be switched from input to output, switch status, wavelength power levels, wavelength power level settings, and the like.

The optical monitoring system described above in FIGS. 2 and 5 is preferably internal to the optical switching and monitoring system and has the advantage of using all the free space optics and MEMS mirrors of such switch. However, an external optical monitoring system is possible wherein photodiode 79 is external and coupled to the optical switching and monitoring system via monitoring fiber 25 (shown in FIG. 2), with the advantage of monitoring all the output signals of the switch.

Per-wavelength power adjustment is achieved in the embodiment of FIG. 1 with relatively minor additions to the hardware other than the optical power monitor and taps shown in FIGS. 2 and 5. Mirrors 72 used for switching between channels and for optimizing transmission are used additionally for the variable attenuation of the output power, thereby effecting per-wavelength variable transmission through optical switching and monitoring system 11. To achieve such variable attenuation external to the switch would otherwise require separate attenuators in each of the multiple wavelengths of each of the optical channels. Moreover, the control functions can be incorporated into the same control circuitry 78.

Figure 6A:
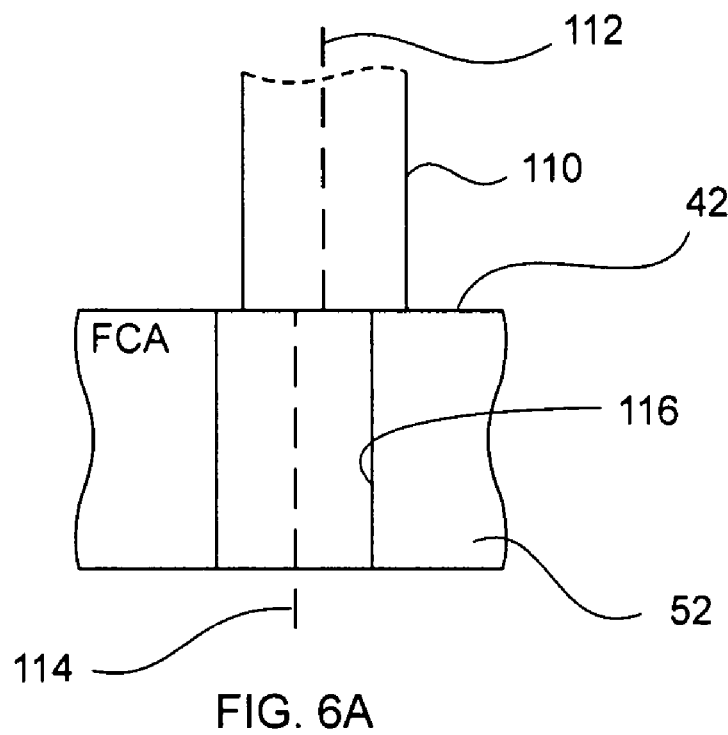
FIGS. 6A and 6B are cross sectional views illustrating two kinds of mismatch in optically coupling a wavelength component beam to the waveguide substrate according to an alternate embodiment of the present invention.

There are two principal types of misalignment or mismatch between the beam and waveguide to attain variable attenuation of the wavelength output power. Referring now to FIG. 6A, a cross sectional view illustrates a mismatch in optically coupling a wavelength component beam 110 to the waveguide substrate 52 according to a preferred embodiment of the present invention. Positional mismatch occurs when, as illustrated in the cross-sectional view of FIG. 6A, central axis 112 of wavelength λn beam 110 is offset slightly from central axis 114 of waveguide 116 of fiber concentrator 52. The figure, being suggestive only, does not illustrate the smooth variation of the optical fields both inside and outside of the illustrated wavelength λn beam 110 and waveguide 116 and across the lateral interface. FIG. 6A further assumes that the two modal fields have the same width, which is the typical object of optical design. Slightly tilting mirror λn of switching mirror array 72 (row A) to deliberately misalign or mismatch wavelength λn beam 110 entry into waveguide 116 of fiber concentrator 52, results in a degraded coupling and in loss of wavelength λn beam 110 optical power in waveguide 116. In a typical embodiment, coupling is attenuated by about 1 dB per micrometer of positional mismatch.

Figure 6B:
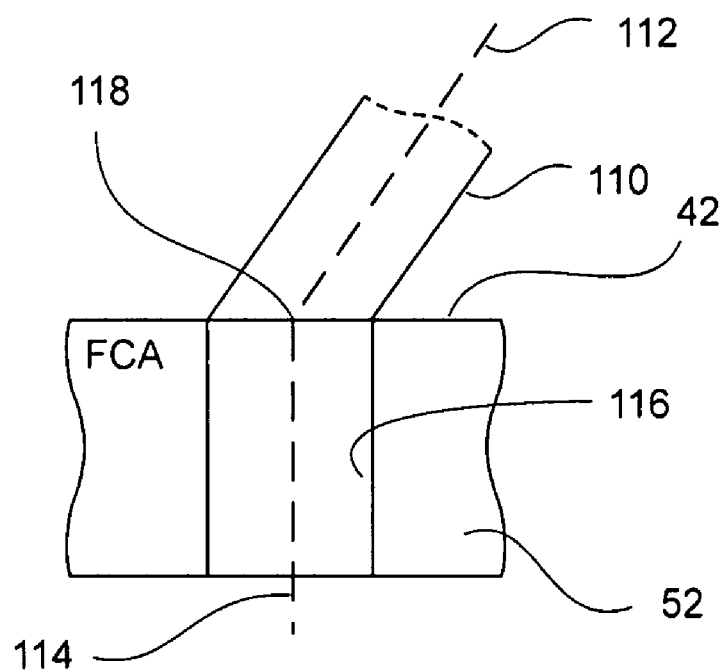

On the other hand, angular mismatch occurs when, as illustrated in the cross-sectional view of FIG. 6B, wavelength λn beam 110 is angularly inclined with respect to waveguide 116 even if their central axes 112 and 114 cross at their interface 118. Angular mismatch degrades the coupling because a phase mismatch occurs between the two fields at the interface arising from the axial z-dependence of the two complex fields. In a typical embodiment, coupling is degraded by about 1 dB per degree of angular offset but the angular dependence depends strongly upon the optics. It should be appreciated that a beam can be both positionally and angularly mismatched with a waveguide. It should be yet further appreciated that the mismatch can occur at the transition from free space to fiber (if no concentrator) and its beam field defined by the rest of the optical system.

Figure 7A:
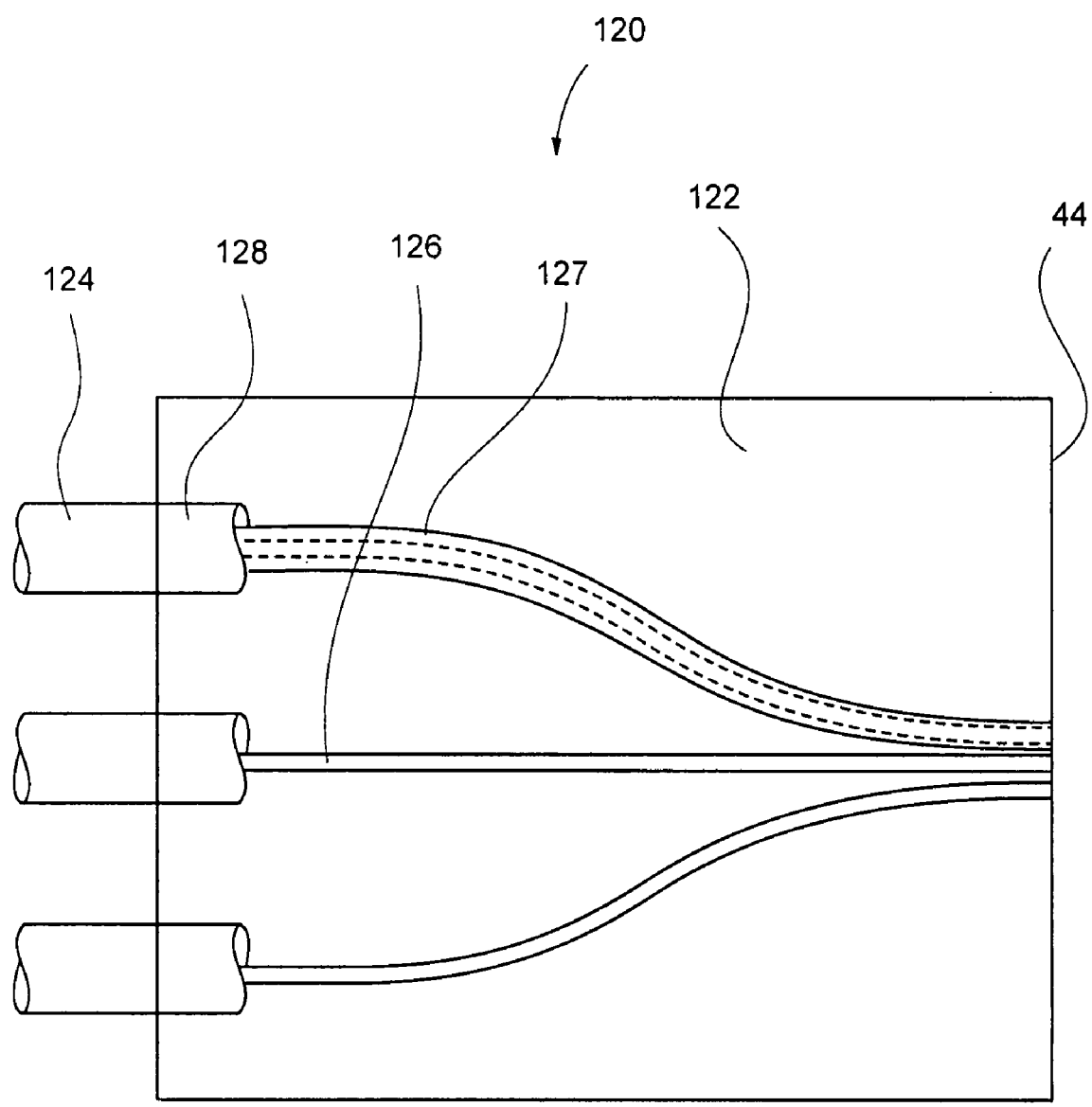
FIG. 7A is a top view of a fiber holder according to a preferred embodiment of the present invention.
Figure 7B:
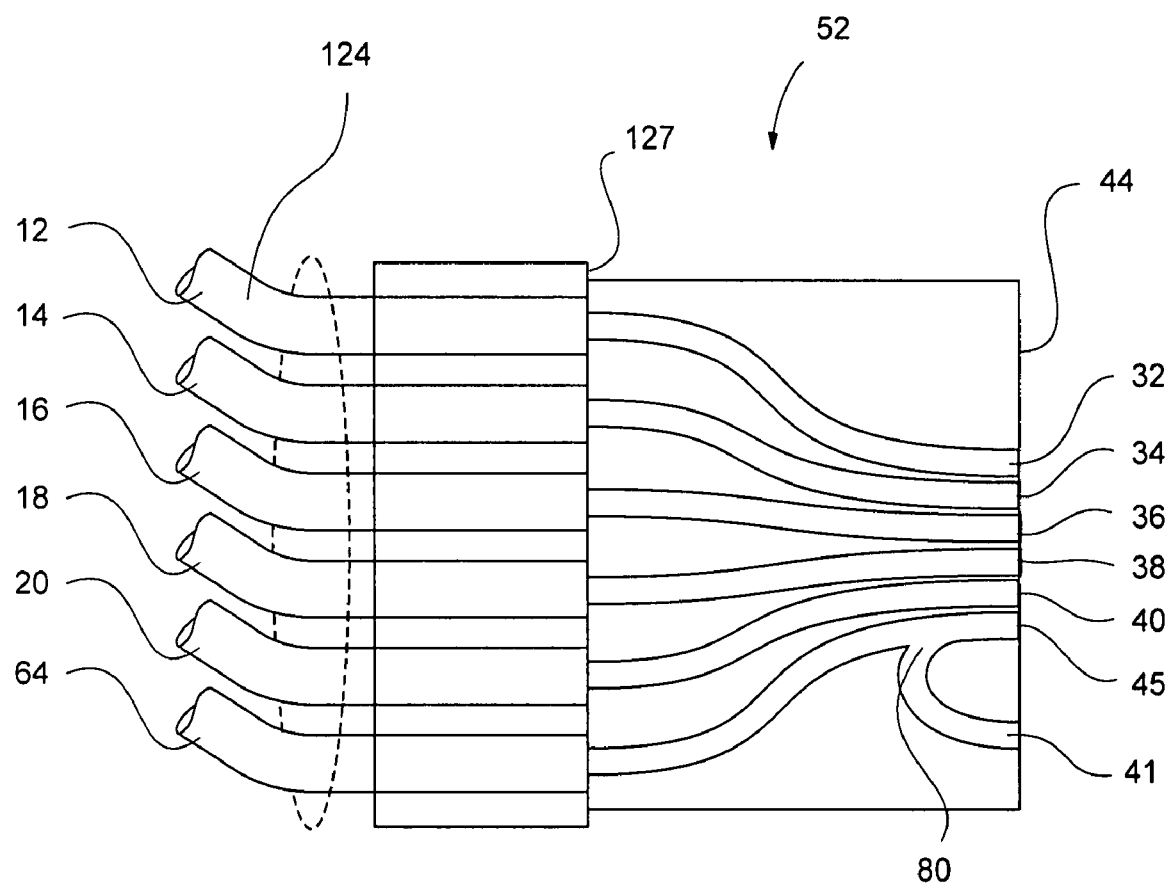
FIG. 7B is schematically illustrated optical concentrator array using planar waveguide included in the N×1 WSS of FIGS. 1, 2 and 5B according to an alternate embodiment of the present invention.
Figure 7C:
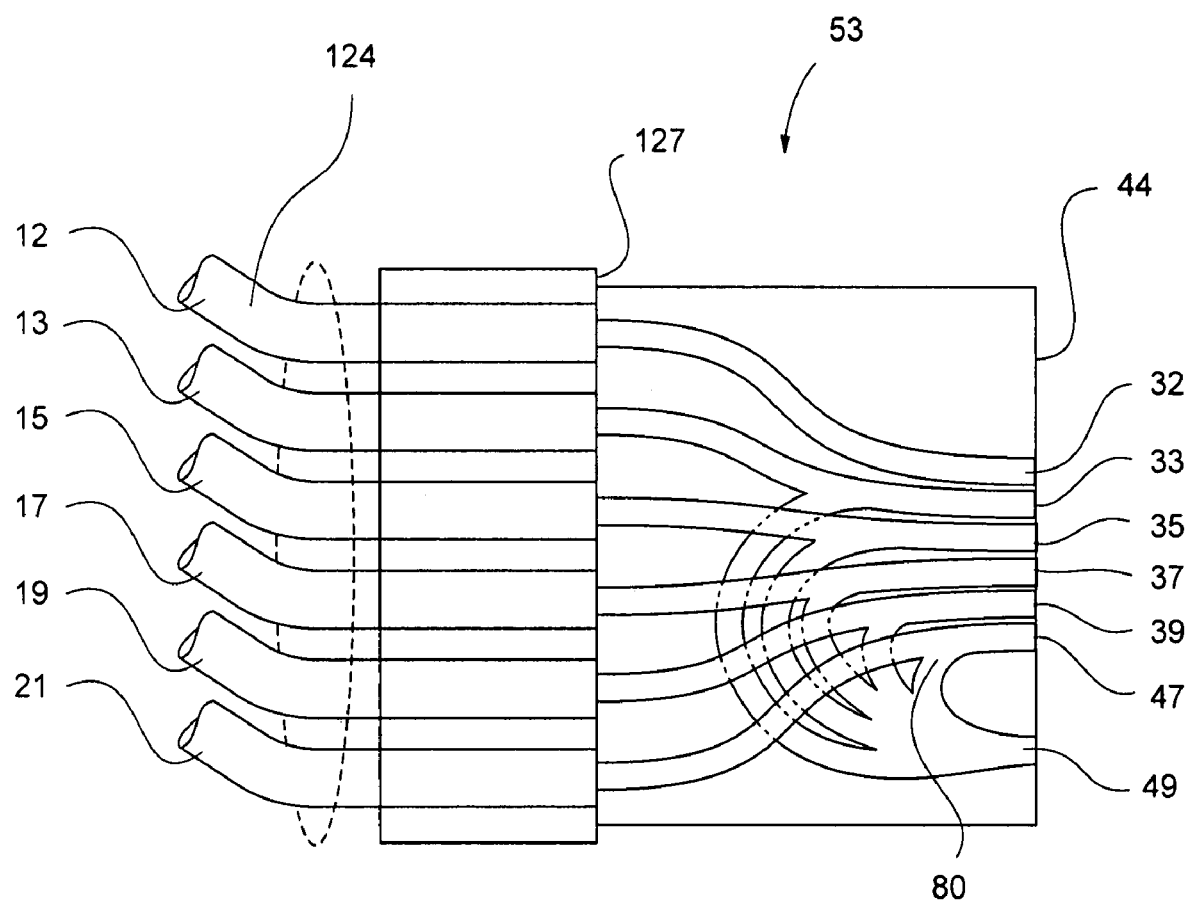
FIG. 7C is schematically illustrated optical concentrator array using planar waveguide included in the 1×N WSS of FIG. 5A according to an alternate embodiment of the present invention.

Referring now to FIG. 7A, there is illustrated a fiber concentrator 120 that utilizes the optical fiber included in the switch of FIGS. 1, 2 and 5 to bring optical signals closer together. Fiber holder 122 is patterned by precision photo-lithographic techniques with a series of preferably V-shaped grooves (or other channel configuration) in the general planar pattern shown in fiber holder 122 of FIG. 7A. Single-mode or multi-mode optical fibers 124 having cores 126 surrounded by claddings 127 and buffer 128. In this application, optical fibers 124 are stripped of their protective buffer 128 and cladding 127, or have their cladding 127 reduced or tapered toward output face 44 of fiber holder 122 to enable close linear placement of cores 126. Typical core and cladding diameters are respectively 8.2 micrometers and 125 micrometers. Among other favorable attributes, the concentrated fiber core spacing reduces the amount of "dead space" between fibers which would otherwise increase the total mirror tilt range. Tapered fibers 124 are preferably placed into the grooves with their tapered ends forming transition to free-space optics 74. The all-fiber design eliminates the tedious alignment and in-path epoxy joint of combination waveguides, as shown in FIGS. 7B and 7C. The design also eliminates polarization-related effects arising in planar waveguides.

Fiber concentrator 120 interfaces widely separated optical fibers 124 with the closely configured free space optics 74 and wavelength switching array 75 of WSS of FIGS. 1 and 2. Multiple fibers 124 are typically bundled in a planar ribbon. V-shaped grooves in fiber holder 122 hold the reduced cladding 128 with a spacing of, for example, 40 micrometers. Although a core of each fiber 124 has a relatively small size of about 8 micrometers, its outer glass cladding results in a fiber diameter of approximately 125 micrometers. The large number of fibers, which can be handled by the single set of free-space optics 74 of the invention, arranged along an optical axis make it difficult to process a large number of fiber signals with such a large spacing between them because the outermost fiber signals are so far from the optical axis capabilities of the mirrors. Also, as discussed in more detail below, a significant amount of optical magnification is required between these fibers and the MEMS mirror array, and the MEMS design and function is greatly simplified as a result of concentrating the fiber spacing.

Referring now to FIG. 7B, a schematically illustrated optical fiber concentrator array 52, using planar waveguide included in the 5×1 WSS according to a preferred embodiment of the present invention, and included in the switch of FIGS. 1, 2 and 5B. Single-mode optical fibers 124 having cores 126 surrounded by claddings 127 (shown in FIG. 7A) are butt coupled to fiber concentrator 52. In the 6×1 switch 10 shown in FIG. 1, six input fiber ports 12, 14, 16, 18, 20, 22 and output fiber 64 are preferably optically coupled to fiber concentrator 52 in a linear alignment and are preferably optically coupled to input fiber ports 12-22 and output fiber 64 to bring their signals closer together on output face 44 of fiber concentrator 52 adjacent the optics, and to output the beams in parallel in a linearly spaced grid. Returning to FIG. 7B, fiber concentrator 52 preferably has curved shaped planar waveguides 32, 34, 36, 38, 40 and 45 corresponding to input fiber ports 12, 14, 16, 18, 20, and output fiber 64 within fiber concentrator 52 to preferably concentrate and reduce the spacing between fiber input fiber ports 12, 14, 16, 18, 20, 64 from 125 micrometers, representative of the fiber diameters, to the considerably reduced spacing of, for example 30 or 40, micrometers and preferably no more than 50 micrometers which is more appropriate for the magnifying optics of switch 10 and an optimum tilt range of the mirrors. Each of waveguides 32, 34, 36, 38, 40, and 45 is preferably coupled to respective 12, 14, 16, 18, 20 input port and output fiber 64. Further, waveguides 32, 34, 36, 38, 40, 41 and 45 preferably extend along a common plane directing the wavelengths to output in free space and to propagate in patterns having central axes which are also preferably co-planar.

FIG. 7B further discloses the fabricating of output tap 80 and planar waveguide 41 into fiber concentrator 52, whereby tap 80 preferably couples about 10% of the optical power from output fiber port 64 of planar waveguide 45 into planar waveguide 41, which directs the multi wavelength output beam to output in free space and to propagate in a pattern having a central axis which is preferably co-planar with outputs from waveguides 32, 34, 36, 38, 40, 45 of FIG. 2 in free space and switched by monitoring mirror array 73 (row B) after it has passed through free space optics 74.

Fiber concentrator 52 in FIG. 2, may include auxiliary monitoring fiber port 23, coupled to planar waveguide 43, wherein fiber concentrator 52 preferably outputs its multi-wavelength beam in free space propagating in a pattern having a central axis which is preferably co-planar with outputs from waveguides 32, 34, 36, 38, 40, 41 in free space optics 74, thereby enabling an external multi-wavelength beam to be monitored by optical switching and monitoring system 11. An external signal not found on input port 12, 14, 16, 18, 20, 22 may be input into auxiliary monitoring fiber port 23 and optical switching and monitoring system 11 may be utilized to monitor or read the power of each wavelength of a multi-wavelength beam on auxiliary monitoring fiber port 23 and to output such data to a user interface (User i/f) 77 port shown in FIGS. 5A and 5B. It is contemplated herein that additional auxiliary monitoring fiber port 23 may be added in a similar fashion.

Potential limitations on the free space optics 74 and wavelength switching array 75 occur when configuring larger numbers of fibers than the present invention, if arranged along an optical axis of input fiber ports 12, 14, 16, 18, 20 and output fiber 64. Absent a fiber concentrator 52, adding additional fibers makes it difficult to switch such increased number of fiber signals with such a large spacing between such fibers because the outermost beams are so far off the center optical axis capabilities of the mirrors in the preferred embodiment between input fiber ports 16 and 18. Also, as discussed in more detail below, a significant amount of optical magnification is required between these fibers and the MEMS mirror array, and the MEMS design and function are greatly simplified as a result of concentrating the fiber spacing.

Referring now to FIG. 7C, a schematically illustrated optical concentrator array 53 is shown wherein planar waveguides are included in the 1×5 WSS according to an alternate embodiment of the present invention. Single-mode optical fibers 124 having cores 126 surrounded by claddings 127 and buffers 128 (shown in FIG. 7A) are butt coupled to concentrator 53. Illustrated in the 1×5 wavelength selective switch 10.1 shown in FIG. 5A, one input port 12 and five output fiber ports 13, 15, 17, 19, 21 are preferably optically coupled to fiber concentrator 53 in a linear alignment and are preferably optically coupled to fiber input port 12, and output fiber ports 13-21 to bring their beams closer together on output face 44 of fiber concentrator array 53 adjacent the optics, and to output the beams in parallel in a linearly spaced grid. Fiber concentrator 53 preferably has curved shaped planar waveguides 32, 33, 35, 37, 39, 47 and 49 within fiber concentrator 53 to preferably concentrate and reduce the spacing between fiber input fiber ports 12, 13, 15, 17, 19, 21 from 125 micrometers, representative of the fiber diameters, to the considerably reduced spacing of, for example, 30 or 40 micrometers and preferably no more than 50 micrometers which is more appropriate for the magnifying optics of switch 11 and an optimum size and spacing of the mirrors. Each of waveguides 32, 33, 35, 37, 39, 47 is preferably coupled to the respective input fiber port 12, and output fiber ports 13, 15, 17, 19, 21. Further, waveguides 32, 33, 35, 37, 39, 47 preferably extend along a common plane directing the multi wavelength beams to output in free space and to propagate in patterns having central axes which are also preferably co-planar.

FIG. 7C further discloses the fabricating of output taps 80 and planar waveguide 49 into fiber concentrator 53 whereby taps 80 preferably couple about 10% of the optical power from output fiber ports 13, 15, 17, 19, 21 via waveguides 33, 35, 37, 39, 47 into planar waveguide 49, which directs the multi wavelength output beam to output in free space and to propagate in a pattern having a central axis which is preferably co-planar with outputs from waveguides 32, 33, 35, 37, 39, 47 in free space and switched by monitoring mirror array 73 (row B) after it has passed through free space optics 74. The reflected beam preferably passes again through free space optics 74 and into output waveguide 45 (shown in FIG. 2 but not in FIG. 7C) which guides the signal to photodetector 79 wherein fiber concentrator 53 performs the functions of taps 308 and 5:1 combiner 310 in FIG. 5A.

Concentrator 53 may also include auxiliary monitoring fiber port 23, coupled to planar waveguide 43 wherein fiber concentrator 53 preferably outputs its multi-wavelength beam in free space propagating in a pattern having a central axis which is preferably co-planar with outputs from waveguides 32, 33, 35, 37, 39, 47 in free space optics 74, thereby enabling an external multi-wavelength beam to be monitored by optical switching and monitoring system 10.1 or 11. An external signal not found on input(N) may be input into auxiliary monitoring fiber port 23 and optical switching and monitoring system 10.1 or 11 may be utilized to monitor or read the power of each wavelength of a multi-wavelength beam on auxiliary monitoring fiber port 23 and to output such data to a user interface (User i/f) port shown in FIGS. 5A and 5B. It is contemplated herein that additional auxiliary monitoring fiber port 23 may be added in a similar fashion.

Fiber concentrators 52 and 53 can be easily formed by a conventional ion exchange technique, such as is available from WaveSplitter Technologies of Fremont, Calif. For example, waveguides 32, 34, 36, 38, 40, 41, 45, 33, 35, 37, 39, 47, 49 are formed by doping such signal path to obtain a higher refractive index than the surrounding undoped glass, and thus, can serve as optical waveguides. However, a half-elliptical shape is optically disadvantageous. Therefore, after completion of ion exchange, a vertical electric field is applied to the substrate to draw the positive ions into the glass substrate to create nearly circular doped regions. These serve as the planar optical waveguides surrounded on all sides by the lower-index glass. Other methods are available for forming planar waveguides.

Fibers 124 of FIGS. 7B and 7C are aligned to fiber concentrators 52 and 53 at input face 127 of fiber concentrators 52 and 53. Preferably, the fiber end faces are inclined by about 8 degrees to the waveguides in order to virtually eliminate back reflections onto fibers 124. Other types of concentrator chips and fiber holder substrates are available and are contemplated herein.

Fiber concentrators 52 and 53 preferably create a relatively narrow spread of parallel free-space beams in a linear arrangement for wavelength selective switch 10 and 11. Even when multiple fibers are connected to wavelength selective switch 10 and 11, the fibers are concentrated to an overall width of only about 1 millimeter. The design allows shorter focal length lenses and significantly reduces the overall size of the package. It is also more reliable and highly tolerant to environmental stress than previously described systems. Without a concentrator, the number of fibers connected to wavelength selective switch 10 and 11 would be limited for a given package size.

An example of front end optics 56 is illustrated in more detail in the cross-sectional view of FIG. 8. The free-space beams output by the waveguides, whether planar or fiber, of fiber concentrator 52 or 53 is divergent and forms a curved field. This discussion will describe all the beams as if they are input beams, that is, output from the concentrator in to the free-space optics. The beams are in fact optical fields coupled between optical elements. As a result, the very same principles apply to those of the beams that are output beams which eventually reenter fiber concentrator 52 or 53 for transmission onto the network.

The beam output from fiber concentrator 52 or 53 enters into the wavelength selective switch through field-flattening lens 220, in order to flatten what would otherwise be a curved focal plane of the collimator lens. Field-flattening lens 220 accepts a flat focal plane for the multiple parallel beams emitted from the concentrator. In the reverse direction, field-flattening lens 220 produces a flat focal plane and parallel beams compatible with the end of the concentrator 42 to assure good coupling to waveguides in the concentrator.

In many optical systems, an image is formed on a curved, non-planar surface, typically by beams non-parallel to each other. In many applications such as photographic imaging systems, such minor deviations from a flat field are mostly unnoticeable and inconsequential. However, for a wavelength selective switch based on free-space optics, parallel single-mode fibers, small parallel beams, and planar mirror arrays, a curved image can degrade coupling efficiency. Performance is greatly improved if the optics produce a flat focal plane at output face 44, and on the return trip it will be imaged onto fiber concentrator 52 or 53 waveguide ends. Hence, the ends of the input waveguides in fiber concentrator 52 or 53 are imaged onto the ends of the output waveguides in fiber concentrator 52 or 53, and the efficiency of coupling into the single-mode waveguides strongly depends on the quality of the image. Without the field-flattening lens, it would be very difficult to build a WSS with more than a few fiber ports because the error in focus would significantly increase for fibers displaced away from the optical axis. Field-flattening lens 220 preferably is designed as an optical element with negative focal length, and is thicker at its periphery than at its optical axis in the center. The basic function of the thicker glass at the periphery is to delay the focus of the beams passing therein. The delayed focus serves to create a flat plane of focus points for all beams, rather than a curved plane of foci that would occur otherwise. A field-flattening lens may be implemented as a singlet lens, a doublet, aspheric, or other lens configuration.

A field-flattening lens may, in the absence of further constraints, produce an optical field in which the off-axis beams approach the flat focal plane at angles that increasingly deviate from normal away from the optical axis. Such non-perpendicular incidence degrades optical coupling to fibers arranged perpendicular to the flat focal plane. Therefore, performance can be further improved if the beams are made to approach the focal plane in parallel and in a direction normal to the flat focal plane. This effect of producing parallel beams is referred to as telecentricity, which is aided by long focal lengths.

After field-flattening lens 220, the beams pass through a collimating doublet lens 222, preferably consisting of concave lens 224 joined to convex lens 226. Doublet lens 222 may be a standard lens such as Model LAI-003, available from Melles Griot, which offers superior collimating and off-axis performance. The effective focal length of the assembly may be about 14 mm. Collimating lens 222 is illustrated as following the field-flattening lens 220, which is preferred, but their positions can be reversed with little change in performance.

As an aid to reducing the overall insertion loss of the integrated WSS in FIGS. 1, 2, 4, 5 (although not a strict requirement), prism 228, which may be a simple wedge, preferably is placed between collimating lens 222 and dispersive element 62. Prism 228 pre-corrects for the astigmatism introduced by dispersive element 62. The wedge angle of the prism, along with the type of glass from which it is made, allows elliptically shaped (or astigmatic) beams to be created. If prism 228 is composed of common optical glass, the wedge angle is typically on the order of 25 degrees to compensate for the type of dispersive element 62 considered for the invention. The ellipticity counteracts a similar ellipticity that is an undesirable by-product of dispersive elements. The net result of the prism and grating is a distortion-free optical beam that can be efficiently processed by the remaining optical components in the system and ultimately coupled with high efficiency back into the small core of a single-mode fiber. Field-flattening lens 220, collimating doublet lens 222, and prism 228 are collectively and individually referred to as front-end optics 56.

Figure 9A:
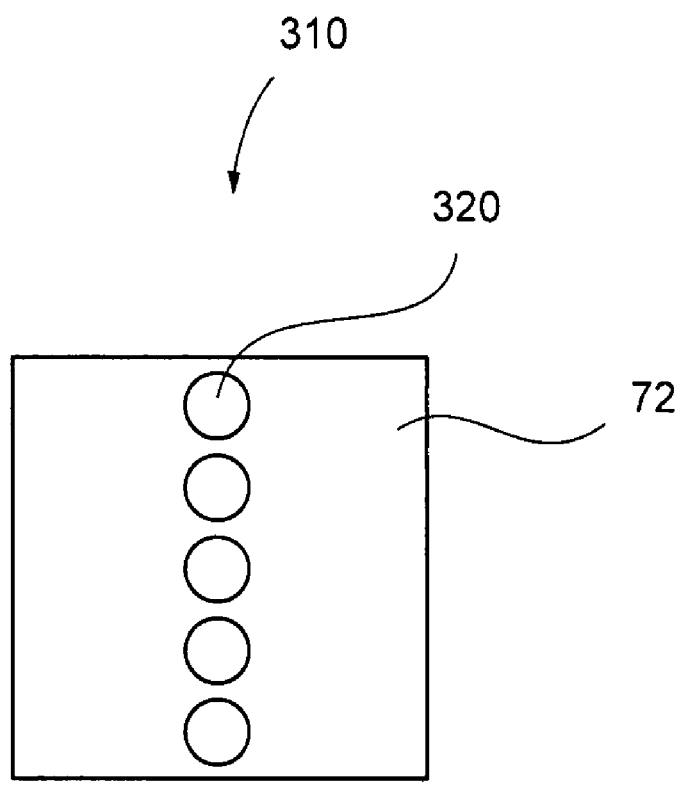
FIG. 9A is a front face view of a first illustrative channel MEMS mirror and five incident beams from the five input fiber ports according to an illustrative embodiment of the present invention.

Referring now to FIG. 9A, a front face view of λ(n) channel MEMS mirror (row A) and five incident beams from the five fiber input fiber ports is illustrated, according to an illustrative embodiment of the present invention. Mirrors 72 and 73 (shown in FIG. 9B) of the mirror array are preferably formed within a single substrate 264 (shown in FIG. 4) in a rectangular two-dimensional array, which is arranged in a switching or monitoring dimension and a wavelength dimension. A typical mirror reflective surface 270 (shown in FIG. 4), is illustrated in the plan view of FIG. 9A, 9B, 9C includes switching mirror array 72 (row A) preferably having dimensions of about 200 micrometers in the x-axis direction and about 250 micrometers in the y-axis direction. The optics are designed to irradiate each mirror of switching mirror array 72, preferably with five elliptically shaped spots 320 representing λ(n) from input fiber ports 12-22. As stated earlier, for example, λ1 mirror of switching mirror array 72 has λ1(12)-λ1(20) from all five input fiber ports 12-20 projected onto λ1 mirror surface via beam steering element 68, and by tilting λ1 mirror of switching mirror array 72 of switch 10 or 11, switches one selected λ1 (12-20) from fiber input fiber ports 12-20 to fiber output port 64 and blocks the remaining unselected λ1(s) from input fiber ports 12-20, and so forth for λ2-λn. In addition, the five elliptically shaped spots 320 are shown in an overlapping manner (as further shown in FIGS. 9C and 12). λ1(12)-λ1(20) represented by spots 320 preferably have a diameter on an x-axis of about 100 micrometers and a diameter on a y-axis of 150 micrometers. The MEMS mirrors of switching mirror array 72 preferably spans about 10 millimeters in the x-axis direction (into the page in FIG. 2). It is contemplated by this invention herein that other dimensions and/or shapes are feasible for switching mirror array 72.

Figure 9B:
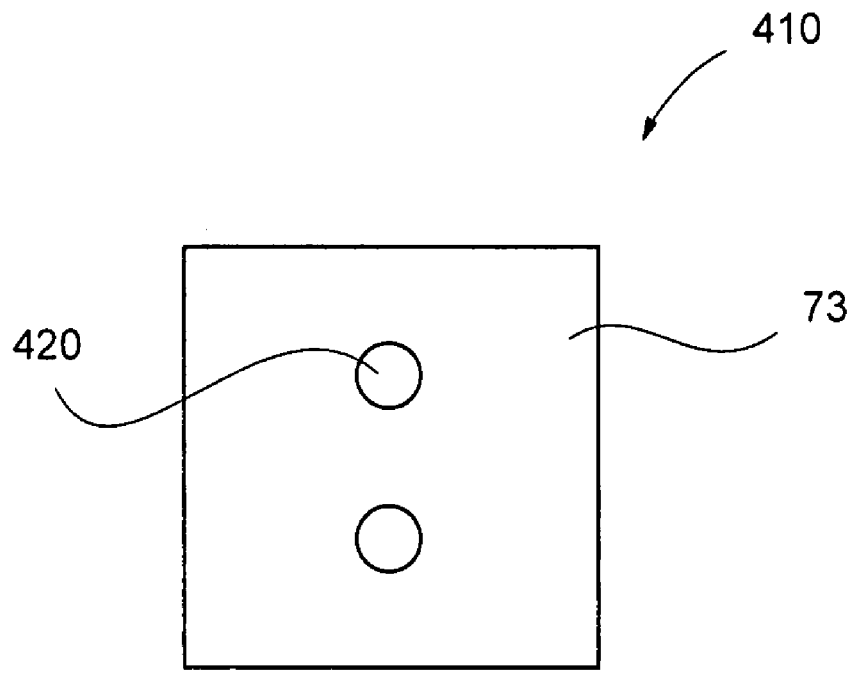
FIG. 9B is a front face view of a second channel MEMS mirror and two incident beams from the two monitoring input fiber ports according to an illustrative embodiment of the present invention.
Figure 9C:
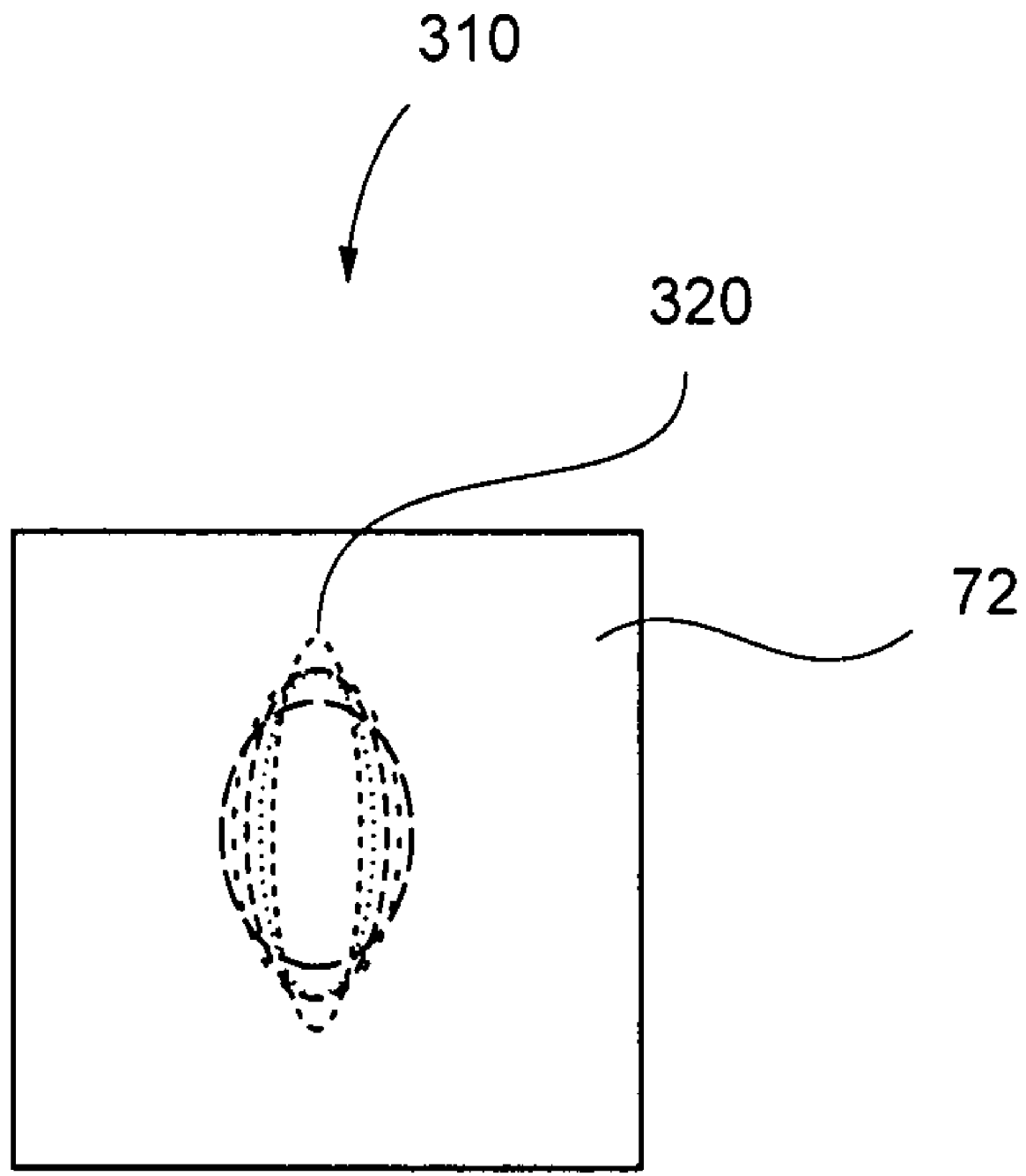
FIG. 9C is a front face view of a third channel MEMS mirror and five incident beams from the five input fiber ports according to a preferred embodiment of the present invention as shown in FIG. 12.

Referring now to FIG. 9B, a front face view of a second channel MEMS mirror (row B) and two incident beams from the two monitoring input fiber ports is illustrated according to an illustrative embodiment of the present invention. A typical mirror reflective surface 270 (shown in FIG. 4), is illustrated in the plan view of FIG. 9B a representative mirror of monitoring mirror array 73 (row B) preferably having dimensions of 200 micrometers in the x-axis direction and 250 micrometers in the y-axis direction. The optics are designed to irradiate each mirror of monitoring mirror array 73, preferably with two elliptically shaped spots 420. As stated earlier, for example λ1 mirror of monitoring mirror array 73 has λ1(21) and λ1(23) from two monitoring fiber ports 21 and 23 projected onto λ1 mirror surface via beam steering element 68, and by tilting λ1 mirror of monitoring mirror array 73 switch 11 switches one selected λ from monitoring fiber ports 21 or 23 to output monitoring fiber port 25 and blocks the remaining unselected λ from monitoring fiber ports 21 and 23 as well as all other λs from monitoring fiber ports 21 and 23. In addition, the two elliptically shaped spots 420 are shown in a non-overlapping manner; however, spots 420 may overlap one another on each mirror of monitoring mirror array 73. λ1(21) and λ1(23), represented by spots 420 preferably have a diameter on an x-axis about 100 micrometers and a diameter on a y-axis of 150 micrometers. The MEMS mirrors of monitoring mirror array 73 span about 10 millimeters in the x-axis direction (into the page in FIG. 2). It is contemplated by this invention herein that other dimensions are feasible for monitoring mirror array 73.

Referring now to FIG. 9C, a front face view of MEMS mirror 72 (row A) shown with five incident beams from the five input fiber ports is illustrated, according to a preferred embodiment of the present invention. As stated earlier, for example, λ1 mirror of switching mirror array 72 has λ1(12)-λ1(20) from all five input fiber ports 12-20 projected onto λ1 mirror surface via segmented prism beam steering element 68, and by tilting λ1 mirror of switching mirror array 72 of switch 10 or 11, switches one selected λ1 (12-20) from fiber input fiber ports 12-20 to fiber output port 64 and drops the remaining unselected λ1(s) from input fiber ports 12-20, and so forth for λ2-λn. The five incident beams λ1 (12-20) are preferably shown in an overlapping manner.

Figure 10:
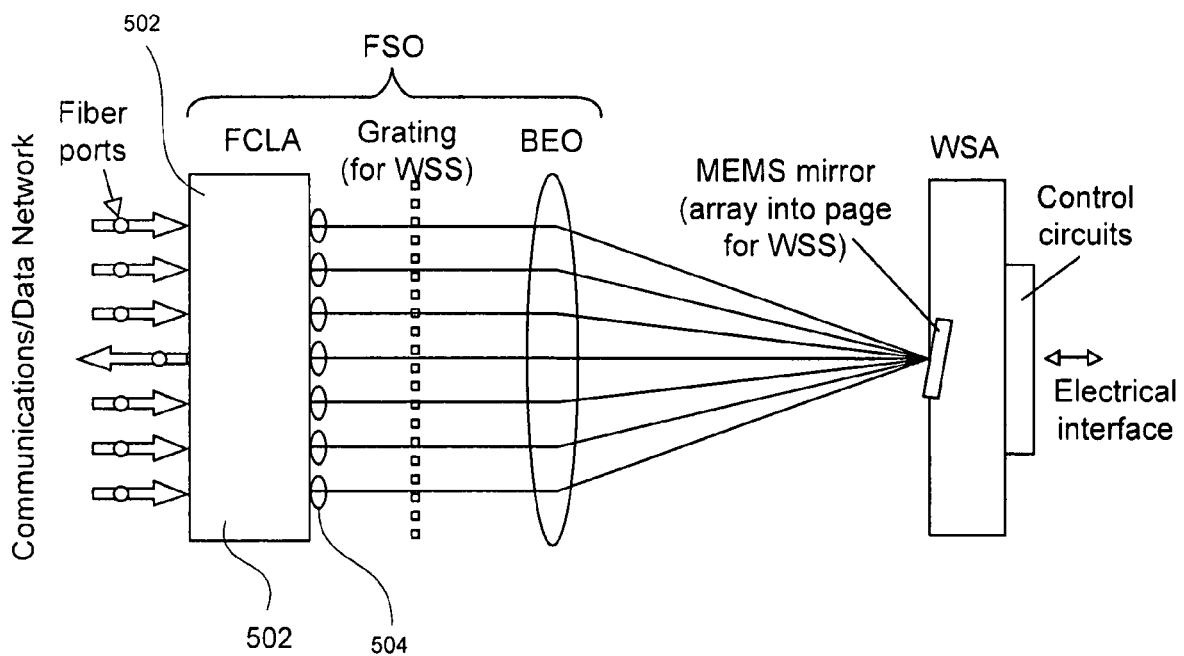
FIG. 10 is a schematic illustration of a six input port by one output fiber port wavelength cross-connect switch according to an alternate embodiment of the present invention.

Referring now to FIG. 10 there is a schematic illustration of a six input port by one output fiber port wavelength selective switch depicting an alternative prior art apparatus for accomplishing an N×1 wavelength selective switch. The wavelength selective switch of FIG. 10 does not include a beam steering element to focus the beams onto the MEMS mirror array. Rather, the wavelength selective switch of FIG. 10 uses a simple lens (or lenses) in its back end optics. Such an embodiment limits the wavelength selective switch of FIG. 10 to a single N×1 or 1×N architecture, and precludes use of multiple N×1 or 1×N switches in a single package, as shown in the other figures. Additionally, wavelength selective switch of FIG. 10 employs a fiber collimating lens array (FCLA) 502 in place of an FCA and FE optics. The FCLA 502 places a small collimating lens 504 at the output of each fiber. This combination of FCLA 502 and collimating lens 504 generally increases the cost and complexity of the system, especially as more fibers are added, since each fiber requires a dedicated collimating lens 504 with varying demanding alignment specifications.

Figure 11:
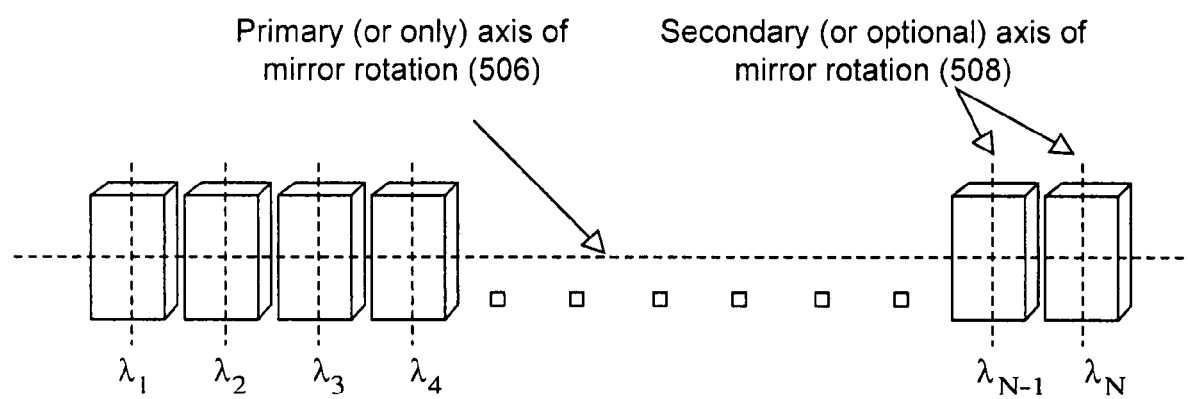
FIG. 11 is an illustration of a typical single-row MEMS mirror array according to an embodiment of the present invention.

Referring now to FIG. 11 there is an illustration of a typical single-row MEMS mirror array $\lambda 1$-$\lambda n$, showing primary axis 506 and optional secondary axis 508 of rotation. Each 1×N or N×1 switch in the preferred embodiment uses one such row. A single MEMS chip may have several such rows.

Figure 12:
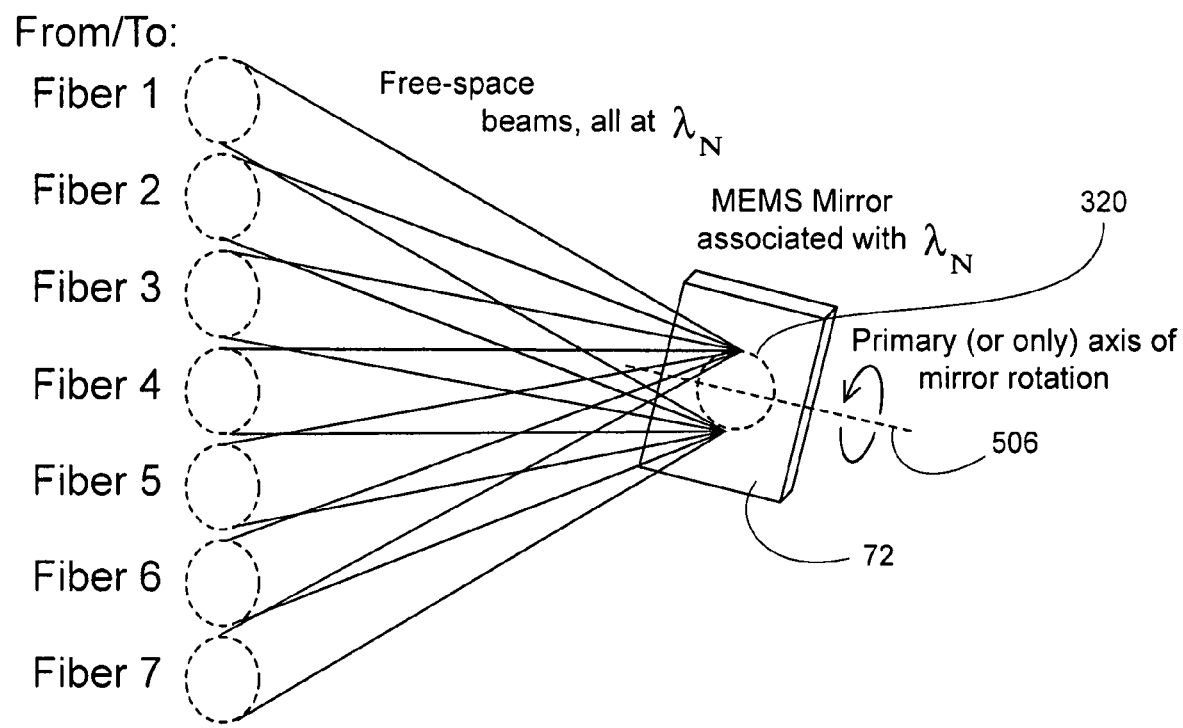
FIG. 12 is a three-dimensional schematic of a MEMS mirror according to an embodiment of the present invention of FIG. 9C.

Referring now to FIG. 12 there is a three-dimensional schematic of a MEMS mirror of FIGS. 9A and 9C. As illustrated in FIG. 12 light beams from/to the input/output fibers 1-7 preferably are all steered onto the switching mirror array 72 by the BSE 68 (as shown in FIGS. 1, 2, and 9C) in an overlapping manner. The seven incident beams to or from the seven input fiber ports are preferably shown in an overlapping manner. It should be recognized that rotation of $\lambda n$ mirror about its primary axis 506 couples a selected $\lambda n$ by reflecting such selected $\lambda n$ to the output fiber 64 (shown in FIGS. 1 and 2), and thus such rotation determines which $\lambda n$ is selected for monitoring or switching. Further, overlapping spots 320 allow more of switching mirror array 72 surface area to be used, allowing for greater tolerance of reflective surface defects of switching mirror array 72.

Figure 13:
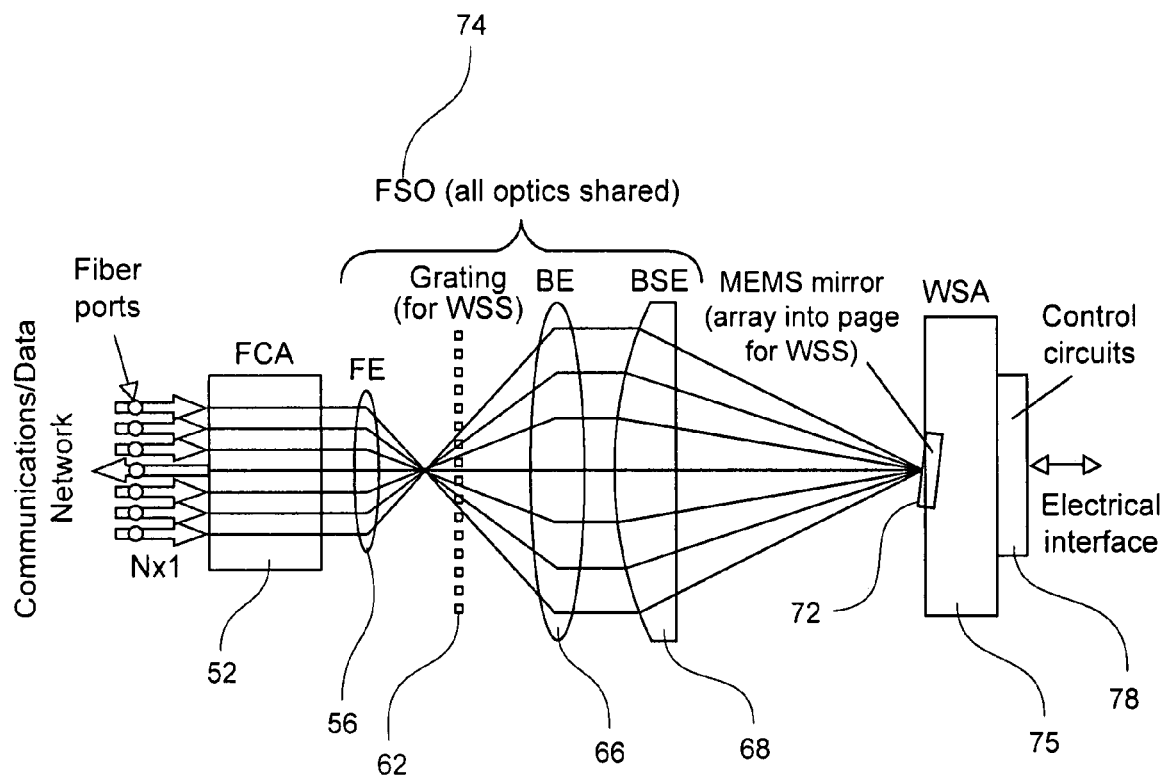
FIG. 13 is a schematic illustration of a six input port by one output fiber port wavelength selective switch according to preferred embodiment of the present invention.

Referring now to FIG. 13 is a schematic illustration of a six input port by one output fiber port wavelength selective switch representing an N×1 switch and is an alternative depiction of the preferred embodiment of the present invention shown in FIG. 1. This depiction emphasizes the present invention's ability to share all free space optics (FSO) 74, including front end optics (FE) 56, dispersive element 62, back end optics (BE) 66, beam steering element (BSE) 68, and the elimination of collimating lenses 504 of FIG. 10.

Referring now to FIG. 14 there is a three-dimensional schematic of a wavelength selective switch according to an embodiment of the present invention. The wavelength selective switch of FIG. 14 may represent an N×1 or 1×N embodiment of the present invention with element numbering as set forth in FIGS. 1 and 2.

Referring now to FIG. 15 there is a schematic illustration of a dual wavelength selective switch 12 with BSE-based architecture for creating manifold or multi-packaged switches within the same package. Terminology of manifold, co-packaged, and multi-packaged is used inter changeably herein as one or more optical switches packaged together and comprising an optical system. FIG. 15 uses the same 'cutaway' view as FIGS. 1 and 13 (1×N switch 10) to illustrate an advantage of the present invention's BSE-based architecture for creating manifold or multi-packaged switches within the same package, while reaping the benefits of re-use and sharing of free space optics (FSO) 74 (including front end optics (FE) 56, dispersive element 62, back end optics (BE) 66, beam steering element (BSE) 68), baseplate, housing, FCA 52, MEMS control circuitry 78, common MEMS array although each mirror is dedicated to one manifold or multi-packaged switch, and input/output fibers (fiber management fixture) although each fiber is dedicated to one manifold or multi-packaged switch. By adding an additional row of mirrors 72.1 to the existing switching mirror array 72, adding additional waveguides to FCA 52, and adding additional facets to BSE 68, a dual or second N×1 switch 10.3 is defined and is shown in the lower-left and upper-right parts of FIG. 15. The wavelength selective switches 10 and 10.3 of FIG. 15 operate independently of one another (that is, their light paths do not interact and such switches are capable of independent switching), while sharing the same housing and common components. It should be recognized that BSE 68 is capable of refracting light beams at arbitrary angles; thus, allowing multiple steering points for $\lambda n$, on multiple mirror rows, to exist. FIG. 15 illustrates a 'cutaway' view of one wavelength $\lambda n$, and that each MEMS mirror shown represents a row of mirrors coming out of the page, each mirror corresponding to a different wavelength $\lambda n$ separated out by dispersive element 62 and positioned by BSE 68.

Although this figure depicts two independent switches 10 and 10.3, the concept can easily be extended to three, four, or an arbitrary number of switches by adding more rows of MEMS mirrors 72, more FCA 52 waveguides, and more BSE 68 facets. If desired, each N×1 or 1×N switch in the package can have a different value of 'N', down to N=1. Also, any arbitrary combination of N×1 or 1×N configured switches can be used by altering the external fibering. All of this is possible because of the BSE 68's ability to refract an arbitrary number of rays at arbitrary angles, although at some point of increasing the number of switches BSE 68 may become impractically complex.

Use of common components by multiple internal N×1 or 1×N switches enables advantages in physical size, thermal output, electrical power consumption, ease of manufacture, and materials and labor costs, when compared to a solution involving multiple switches built and packaged independently.

Figure 16:
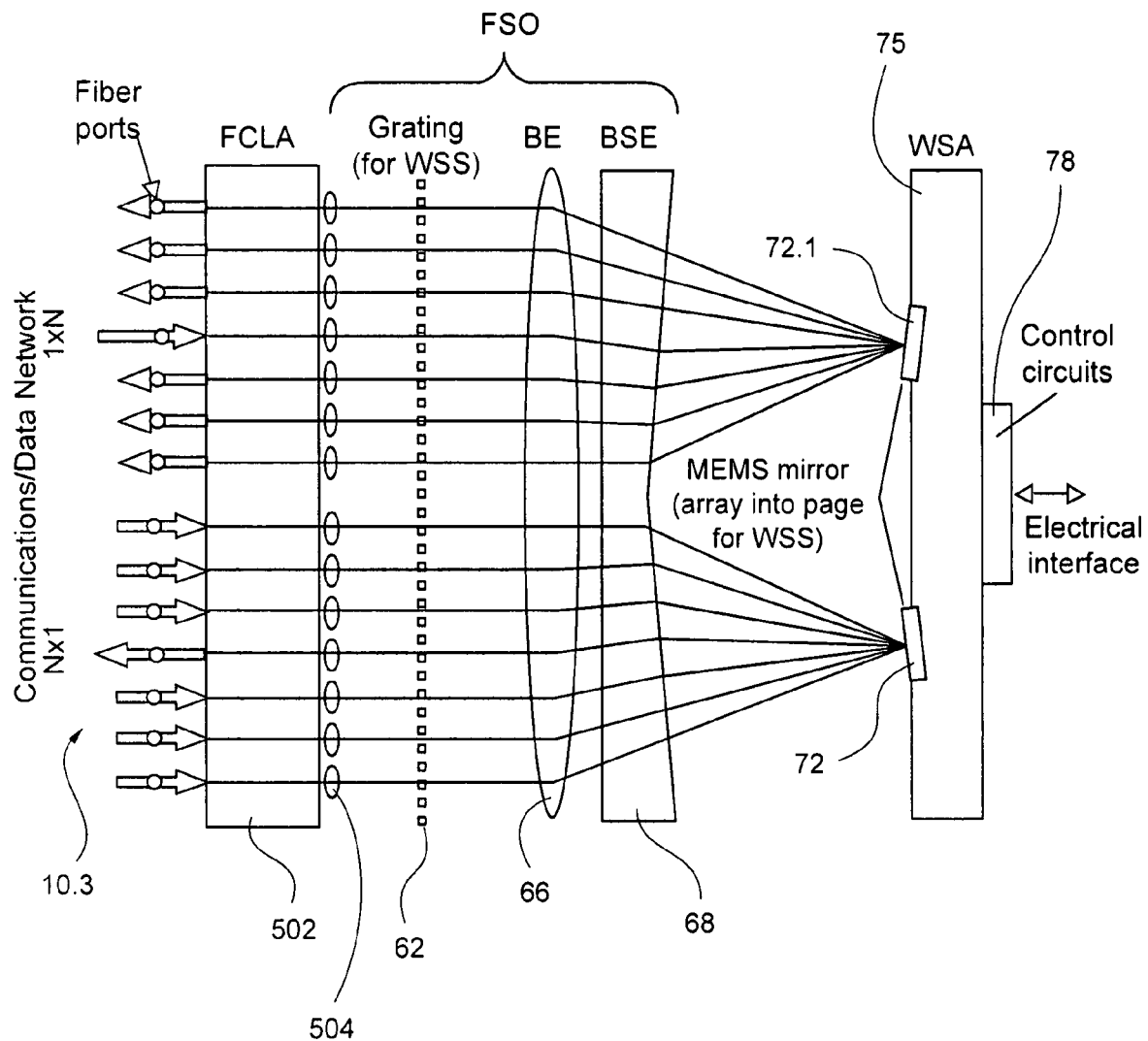
FIG. 16 is a schematic illustration of a wavelength selective switch with BSE-based architecture FCLA-based optics of FIG. 10 according to an alternate embodiment of the present invention.

FIG. 16 illustrates a variation of the BSE-based architecture of the switch in FIG. 15, in combination with FCLA-based optics with lenslets 504 of FIG. 10. The BSE architecture can be used with this type of optical input, as well as the FCA 52 and FE 56 shown in FIGS. 1, 2, and 15. An advantage of this approach is that the complexity of BSE 68 is significantly reduced.

Figure 17A:
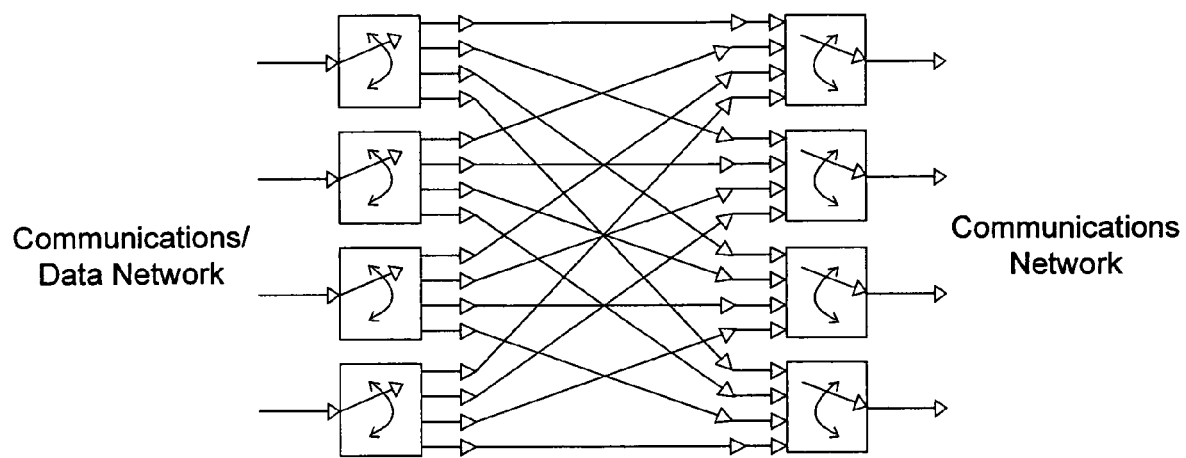
FIGS. 17A and 17B are schematic illustrations of a 4-input-fiber by 4-output-fiber optical switch, made up of four 1×N and four N×1 wavelength selectable switches.
Figure 17B:
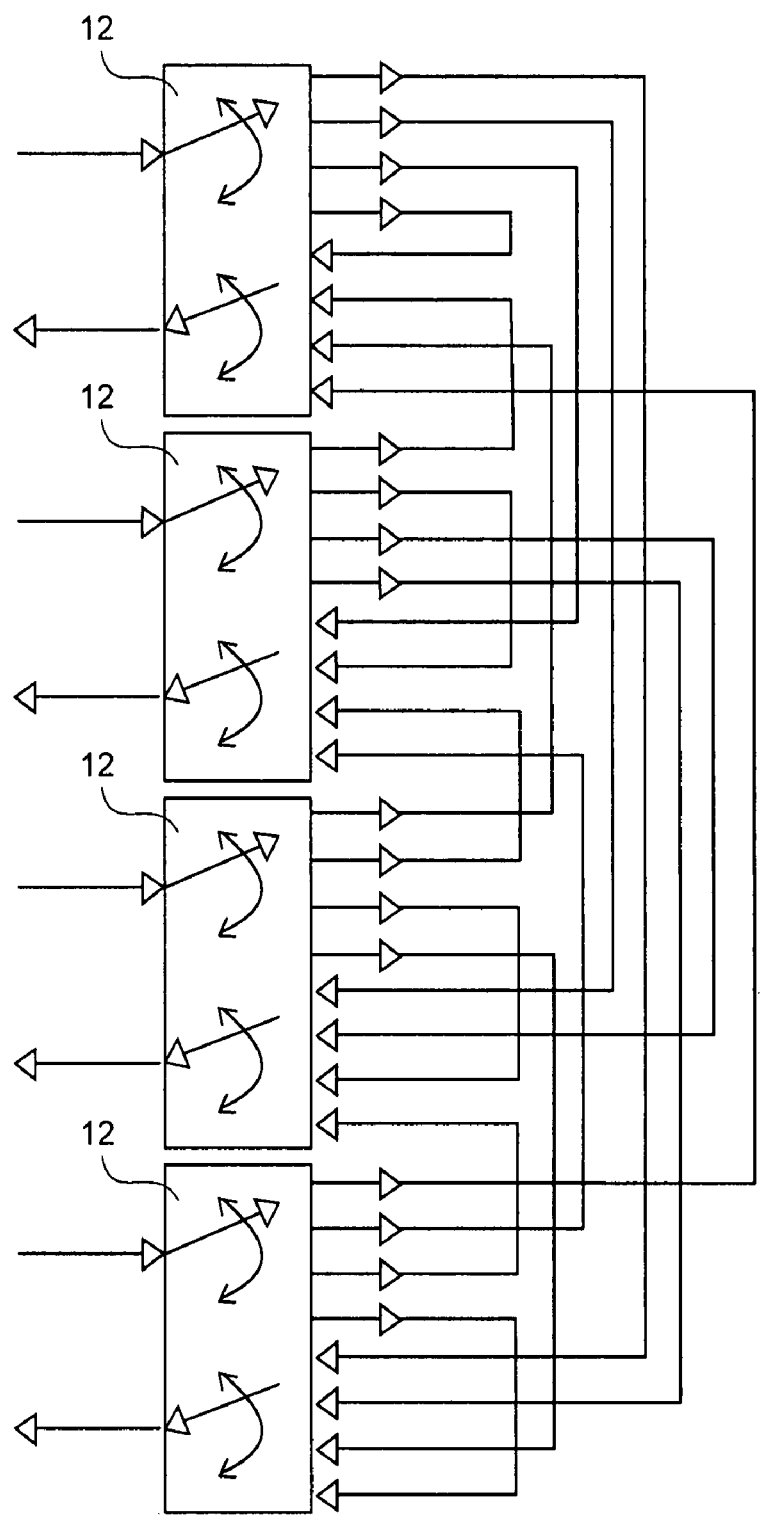

Referring now to FIGS. 17A and 17B there is a schematic illustration of an advantage of the present invention. FIG. 17A is prior art that illustrates schematically a 4-input-fiber by 4-output-fiber optical switch, made up of four 1×N and four N×1 wavelength selectable switches. This is a common switch architecture used in telecom industry. In FIG. 17B, is a schematic illustration of the same 4×4 switch 12, but utilizing an embodiment of the present invention of FIG. 15, wherein two switches are co-packaged in the same device. It should be recognized that the switch shown in FIG. 17B utilizes the advantages listed above in the description of FIG. 15, compared to the "one-switch-per-device" architecture of FIG. 17A. Although both figures show a 4×4 switch, the concept can easily be extended to any value of M×N. Likewise, although FIG. 17B illustrates two switches in each device, any number of switches can be combined using the concept of the present invention. Other telecom architectures that employ multiple optical switches, such as East-West dual rings, can also benefit from the embodiments of this invention.

Figure 18A:
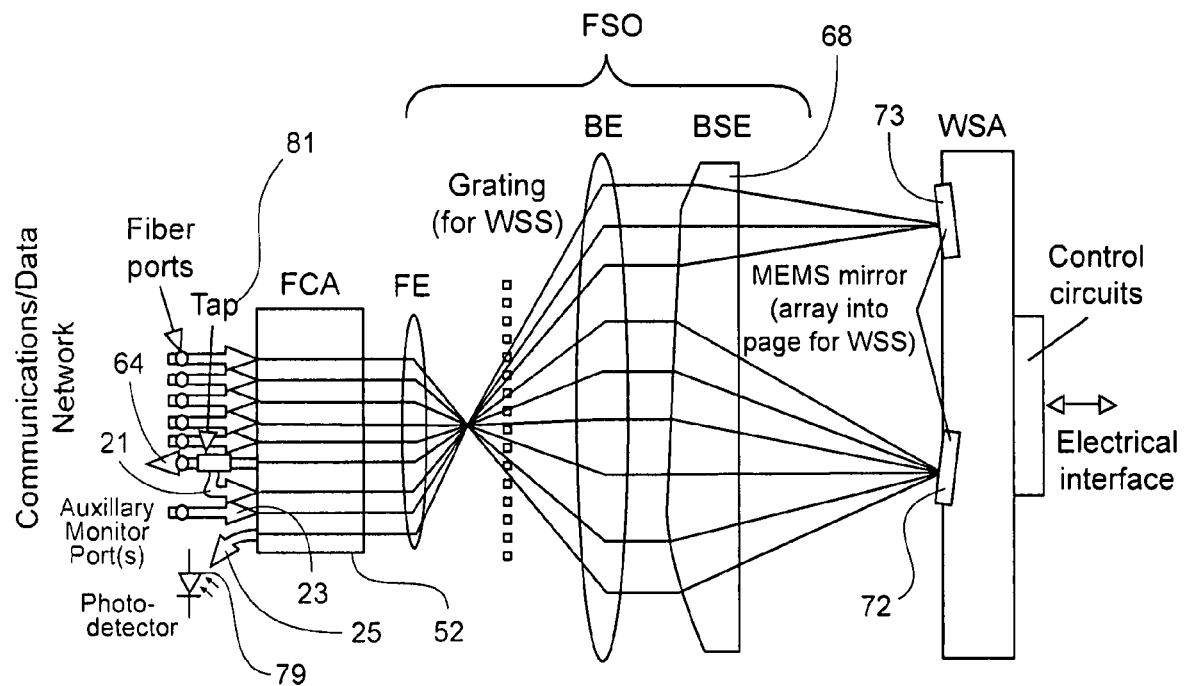
FIG. 18A is a schematic illustration of a five input port by one output fiber port wavelength cross-connect switch according to an alternate embodiment of the present invention.

FIG. 18A is a schematic illustration of additional aspects and advantages of the present invention. In this embodiment, BSE 68 is constructed with prisms that direct beams to two rows of mirrors. The lower row switching mirror array 72 is used to switch 5×1 signals as shown in FIG. 15. The upper row monitoring mirror array 73 is used to switch 2×1 monitoring beams as a separate switch. The output of the 2×1 monitoring switch is directed to a photodetector 79 serving as an integrated optical power monitor (OPM). By sequentially switching each mirror 73 in the array to send selected beam to photodetector 79, while dropping all other wavelengths, such switch obtains, in a short period of time, the optical power of all wavelengths of monitoring fiber port 21. It is contemplated that optical switching and monitoring system is capable of monitoring two fiber ports 21 and 23 sequentially, and this concept is expandable to an arbitrary number of monitoring ports and/or wavelengths. Each wavelength of monitoring fiber port 21 is monitored one at a time, by tilting monitoring mirror array 73 to the correct angle to couple its light into output monitoring fiber port 25 from tap 81, wherein the tapped signal from output fiber port 64 is coupled to monitoring fiber port 21. It should be recognized that a key advantage of using one WSS as a fiber switch, and the other as a channel selector for an OPM, is that the 'sensor' and 'actuator' of the optical power feedback loop are both contained in the same module, and benefit from refuse of internal components as described above.

Figure 18B:
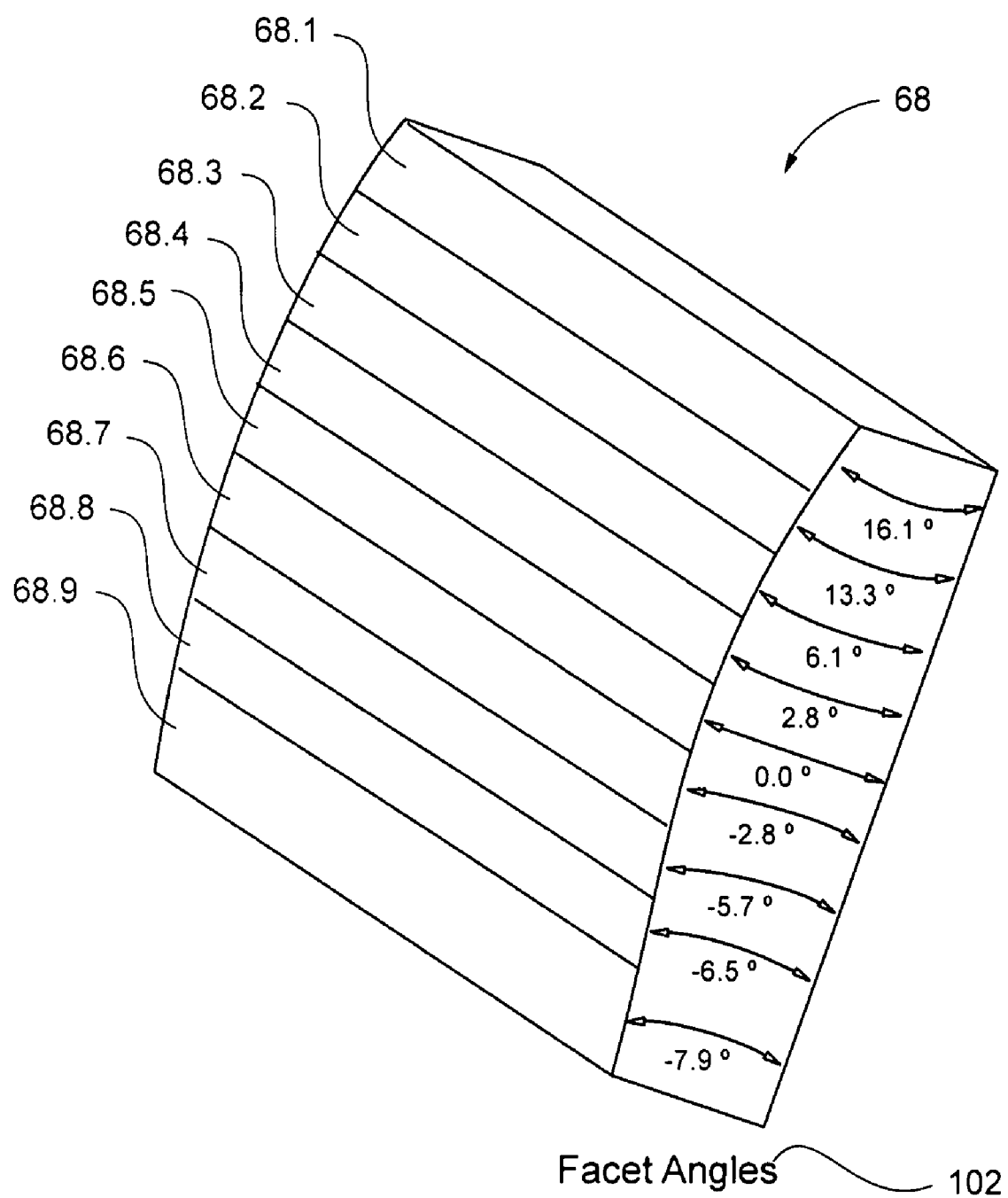
FIG. 18B is a schematic illustration of an optical beam steering element included in the WSS of FIG. 18A.

Referring now to FIG. 18B there is a physical illustration of a preferred embodiment of FIG. 3A, illustrating the design flexibility afforded by BSE 68, wherein such BSE 68 is fabricated to have varying refraction angles (facet angles). Facet angles of deflection for the five input fiber wavelengths, two input monitor fiber wavelengths, one output monitoring fiber wavelength, and one output fiber wavelength model preferably are 16.1, 13.3, 6.1, 2.8, 0.00, −2.8, −5.7, −6.5, −7.9 degrees. The angles shown in this example correspond to the 5×1 plus 2×1 embodiment shown in FIG. 18A. Beam steering element 68 preferably refracts wavelength-separated beams from back end optics 66 and steers such beams onto switching mirror array 72 and monitoring mirror array 73 based on the refractive indices of each segment 68.1-68.9, whether focusing all λn beams on a λn mirror of switching mirror array 72, monitoring mirror array 73, or focusing some λn beams onto one mirror and other λn beams on another mirror or a mirror in a different row. Beam steering element 68 preferably refracts λn from each input port 12, 14, 16, 18, 20, 22 onto λn mirror of switching mirror array 72 (as shown in FIG. 9C) of switching mirror array 72 assigned to λn and each λn from each input port 21, and 23 onto λn mirror of monitoring mirror array 73. For example, preferably λ1 mirror of switching mirror array 72 has λ1(12)-λ1(22) from all input fiber ports 12-22 projected onto λ1 mirror surface via beam steering element 68, and by tilting λ1 mirror of MEMS switching mirror array 72, wavelength selective switch 10 preferably switches one selected λ1 (12-22) from input fiber ports 12-22 to output fiber port 64 and blocks the remaining unselected λ1(s) from input fiber ports 12-22, and so forth for λ2-λn. Each λn mirror of switching mirror array 72, in this example, preferably has five input beams projected simultaneously onto the surface of such mirror, all at wavelength λn, wherein those five beams are preferably demultiplexed and focused by free space optics 74 from input fiber ports 12, 14, 16, 18, 20 respectively. In addition, preferably λ1 mirror of monitoring mirror array 73 has λ1(21) and λ1(23) from input monitoring fiber ports 21 and 23 projected onto λ1 mirror surface via beam steering element 68, and by tilting λ1 mirror of MEMS monitoring mirror array 73, wavelength selective switch 10 preferably switches one selected λ1 (21-23) from input monitoring fiber ports 21 and 23 to output monitoring fiber port 25 and blocks the remaining unselected λ1(s) from input monitoring fiber ports 21 and 23, and so forth for λ2-λn.

Figure 19A:
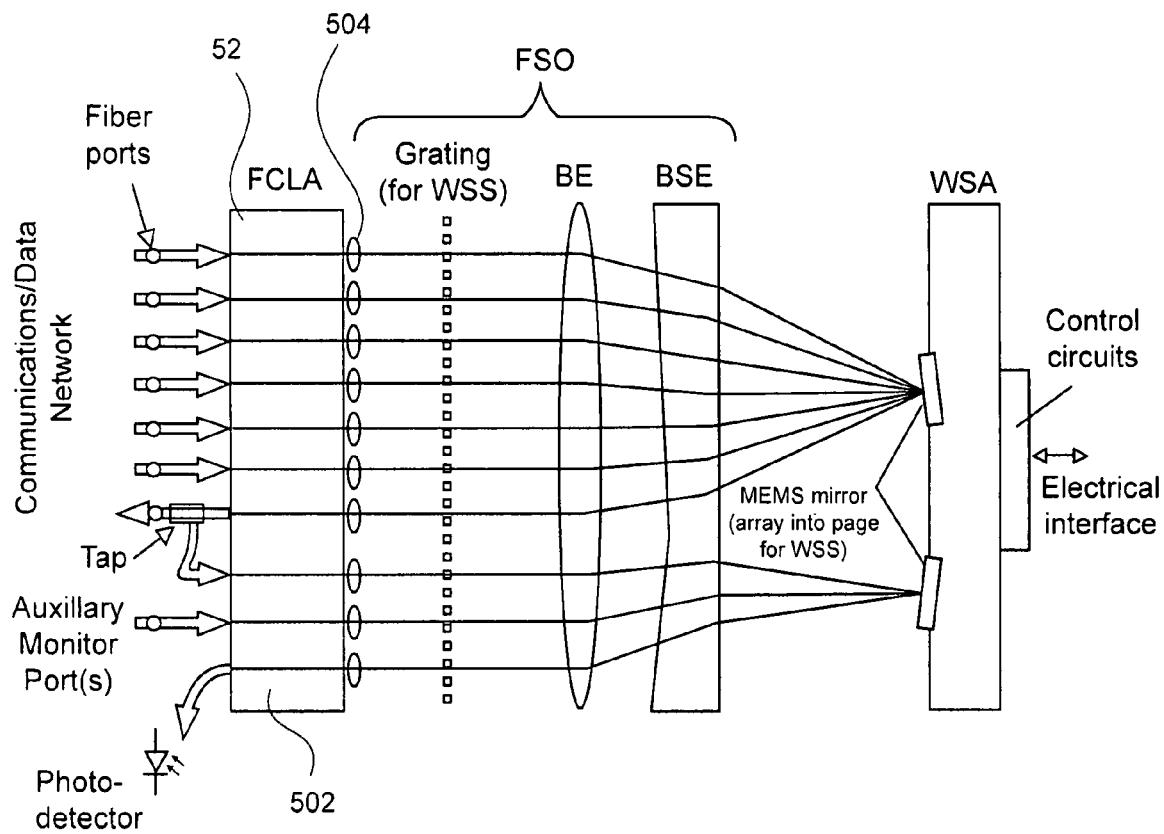
FIG. 19A is a schematic illustration of a six input port by one output fiber port wavelength selective switch according to an alternate embodiment of the present invention.

Referring now to FIG. 19A, which illustrates the combination switch plus OPM of FIG. 18A, this time with the FCLA 502 and lenslet 504 as illustrated in FIG. 10.

Figure 19B:
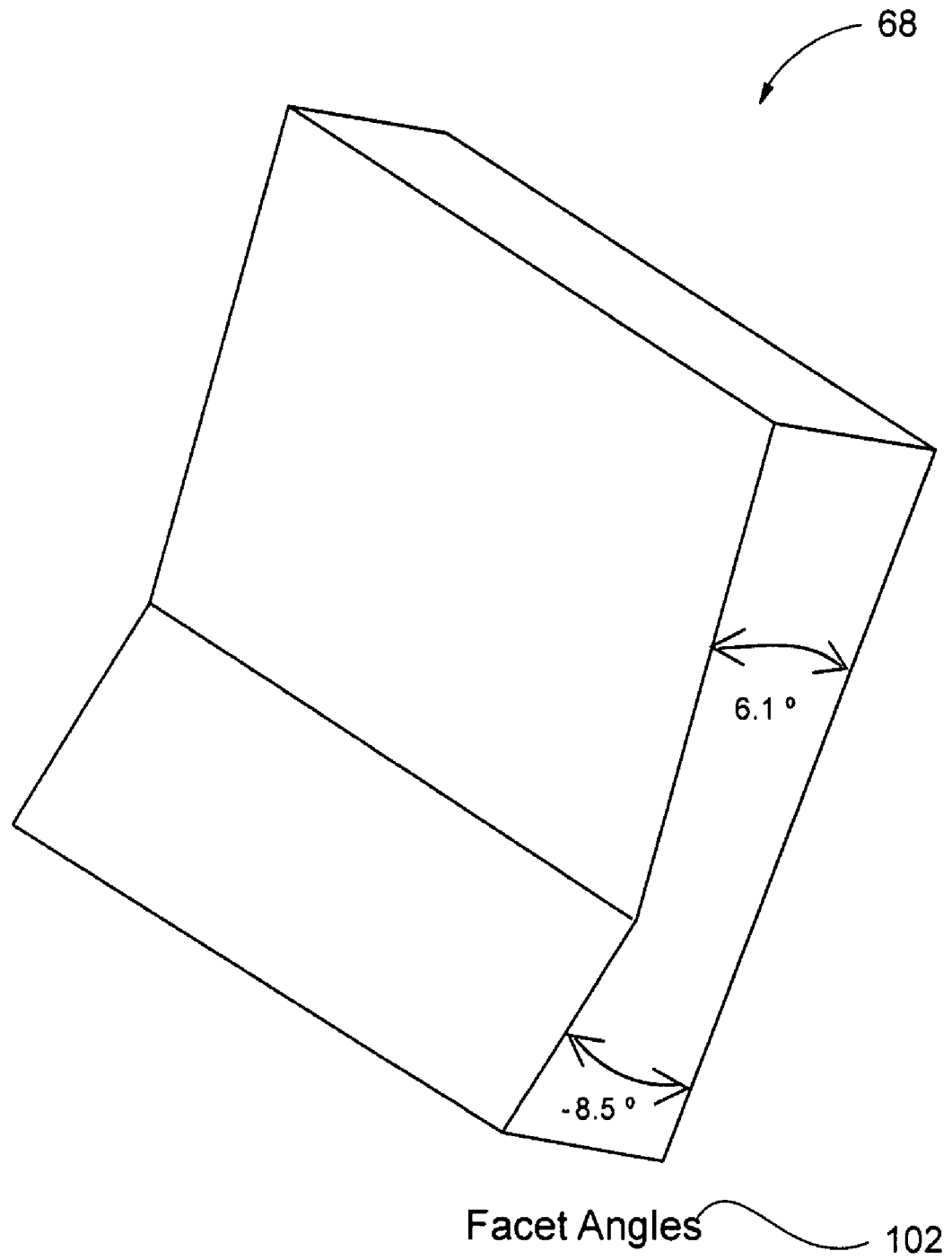
FIG. 19B is a schematic illustration of an optical beam steering element included in the WSS of FIGS. 1 and 2, 19A.

Referring now to FIG. 19B there is illustrated a variation of FIGS. 3A and 18B, illustrating the design flexibility afforded by BSE 68, by fabricating the BSE with arbitrary refraction angles. The angles shown in this example correspond to the 5×1 plus 2×1 embodiment shown in FIG. 19A. It should be recognized from FIGS. 3A, 18B, and 19B that BSE 68 is a versatile element that can be designed with an arbitrary set of prisms to accomplish refraction for a variety of embodiments and variations of the present invention. Both "FCA" plus "FE" type optical architectures can also be accommodated; and arbitrary combinations of N×1 or 1×N switches can also be accommodated by changing the number of facets and/or their refraction angles of BSE 68.

Figure 20:
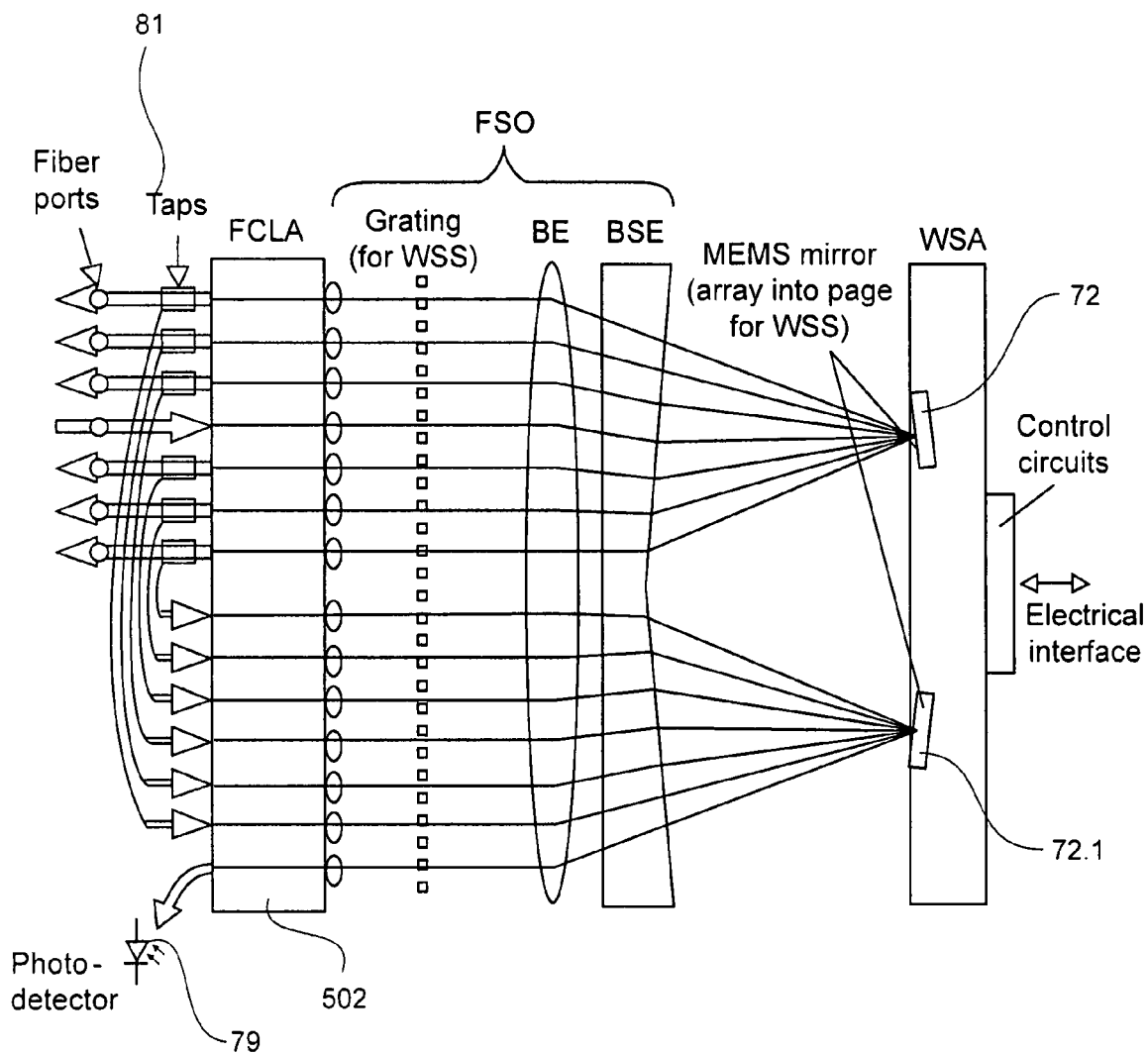
FIG. 20 is a schematic illustration of an input port by six output fiber port wavelength selective switch according to an alternate embodiment of the present invention.

Referring now to FIG. 20 there is an illustration of a variation of the switch in FIG. 16, in which switching mirror array 72 operates a 1-input and 6-output optical switch having taps 81 for each of the six output fiber ports of the top switch. In order to monitor power on all output fibers for control loop purposes, each output fiber port is tapped using taps 81 and fed to a 6-in and 1-out bottom switch co-packaged with the first top switch. The 6-in and 1-out switch selects and sends its output to photodetector 79 for monitoring. Although it is not shown, the same concept could be applied to a WSS using "FCA" plus "FE" type optical architecture, and to arbitrary numbers of fibers.

Figure 21:
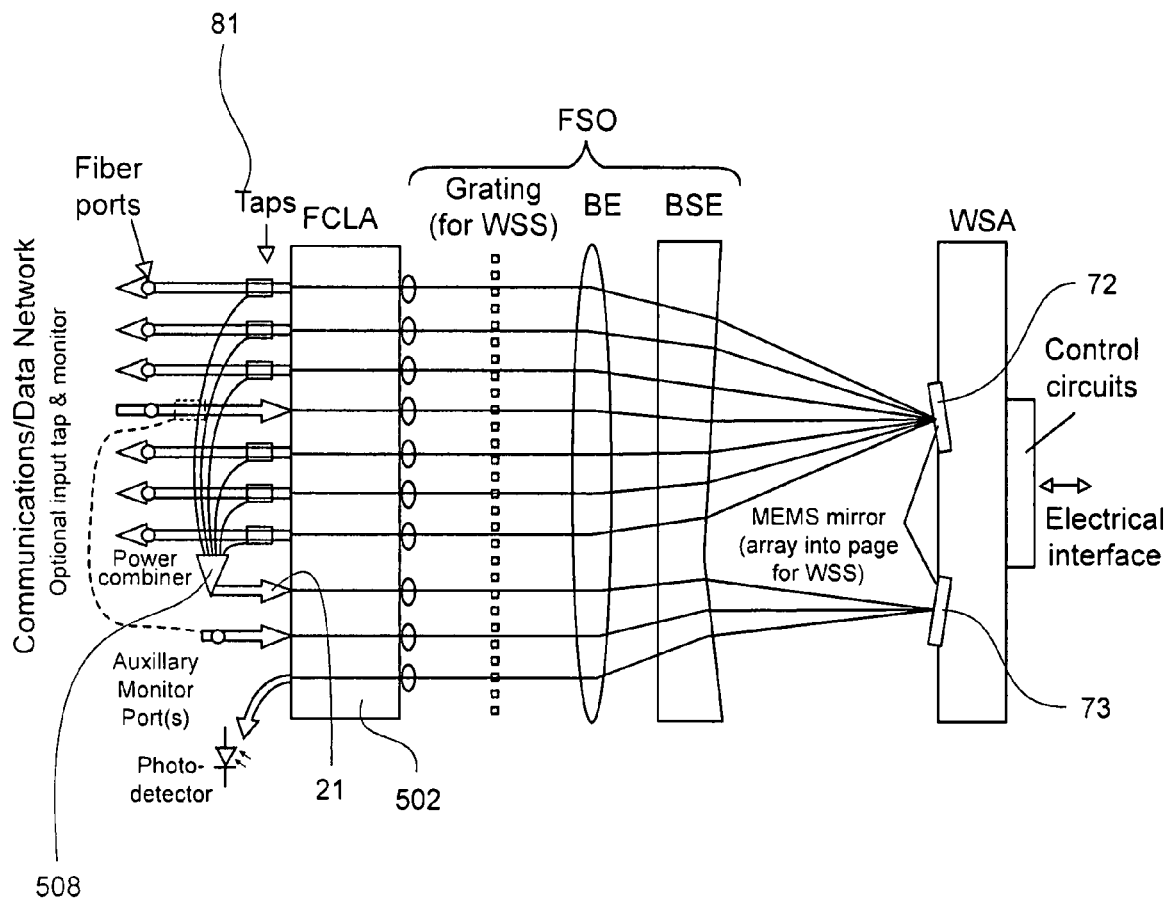
FIG. 21 is a schematic illustration of an input port by six output fiber port wavelength selective switch according to an alternate embodiment of the present invention.

Referring now to FIG. 21 there is a variation of the switch in FIG. 19A, in which power combiner 508 is used to combine all wavelengths from the six output fiber ports, which are each tapped using taps 81, fed to power combiner 508 and selectively coupled, using power combiner 508, to monitoring fiber port 21. In this embodiment, the optical switching and monitoring system has fewer ports than in the example of FIG. 20, possibly reducing the number of components simplifying the design. Although it is not shown, the same concept could be applied to a WSS using "FCA" plus "FE" type optical architecture, and to arbitrary numbers of fibers.

Figure 22A:
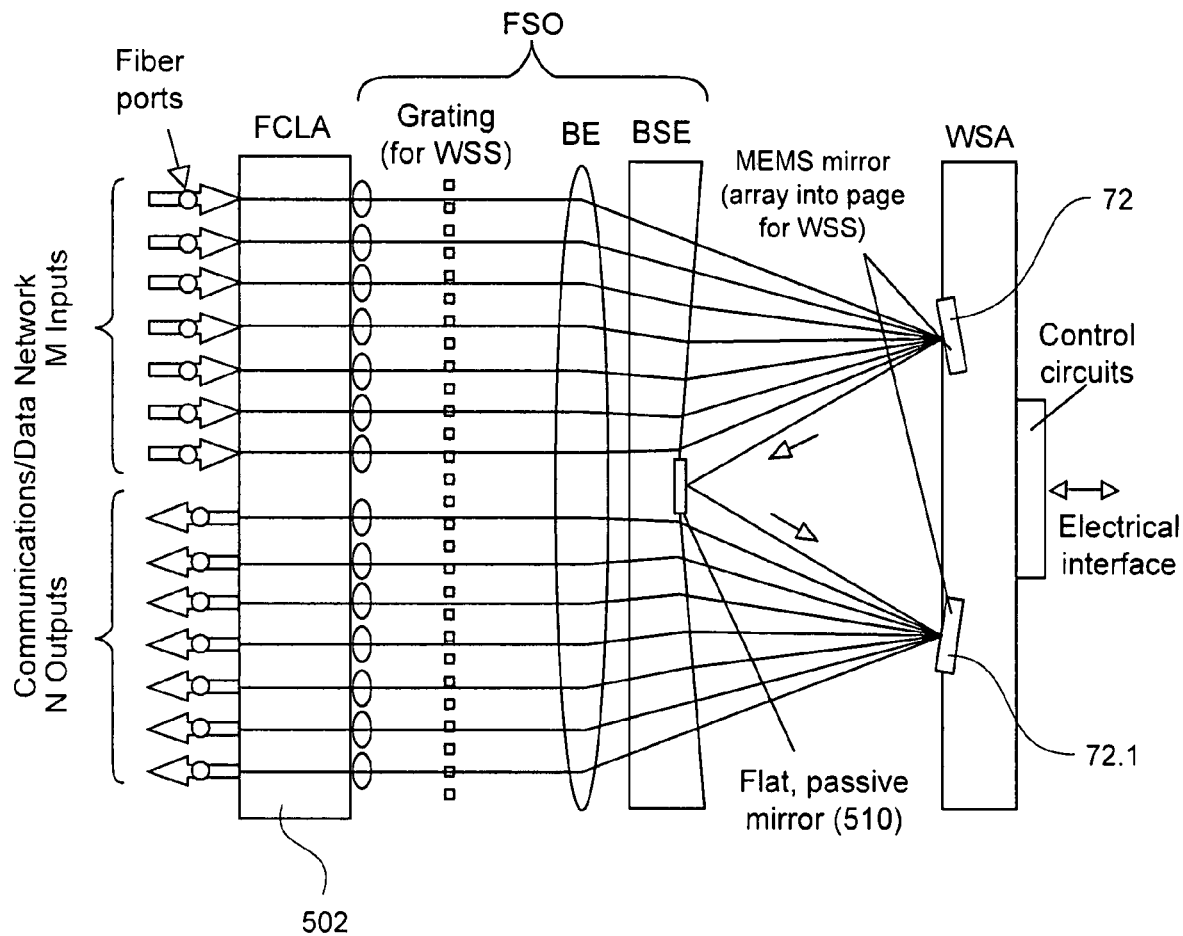
FIG. 22A is a schematic illustration of a six input port by six output fiber port wavelength selective switch according to an alternate embodiment of the present invention.

Referring now to FIG. 22A there is illustrated an alternative embodiment of the present invention. In FIG. 22A, one of the independent switches is configured to accept M inputs and focus them onto one row of a first switching mirror array 72. Each mirror in switching mirror array 72 (one mirror per wavelength) tilts to select one of the inputs for reflection onto a fixed (stationary) mirror 510, which can be patterned directly onto BSE 68 or placed elsewhere in the system. Fixed mirror 510 reflects the beam onto one row of a second switching mirror array 72.1. Each mirror in second switching mirror array 72.1 tilts to the angle necessary to project its beam to the selected one of N outputs. The system thus operates as an M-input by N-output switch, since any input can be coupled to any output. Although it is not shown, the same concept could be applied to a WSS using "FCA" plus "FE" type optical architecture, and to arbitrary numbers of fibers. This alternative embodiment of the present invention is different from the M×N optical switches described in U.S. Pat. No. 6,097,859 (Solgaard et al) because each wavelength in the present invention can only exit the unit on one output fiber at a time. In the referenced Solgaard patent, the M×N establishes multiple in-to-out paths on the same wavelength; however, the present invention teaches a simpler design, using fewer mirror rows, for example.

Also, in this and other inventions which incorporate two mirrors in the light path, an additional advantage can be gained when using Pulse Width Modulated (PWM) signals to drive the mirrors, as described in U.S. Pat. Nos. 6,543,286 (Garverick, et al), 6,705,165 (Garverick, et al), and 6,961,257 (Garverick, et al). By operating each of the two mirrors in the path with complementary pulse trains, any insertion loss (IL) ripple caused by mechanical vibration of the mirrors can be reduced by operating each mirror with a complementary pulse train. This causes any mechanical vibration in one mirror to occur 180 degrees out of phase with the other mirror, thus canceling IL ripple in the optical signal.

Figure 22B:
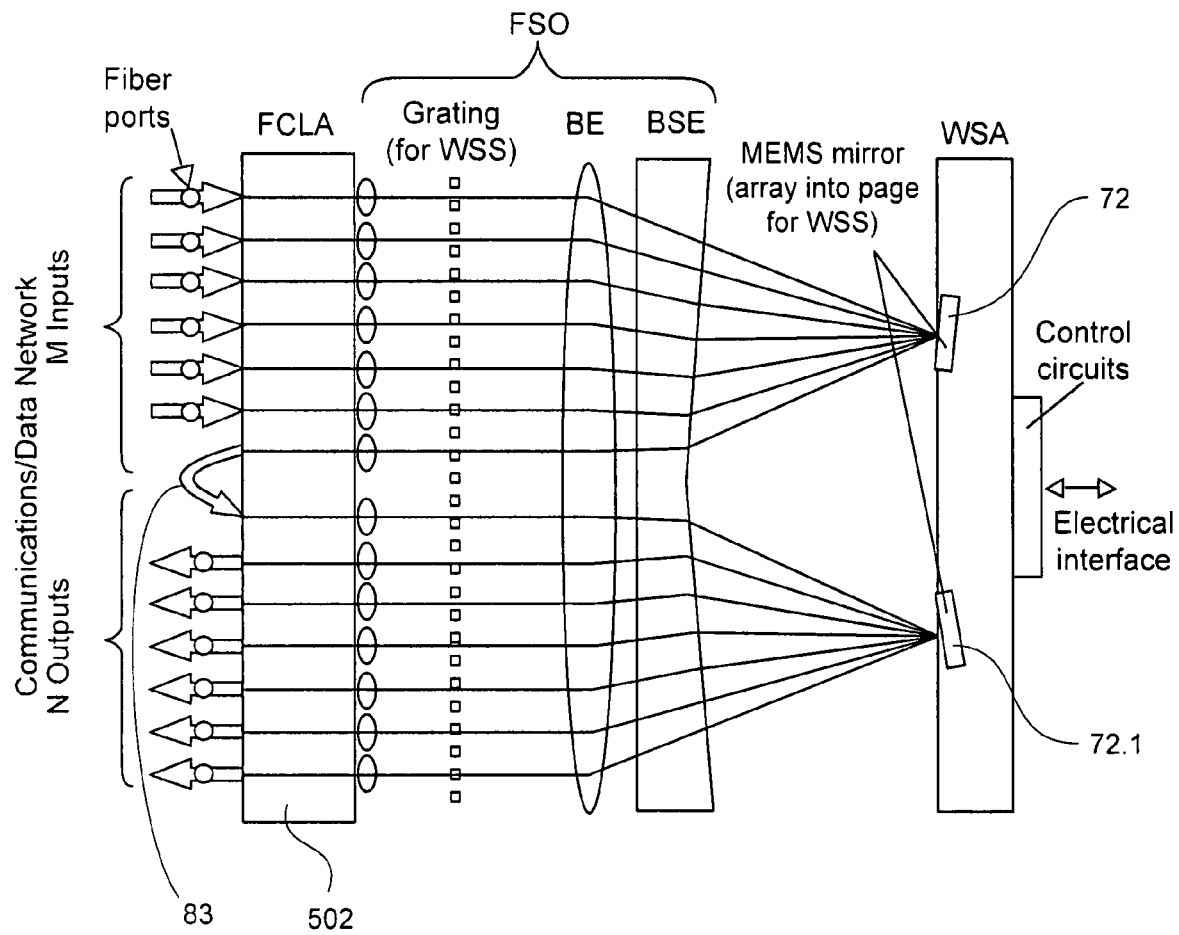
FIG. 22B is a schematic illustration of a six input port by six output fiber port wavelength selective switch according to an alternate embodiment of the present invention.

Referring now to FIG. 22B there is illustrated an alternative embodiment of the present invention which accomplishes the same M×N switching functionality of FIG. 22A. In this embodiment, there is no stationary mirror. Instead the input-side switch is configured as an N×1, and the output side as a 1×N. The output of the first switch is coupled to the input of the second, either by fiber splicing, jumpering via fiber connectors 83, on-chip patterning of waveguides, or the like. Although it is not shown, the same concept could be applied to a WSS using "FCA" plus "FE" type optical architecture, and to arbitrary numbers of fibers. This alternative embodiment of the present invention is different from the M×N optical switches described in U.S. Pat. No. 6,097,859 (Solgaard et al) because each wavelength in the present invention can only exit the unit on one output fiber at a time. In the referenced Solgaard patent, the M×N establishes multiple in-to-out paths on the same wavelength; however, the present invention teaches a simpler design, using fewer mirror rows, for example.

Figure 23:
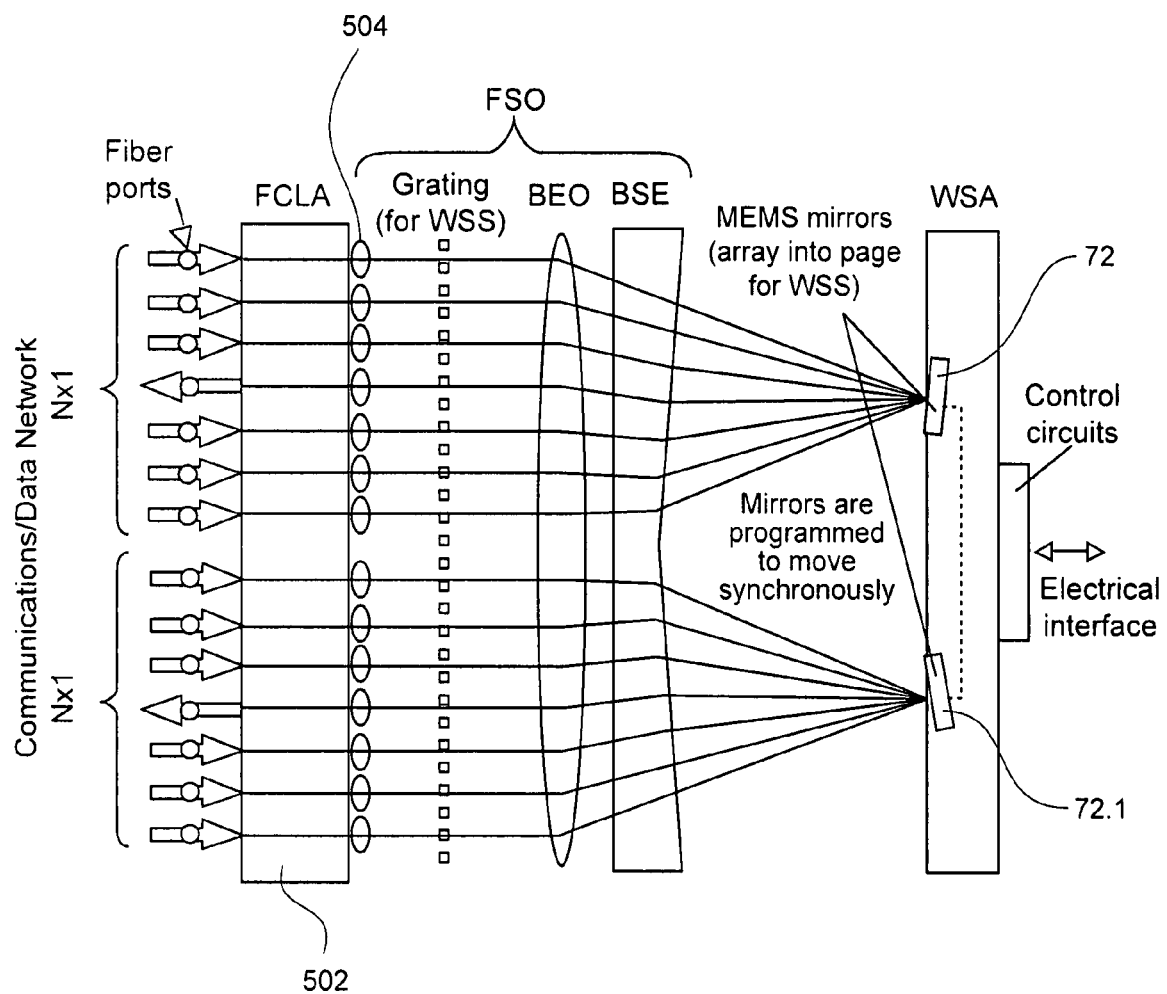
FIG. 23 is a schematic illustration of a six input port by six output fiber port wavelength selective switch according to an alternate embodiment of the present invention.

Referring now to FIG. 23 there is illustrated an alternative embodiment of the present invention. In FIG. 23 the switch is configured as two identical, independent switches. In this embodiment first and second switching mirror arrays 72 and 72.1 are operated such that they move synchronously. Although it is not shown, the same concept could be applied to a WSS using "FCA" plus "FE" type optical architecture, and to arbitrary numbers of fibers, numbers of co-packaged switches, and arbitrary port designations (input versus output).

With respect to the above description then, it is to be realized that the optimum dimensional relationships for the parts of the invention, to include variations in size, materials, shape, form, position, function and manner of operation, assembly and use, are intended to be encompassed by the present invention. Moreover, where the references are made to a 1×5 or 5×1 optical wavelength selective switch, the concepts are also applicable to other fiber counts such as 1×N, N×1 or N×N.

The invention disclosed and claimed relates to the various modifications of assemblies herein disclosed and their reasonable equivalents and not to any particular fiber count or wavelength count optical wavelength selective switch. Although the invention has been described with respect to a wavelength selective switch, many of the inventive optics can be applied to white-light optical switches that do not include wavelength dispersive elements. Although moveable micro-mirrors are particularly advantageous for the invention, there are other types of MEMS mirrors than can be electrically actuated to different positions and/or orientations to affect the beam switching of the invention.

The foregoing description and drawings comprise illustrative embodiments of the present invention. Having thus described exemplary embodiments of the present invention, it should be noted by those skilled in the art that the within disclosures are exemplary only, and that various other alternatives, adaptations, and modifications may be made within the scope of the present invention. Many modifications and other embodiments of the invention will come to mind to one skilled in the art to which this invention pertains having the benefit of the teachings presented in the foregoing descriptions and the associated drawings. Although specific terms may be employed herein, they are used in a generic and descriptive sense only and not for purposes of limitation. Accordingly, the present invention is not limited to the specific embodiments illustrated herein, but is limited only by the following claims.

What is claimed is:

1. An optical system comprising two or more optical switches for switching one or more optical signals, the signals comprising one or more optical wavelengths, each optical wavelength constituting a work piece, each said switch comprising:
   a plurality of input fiber ports, each said input fiber port serving as an external interface for introducing the at least one input optical signal into a first optical switch of said two or more optical switches;
   a plurality of output fiber ports, said output fiber port serving as an external interface for extracting the output optical signal from said optical switch of said two or more optical switches;
   at least one shared arrayed switching element for receiving at least one wavelength from said plurality of input fiber ports and for switching the at least one wavelength from one of said plurality of input fiber ports to one of said plurality of output fiber ports according to a state of at least one switch of said at least one shared arrayed switching element;
   at least one shared wavelength dispersive element for spatially separating at least one first wavelength of the input optical signal from at least one other wavelength of the input optical signal and for recombining at least one first wavelength of the output optical signal with at least one other wavelength of the output optical signal;
   at least one shared arrayed steering element for steering the at least one wavelength from at least one of said plurality of input fiber ports onto said at least one shared arrayed switching element, and for steering the at least one wavelength from said at least one shared arrayed switching element to at least one of said plurality of output fiber ports;
   one or more shared optical elements, wherein each said optical element focuses the optical signals of said at least one of said plurality of input fiber ports and said at least one of said plurality of output fiber ports; and
   wherein said one or more of shared arrayed switching elements, shared wavelength dispersive elements, shared arrayed steering elements, and shared optical elements are adapted to be utilized by each said optical switch of said two or more optical switches.

2. The system of claim 1, wherein at least one of said two or more optical switches further comprises one or more input fiber ports and one output fiber port, and wherein at least one other optical switch of said two or more optical switches further comprises one input fiber port and one or more output fiber ports.

3. The system of claim 2, wherein said first optical switch further comprises at least one wavelength from a group of said one or more input fiber ports, said at least one wavelength being switched to said one output fiber port.

4. The system of claim 2, wherein said one other optical switch further comprises at least one wavelength from said one input fiber port, said at least one wavelength being switched to one fiber of a group of said one or more output fiber ports.

5. The system of claim 2, wherein said output fiber port of said first optical switch is coupled to said one input fiber port of said one other optical switch.

6. The system of claim 5, wherein said first optical switch further comprises at least one wavelength from said one or more input fiber ports, said at least one wavelength being switched to said one output fiber port and wherein said one other optical switch further comprises at least one wavelength from said one input fiber port, said at least one wavelength being switched to said one or more output fiber ports.

7. The system of claim 5, wherein said at least one wavelength of any of said one or more input fiber ports of said first optical switch is switched to any one of said one or more output fiber ports of said one other optical switch.

8. The system of claim 5, wherein said couple is selected from a group consisting of external fiber, waveguides, internal mirror, and combinations thereof.

9. The system of claim 2, wherein at least one of said one or more output fiber ports of said one other at least one optical switch is coupled to at least one of said one or more input fiber ports of said first optical switch.

10. The system of claim 9, wherein a change in direction of said optical signal through said one or more optical switches further comprises at least one wavelength of said one input fiber port is switched to one of said one or more output fiber ports of said one other at least one optical switch and wherein the at least one wavelength is further switched from said one or more input fiber ports to said one output fiber port of said first optical switch.

11. The system of claim 2, wherein said at least one output fiber port of said first at least one optical switch of said two or more optical switches is coupled to said one input fiber port of said one other optical switch, wherein together, said two said optical switches comprise an integrated optical switch having a plurality of input fiber ports and a plurality of output fiber ports.

12. The system of claim 1, wherein a change in direction of said at least one optical signal through said two or more optical switches further comprises said first optical switch wherein said plurality of input fiber ports further comprises one or more output fiber ports, and wherein said plurality of output fiber ports further comprises one or more input fiber ports, and further comprises one other optical switch, wherein said plurality of input fiber ports or said other optical switch further comprises one or more output fiber ports and wherein said plurality of output fiber ports of said other optical switch further comprises one or more input fiber ports.

13. The system of claim 1, wherein each said at least one shared arrayed steering element further comprises one or more facets, wherein each facet is configured to position that at least one first wavelength from said plurality of input fiber ports onto said at least one switch in said shared arrayed switching element, and is further configured to position the at least one first wavelength from said at least one switch to said plurality of output fiber ports for each said optical switch.

14. The system of claim 1, wherein each said at least one shared arrayed steering element further comprises one or more focal points, wherein each said at least one shared arrayed steering element steers one first set of wavelength from any of said plurality of input fiber ports onto a first said switch of said at least one switch of said at least one shared arrayed switching element and steers at least one other set of wavelengths from any of said plurality of input fiber ports onto at least one other said switch of said at least one switch of said at least one shared arrayed switching element.

15. The system of claim 14, wherein each said at least one shared arrayed steering element further steers one set of reflected wavelengths from any switch of said at least one shared arrayed switching element to said at least one shared wavelength dispersive element.

16. The system of claim 1, wherein said one or more optical elements further comprises front end optics, wherein said front end optics is positioned between said plurality of input and output fiber ports and said at least one shared wavelength dispersive element, and wherein said front end optics conditions the input optical signals of said plurality of input fiber ports with desirable properties for free-space propagating beams and conditions the output optical signals for insertion into said plurality of output fiber ports.

17. The system of claim 1, further comprising a controller wherein said controller controls the at least one wavelength switching route between said plurality of input fiber ports and said plurality of output fiber ports of one first optical switch by operating at least one first said switch of said at least one share arrayed switching element, and said controller further controls the at least one wavelength switching route between said plurality of input fiber ports and said plurality of output fiber ports of one other optical switch by operating at least one other said switch of said at least one shared arrayed switching element.

18. The system of claim 1, wherein each said at least shared arrayed steering element further steers any set of the at least one wavelength from any point in one said optical switch to any other point in the same said optical switch.

19. The system of claim 1, wherein said at least one shared arrayed switching element is selected from a group consisting of mirrors, liquid crystals, liquid crystals on silicon, a liquid crystal array, and combinations thereof.

* * * * *